United States Patent
Dagan et al.

(10) Patent No.: US 12,438,445 B2
(45) Date of Patent: Oct. 7, 2025

(54) METHOD, SYSTEM, AND APPARATUS FOR POWER CONVERSION

(71) Applicant: Solaredge Technologies Ltd., Herzeliya (IL)

(72) Inventors: Shai Dagan, Givatayim (IL); Tzachi Glovinsky, Petah Tikva, IL (US)

(73) Assignee: Solaredge Technologies Ltd., Herzeliya (IL)

( * ) Notice: Subject to any disclaimer, the term of this patent is extended or adjusted under 35 U.S.C. 154(b) by 260 days.

(21) Appl. No.: 18/150,854

(22) Filed: Jan. 6, 2023

(65) Prior Publication Data

US 2023/0223839 A1 Jul. 13, 2023

Related U.S. Application Data

(60) Provisional application No. 63/297,429, filed on Jan. 7, 2022.

(51) Int. Cl.
*H02M 7/44* (2006.01)
*H02M 1/34* (2007.01)
*H02M 7/5387* (2007.01)

(52) U.S. Cl.
CPC ....... *H02M 1/344* (2021.05); *H02M 7/53871* (2013.01)

(58) Field of Classification Search
CPC .......... H02M 7/53871; H02M 1/344; H02M 1/4208; H02M 7/44
See application file for complete search history.

(56) References Cited

U.S. PATENT DOCUMENTS

| | | |
|---|---|---|
| 7,164,591 B2 | 1/2007 | Soldano |
| 9,654,024 B2 | 5/2017 | Cohen |
| 9,742,264 B2 | 8/2017 | O'Day |
| 9,847,710 B2 | 12/2017 | Lee et al. |
| 9,899,911 B2 | 2/2018 | Nishimoto et al. |
| 10,536,073 B2 | 1/2020 | Young et al. |
| 10,742,113 B2 | 8/2020 | Guo et al. |
| 2003/0052658 A1* | 3/2003 | Baretich ............... H02M 5/293 323/284 |
| 2013/0257392 A1 | 10/2013 | Yan et al. |
| 2016/0043632 A1 | 2/2016 | Tomioka |

(Continued)

FOREIGN PATENT DOCUMENTS

CN 108900100 B 7/2019
CN 211018674 U 7/2020

(Continued)

OTHER PUBLICATIONS

B. Zhang et al., "EMI Prediction and Reduction of Zero-Crossing Noise in Totem-Pole Bridgeless PFC Converters," Journal of Power Electronics, vol. 19, No. 1, pp. 278-287, Jan. 2019.

(Continued)

*Primary Examiner* — Adolf D Berhane
(74) *Attorney, Agent, or Firm* — Banner & Witcoff, Ltd.

(57) ABSTRACT

Systems, apparatuses, and methods are described for power conversion. Dampening circuitry may be operatively connected to power converter circuitry to reduce accumulated charge during different portions of an alternating current (AC) cycle. The dampening circuitry may be arranged for soft switching of the converter circuitry to reduce voltage or current spikes and noise.

20 Claims, 46 Drawing Sheets

(56) References Cited

U.S. PATENT DOCUMENTS

| | | | |
|---|---|---|---|
| 2017/0025962 A1* | 1/2017 | Davidson | ................ H02M 1/44 |
| 2019/0356213 A1 | 11/2019 | Wang et al. | |
| 2020/0321869 A1 | 10/2020 | Kuwana et al. | |
| 2020/0328672 A1 | 10/2020 | Li et al. | |
| 2020/0389086 A1 | 12/2020 | Messi Bene Eloundou et al. | |

FOREIGN PATENT DOCUMENTS

| | | |
|---|---|---|
| CN | 111669044 A | 9/2020 |
| CN | 112104221 A | 12/2020 |
| CN | 112104222 A | 12/2020 |
| CN | 212726850 U | 3/2021 |
| JP | 2018182880 A | 11/2018 |
| JP | 2020145842 A | 9/2020 |
| KR | 102208523 B1 | 1/2021 |
| WO | 2018180275 A1 | 10/2018 |
| WO | 2020233097 A1 | 11/2020 |

OTHER PUBLICATIONS

Q. Li et al., "Conduction Losses and Common Mode EMI Analysis on Bridgeless Power Factor Correction," International Conference on Power Electronics and Drive Systems, pp. 1255-1260, Dec. 2009.

S. Chellappan, "A comparative analysis of topologies for a bridgeless-boost PFC circuit," Texas Instruments, Analog Design Journal, vol. 3, 2018.

B. Sun, "How to reduce current spikes at AC zero-crossing for totem-pole PFC," Texas Instruments, Analog Applications Journal, vol. 4, 2015.

B. Sun, "Control challenges in a totem-pole PFC," Texas Instruments, Analog Applications Journal, vol. 2, 2017.

May 17, 2023—European Search Report—EP App. No. 23150492.9.

Jun. 19, 2024—European Examination Report—EP App. No. 23150492.9.

* cited by examiner

METHOD, SYSTEM, AND APPARATUS FOR POWER CONVERSION

CROSS-REFERENCE TO RELATED APPLICATION

The present application claims priority to U.S. Provisional Application 63/297,429 filed Jan. 7, 2022.

BACKGROUND

Power converters are devices that may include electrical circuitry arranged to convert electrical energy from one form to another. Power converters may be arranged to change one or more component of the electrical energy that is input to the power converter. For example, some power converters may be arranged to convert alternating current (AC) into direct current (DC), and/or convert DC to AC. Power converters may be arranged to change voltage, current, and/or frequency of a current.

SUMMARY

The following summary presents a simplified summary of certain features. The summary is not an extensive overview and is not intended to identify key or critical elements.

Systems, apparatuses, and methods are described for power conversion. In power conversion, there may be issues, challenges, and/or problems due to the power changing from a relatively large positive voltage during a first state (e.g., a positive half of an AC cycle) to a relatively large negative voltage during a second state (e.g., a negative half of an AC cycle) and back to the first state again. This may cause, for example, current spikes and noise, such as electromagnetic interference (EMI). EMI may include common mode noise. In some examples, dampening circuitry including switching circuitry and energy dissipation circuitry may be arranged to assist with transitioning the converter circuitry between a first state and a second state, and vice versa. For example, the dampening circuitry may be arranged for soft (or gradual) switching elements of the converter circuitry between the different states (first state and second state). The dampening circuitry may be arranged to charge and/or discharge (or assist with charging and/or discharging) a voltage due to parasitic capacitance. The voltage due to parasitic capacitance may be a result of the common mode switching which may lead to a common mode current. One or more parasitic capacitors of the parasitic capacitance (e.g., one or more parasitic capacitors, also referred to as "y-capacitors" or "y-caps") may be charged with negative polarity (e.g., a voltage with negative polarity across one or more parasitic capacitors) or may be charged with positive polarity (e.g., a voltage with positive polarity across one or more parasitic capacitors). For example, the common mode current may charge (e.g., to a voltage with negative polarity with respect to a reference potential or a ground potential) the parasitic capacitance during a first transition between the two different states (e.g., from the first state to the second state), and may charge (e.g., to a voltage with positive polarity with respect to a reference potential or a ground potential) the parasitic capacitance during a second transition between the two states (e.g., from the second state back to the second state). The dampening circuitry may be arranged to reduce the common mode current that may be caused by the parasitic capacitance. Using the dampening circuitry to reduce the common mode current, so that there is a relatively small common mode current (e.g. compared to cases where there is no dampening circuitry used to reduce the common mode current), may result in relatively less common mode noise or interference, such as EMI.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1A:
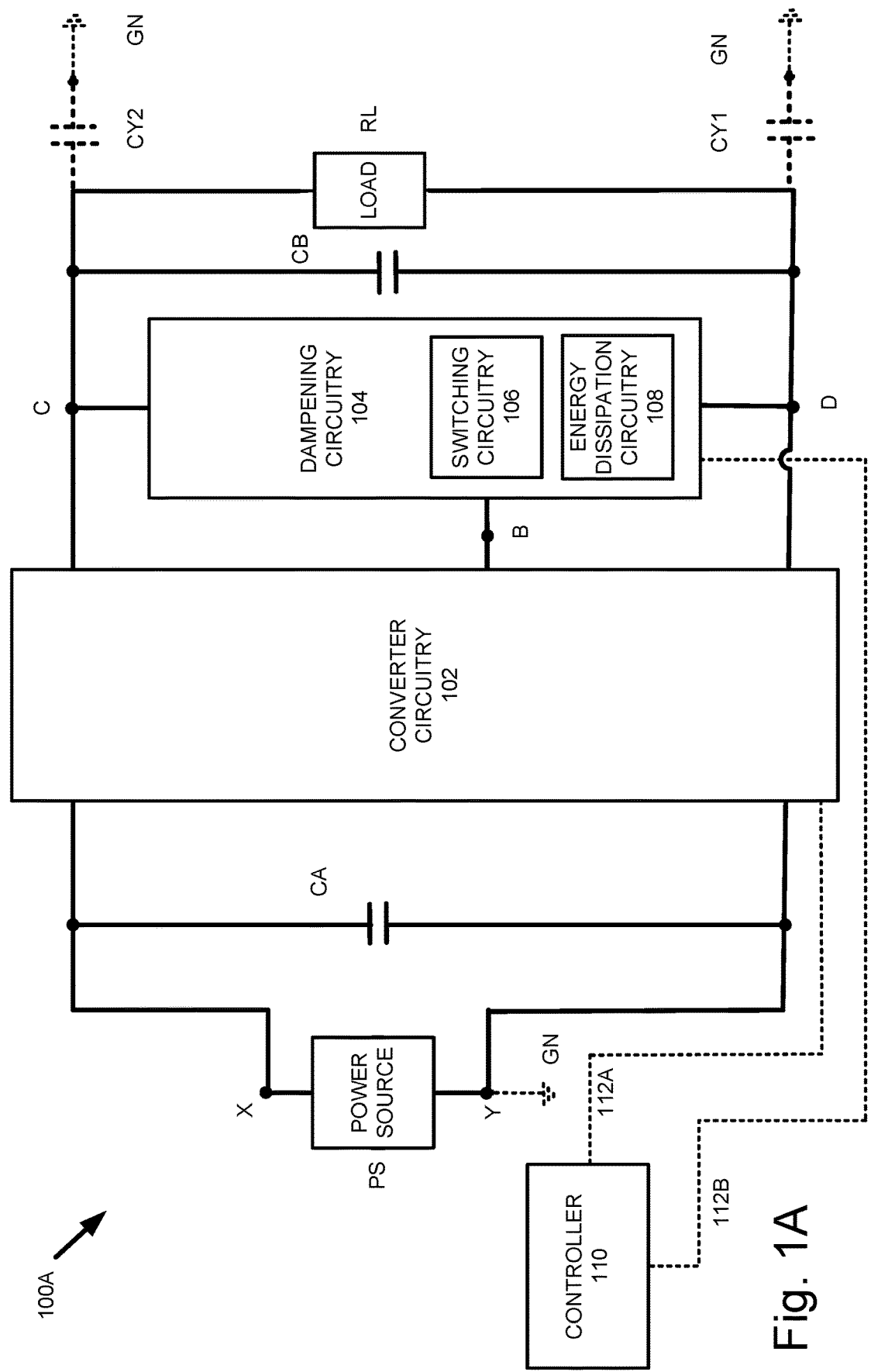
FIG. 1A shows an example of a power conversion system.

For ease of understanding, the following terms will be referred to herein and understood to have the following meanings:

The term "switching circuitry" may refer to electrical circuitry that includes one or more switches. The term "switching circuitry" may be used interchangeably herein with the term "switching circuit".

The term "switch" used herein may refer to any appropriate reversible switching element that may be switched in a non-permanent fashion. Examples of switches are (but not limited to): a transistor, a field effect transistor (FET), a metal oxide semiconductor field-effect transistor (MOSFET), a bipolar junction transistor (BJT), an insulated-gate bipolar transistor (IGBT), a Silicon Carbide (SiC) switch, a Gallium Nitride (GaN) switch, a thyristor, a semiconductor controlled rectifier (SCR), a solid state relay (SSR), relays, AC relays, throw switches, etc. The switch may be single throw, double throw, etc.

The term "soft switching" used herein may refer to a manner of switching one or more switches in a way where there is relatively small voltage and/or relatively small current during the switching of the one or more switches. Soft switching may assist with reducing switching noise and losses (e.g., due to gradual switching, switching transitions that are gradual, etc.).

The term "common mode switching" used herein may refer to a manner of switching one or more switches during a transition between different states. For example, the different states may be a positive half of an AC cycle and a negative half of an AC cycle.

There may be issues, challenges, and/or problems (e.g., when converting AC power) if the AC power changes from a relatively large (or high) positive voltage during a first state (e.g., a positive half cycle) to a relatively large (or high) negative voltage during a second state (e.g., a negative half cycle) and back to the first state again. For example, the AC power at an AC power source may change from a relatively high positive voltage (e.g., about +400 V) to a relatively high negative voltage (e.g., about −400 V) and then back again (e.g., from about −400 V to about +400 V) for each cycle. This may cause a build-up and release of electric charge at one or more terminals relative to a ground potential, for example, due to a parasitic capacitance. This build-up and release of charge due to parasitic capacitance may cause current spikes and noise, such as electromagnetic interference (EMI). EMI may include common mode noise. One or more methods, systems, and apparatuses described herein may address these issues. For example, dampening circuitry with switching circuitry and energy dissipation circuitry may be arranged to assist with switching the converter circuitry between a first state and a second state, and vice versa. For example, soft switching of the converter circuitry between a first state and a second state, and vice versa, may at least partially address these issues. The dampening circuitry with switching circuitry and energy dissipation circuitry may be arranged to assist with charging and/or discharging a voltage due to parasitic capacitance and reduce current spikes and noise (e.g., EMI). The dampening circuitry may be arranged to mitigate and reduce the common mode current that may be caused by parasitic capacitors during transitions between the different states.

The dampening circuitry may be connected to at least one terminal that is located between a plurality of switches of the converter circuitry. The energy dissipation circuitry may include one or more resistors and/or one or more inductors that may assist to dissipate energy. The energy may be related to a charge of parasitic voltage related to common mode switching of the power conversion system.

The accompanying drawings, which form a part hereof, show examples of the disclosure. It is to be understood that the examples shown in the drawings and/or discussed herein are non-exclusive and that there are other examples of how the disclosure may be practiced.

It is noted that the teachings of the presently disclosed subject matter are not bound by the systems and apparatuses described with reference to the figures. Equivalent and/or modified functionality may be consolidated or divided in another manner and may be implemented in any appropriate combination. For example, controller 110, converter circuitry 102 and dampening circuitry 104, which are shown as separate units (shown, for example, in FIG. 1A), may have their functionalities and/or components combined into one or more units.

It is also noted that the teachings of the presently disclosed subject matter are not bound by the order in which they are described, and the described operations may occur out of the described order. For example, operations that are described in succession may be executed substantially concurrently or in reverse order. It is also noted that while the operations are described with reference to certain elements shown herein, this is by no means binding, and the operations may be performed by elements other than those described herein.

It is also noted that like references in the various figures refer to like elements throughout the application. Similar reference numbers may also connote similarities between elements. For example, it is to be understood that power source PS shown in FIG. 1A may be similar to or the same as other power sources described and shown herein, and vice versa. Throughout the application certain general references may be used to refer to any of the specific related elements. For example, a power conversion system (e.g., power conversion system 100A shown in FIG. 1A and power conversion system 100B shown in FIG. 1B) may refer to any of the various power conversion systems (e.g., a DC to AC power conversion system, a AC to DC power conversion system, a DC to DC power conversion system (e.g., that includes AC power conversion), an AC to AC power conversion system, etc.).

It is also noted that all numerical values given in the examples of the description are provided for illustrative purposes only and are by no means binding.

The term, "threshold", used herein may include variations that are equivalent for an intended purpose or function (e.g., within a permissible variation range or tolerance).

The term "controller" used herein may include a computer and/or other appropriate processing circuitry and memory. The terms "computer" or "processor" or variations thereof should be expansively construed to cover any kind of hardware-based electronic device with data processing capabilities including, by way of non-limiting example, a digital processing device (e.g., digital signal processor (DSP), microcontroller, field programmable circuit, application-specific integrated circuit (ASIC), etc.), a device which includes or is operatively connected to one or more processing devices, and/or an analog circuit implementing control logic. The terms "memory" or "data storage device" used herein should be expansively construed to cover any volatile or non-volatile computer memory suitable to the presently disclosed subject matter. The above controller may include, by way of non-limiting example, the one or more controllers 110 disclosed in the present application.

FIG. 1A shows an example of a power conversion system 100A. Power conversion system 100A may include one or more power sources PS and one or more loads RL. The one or more power sources PS may also be referred to herein as "power sources PS," and a respective power source of the one or more power sources PS may also be referred to herein as "power source PS". The one or more loads RL may also be referred to herein as "loads RL," and a respective load of the one or more loads RL may also be referred to herein as "load RL."

Power conversion system 100A may be part of a power system, such as a photovoltaic (PV) power generation system, a solar power generation system, etc. Power conversion system 100A may be part of a system power device of the PV power generation system. Power conversion system 100A may be part of a power converter, such as, AC to DC converters, DC to AC inverters, micro-inverters, DC to DC converters (e.g., that include AC power conversion), etc. Such converters are a few non-limiting examples, and other converters and or a combination of one or more converters may be used.

Power source PS may include an AC power source. Power source PS (e.g., power sources shown in FIG. 1B, and other figures herein) may be an AC power source but may be any appropriate power source. As an example, the power source may include a single-phase AC power source, a 3-phase AC power source, a DC power source that is converted to an AC power source, etc. The DC power source may include: at least one PV panel, an array of PV panels, a solar panel, an array of solar panels, one or more batteries, an array of batteries, etc. One or more batteries may include one or more batteries for various power devices, power converters, electric vehicles, etc.

Power source PS may be connected to converter circuitry 102 at one or more terminals of the converter circuitry 102. Power source PS may be connected to converter circuitry 102 at (or via) terminal X and terminal Y. Terminal X and terminal Y may also be referred to as "AC terminals". Terminal X and terminal Y (or terminal Y and terminal X) may be a positive terminal and a negative terminal, respectively, may be a line terminal and a neutral terminal, respectively, a first line terminal and a second line terminal, respectively, etc. Terminal X and terminal Y may represent a first line terminal for a first phase and a second line terminal for a second phase, respectively.

Although only a single power source PS is shown in FIG. 1A, it should be appreciated that power source PS may include a plurality of power sources PS connected to each other in series or parallel connections. For example, the power source PS may include a plurality of strings of power sources, where each string of power sources includes a plurality of power sources connected to each other in series. Each of the strings of power sources may be connected to the other strings of power sources in parallel.

Load RL (e.g., load RL shown in FIG. 1A or FIG. 1B) may be a DC load. Load RL may be connected to converter circuitry 102 at (or via) one or more terminals of the converter circuitry 102. Load RL may be connected to converter circuitry 102 at terminal C and terminal D. Terminal C and terminal D may also be referred to as "DC terminals".

Figure 1B:
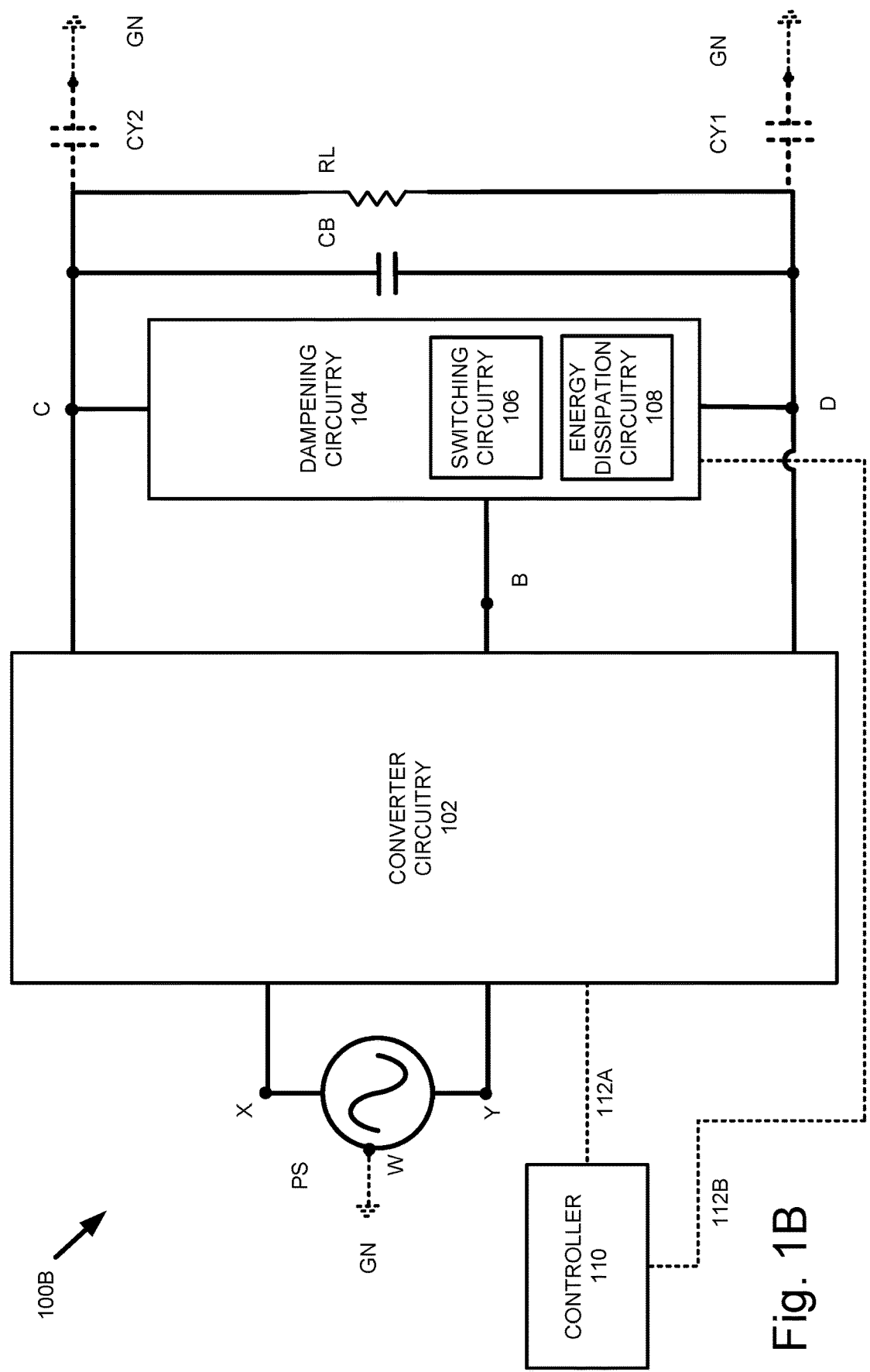
FIG. 1B shows an example of a power conversion system.

An example of load RL is shown in FIG. 1B, and other figures herein, as a resistor but may be any appropriate load (e.g., a connection of one or more passive circuit components, such as resistors, inductors, and any other components and/or load elements, etc.). Load RL (e.g., load RL shown in FIG. 1A or FIG. 1B) may include, but not limited to, one or more of: resistive elements and/or devices (e.g., resistors), devices (e.g., motors), uninterruptible power supplies (UPSs), energy storage devices (e.g., batteries or other devices used to store energy, such as, electrical energy), electrical grids, power converters, inverters, etc. The power conversion may be bi-directional. For example, a DC power source may be connected to terminals C and D, and the power at terminals C and D may be converted to a power at terminals X and Y (e.g., shown in FIG. 1A or FIG. 1B), and the converted power at terminals X and Y may be stored in energy storage devices (e.g., batteries or other devices used to store energy) connected to at least one of terminals X and Y.

Converter circuitry 102 may be arranged for bi-directional power conversion. Converter circuitry 102 may be arranged, for example, to convert an AC input on AC terminals to a DC output on DC terminals, or to convert a DC input on the DC terminals to an AC output on the AC terminals. For example, a DC power source may be connected to DC terminals of converter circuitry 102, and an AC load may be connected to AC terminals of converter circuitry 102.

Converter circuitry 102 may be any suitable converter circuitry for power conversion. Converter circuitry 102 may include, but not limited to, one or more of: bridgeless converters, bridgeless power factor correction (PFC) converters, full bridge converters, full bridge PFC converters, half bridge converters, half bridge PFC converters, neutral point clamped (NPC) converters, NPC inverters, T-type neutral point clamped (TNPC) converters, TNPC inverters, flying capacitor converters, etc. Converter circuitry 102 may include any appropriate levels of converter circuitry. For example, converter circuitry 102 may have N levels of converter circuits where N is any appropriate number. Converter circuitry 102 may have, for example, 2 levels, 3 levels, etc. Converter circuitry 102 may include a plurality of switches configured for the N levels.

One or more capacitors CB may be connected to terminals C and D (e.g., the DC terminals) of converter circuitry 102. The one or more capacitors CB may be arranged to reduce and/or limit ripples and smooth voltage (e.g., DC voltage) on the terminals C and D (e.g., to a DC load RL, or from a DC power source connected to terminals C and D). One or more capacitors CA may be connected to terminals X and Y (e.g., the AC terminals of converter circuitry 102. The one or more capacitors CA may be a filter arranged to reduce noise and/or limit interference (e.g., EMI) on the terminals X and Y (e.g., from an AC power source PS, or to an AC load connected to terminals X and Y). The one or more capacitors CB and/or the one or more capacitors CA might not be shown in other figures but may be implemented in the other figures.

Dampening circuitry 104 may be arranged to reduce or mitigate common mode current (e.g., due to common mode switching). The dampening circuitry 104 may be arranged to reduce or mitigate common mode voltage (e.g., due to common mode switching). The dampening circuitry 104 may be arranged to affect charge and discharge of parasitic capacitors related to the power conversion system 100A. The dampening circuitry 104 may be arranged to reduce built-up charge due to parasitic capacitance and due to common mode switching, thereby reducing the common mode voltage and the common mode current. Without dampening circuitry 104, a parasitic capacitor related to parasitic capacitance related to a power conversion system (such as the power conversion system 100A and the power conversion system 100B) may retain a relatively large voltage at one or more terminals of the power conversion system. The charge and discharge of the parasitic capacitor may occur during transitions of the different states of the converter circuitry 102. The dampening circuitry 104 may reduce that relatively large voltage by dissipating energy using energy dissipation circuitry 108 to reduce the common mode current and reduce the common mode voltage. Dampening circuitry 104 may be connected between the parasitic capacitor and the ground, which may maintain a ground potential. Dampening circuitry 104, including dissipation circuitry, may be in the path of the parasitic capacitors during common mode switching and reduce the common mode current that charges and discharges the parasitic capacitors during common mode switching. Dampening circuitry 104 may be referred to as charge/discharge circuitry or damping circuitry. Dampening circuitry 104 may be connected to converter circuitry 102 at one or more terminals of the converter circuitry 102. Dampening circuitry 104 may be connected to converter circuitry 102 at (or via) terminal B. Terminal B may be located between a plurality of switches of the converter circuitry 102 (e.g., located at a node that connects a first switching element and a second switching element). For example, terminal B may be a node of the converter circuitry 102 located between a first branch of the converter circuitry 102 (the first branch having at least one first switching element) and a second branch of the converter circuitry 102 (the second branch having at least one second switching element). Dampening circuitry 104 may be connected to terminals C and D (e.g., DC terminals), and/or terminals X and Y (e.g., AC terminals) of converter circuitry 102.

Dampening circuitry 104 may be arranged to smooth common mode switching of the converter circuitry 102 (e.g., smooth common mode voltage and/or common mode current). Dampening circuitry 104 may be arranged to soft switch one or more switches of the converter circuitry 102 between different states (e.g., between different halves of an AC cycle). Dampening circuitry 104 may be arranged to reduce current spikes and EMI. Dampening circuitry 104 may be arranged to smooth transitions of the converter circuitry 102 between different states.

Elements of the power conversion system 100A may have a parasitic capacitance, that may cause a buildup of electrical charge at a terminal of the power conversion system 100A with respect to the ground and/or a ground potential. The buildup of electrical charge may be caused, for example, due to one or more factors including, but not limited to: the material(s) of the elements of the power conversion system 100A, the proximity of the elements of the power conversion system 100A to the ground, etc. Ground potential may be an actual ground potential (e.g., an earth potential) or a virtual ground potential (e.g., a virtual neutral potential). This parasitic capacitance may be charged by common mode current due to common mode voltage present across terminals of power source PS and/or load RL due to common mode switching. Common mode current may generate a voltage potential relative to the ground potential due to the parasitic capacitance (e.g., shown as one or more parasitic capacitor(s) CY1, CY2 in FIG. 1A, FIG. 1B, etc.). The parasitic capacitors CY1, CY2 may represent total capacitance of parasitic capacitors of one or more other elements of a power conversion system (e.g., power conversion system 100A) reflected to capacitance at the DC terminals and/or the AC terminals. The charging (e.g., a positive charge or voltage with positive polarity, a negative charge or voltage with negative polarity, etc.) of parasitic capacitor(s) CY1, CY2 may be undesirable. For example, it may adversely affect the power conversion system, and/or it may pose a potential danger and/or risk. Parasitic capacitance may be related to one or more switches (e.g., one or more transistors) of the converter circuitry 102. For example, a heat sink or other element of the power conversion system related to one or more transistors may have a connection to the ground that may cause parasitic capacitance.

Dampening circuitry 104 may be configured to dissipate energy or the charge of the parasitic capacitor(s) CY1, CY2 before or during common mode switching (e.g., during transitions between different states) and reduce the common mode current, common mode voltage, and the parasitic voltage(s) (e.g., the difference between the voltage potential of the parasitic capacitance and the ground potential). Dampening circuitry 104 may be arranged to dissipate charge related to the voltage potential relative to the ground potential caused by the parasitic capacitance (e.g., a charge associated with one or more parasitic capacitor(s) CY1, CY2).

Dampening circuitry 104 may include switching circuitry 106 and energy dissipation circuitry 108. Switching circuitry 106 may include one or more switching elements arranged to connect or disconnect the dampening circuitry 104 to or from the converter circuitry 102. The switching elements may be arranged to connect or disconnect the dampening circuitry 104 to or from terminals C and D (e.g., the DC terminals) and/or to or from terminals X and Y (e.g., the AC terminals) of converter circuitry 102. Energy dissipation circuitry 108 may include one or more electrical element that may be arranged to dissipate energy when the dampening circuitry 104 charges or discharges a voltage or charge. These one or more electrical elements may be referred to as one or more dissipation elements, one or more buffer elements, one or more dampening elements, or one or more damping elements. Capacitors CY1, CY2 represent a parasitic capacitance that may cause the buildup and release of a voltage or charge to be charged or discharged via the dampening circuitry 104.

Power conversion system 100A may be connected to ground potential GN. Ground potential GN may be an actual ground potential (such as, an earth potential) or a virtual ground potential (such as, a virtual neutral potential). For example, power conversion system 100A may be connected to ground potential GN at terminal Y (e.g., a node between a negative terminal of power source PS and an input terminal of converter circuitry 102). Power conversion system 100A may be connected to ground potential GN at other terminals. Power source PS of power conversion system 100B may be connected to ground potential GN at a terminal other than terminal Y (e.g., at terminal W). Terminal W might not be connected to the converter circuitry 102. Terminal W may be a neutral terminal of power source PS (e.g., an AC power source).

Power conversion system 100A may be connected to ground potential GN via the capacitors CY1, CY2. The voltage to be reduced or mitigated by dampening circuitry 104 may be an electrical potential difference that is relative between a given terminal of the power conversion system 100A and the ground potential GN.

Power conversion system 100A may include one or more controllers 110. If power conversion system 100A includes a plurality of controllers, one or more of the plurality of controllers may be designated as a master controller. The master controller may be configured to transmit and receive one or more signals to and from one or more other controllers of the plurality of controllers, and/or one or more other elements of the power conversion system 100A. The one or more signals may include one or more instructions related to switching ON or OFF one or more switching elements of converter circuitry 102 or one or more switching element of dampening circuitry 104. One or more functions and/or algorithms of the master controller 110 may be implemented in one or more controllers 110 as part of one or more of the circuits in the power conversion system. For example, converter circuitry 102 and dampening circuitry 104 may each have a controller, and one of those controllers may be designated as the master controller. Each of converter circuitry 102 and dampening circuitry 104 may include its own controller(s) without an external central controller, and one or more of those internal controllers may be designated as the master controller.

Controller 110 shown in FIG. 1A may be a central controller external to converter circuitry 102 and dampening circuitry 104. The one or more controllers may be communicatively and/or operably connected to converter circuitry 102 and dampening circuitry 104 via one or more connections 112A and/or 112B (shown in FIG. 1A as dashed lines). The connections between the one or more controllers and the various elements of other power conversion systems might not be shown in other figures but may be implemented in the other figures.

Figure 2A:
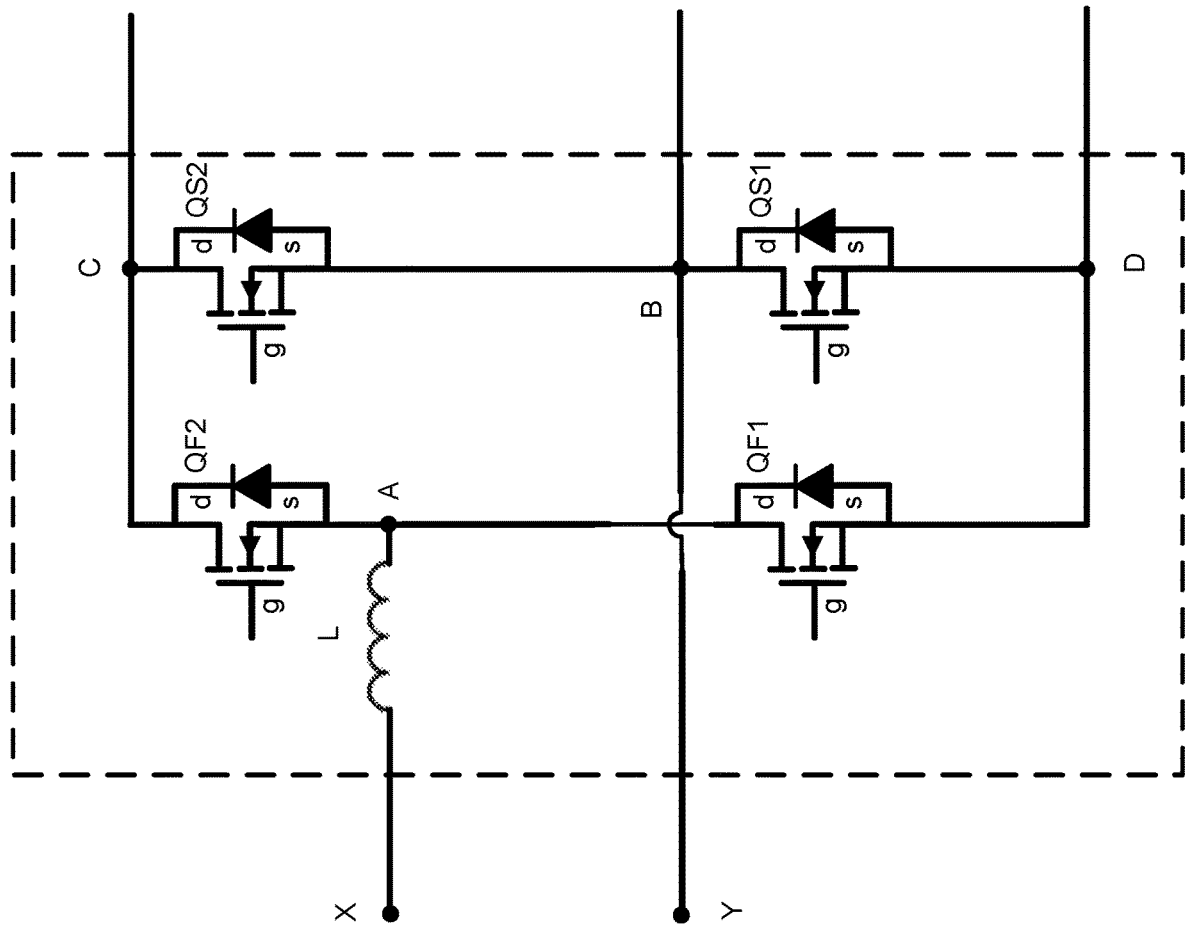
FIG. 2A shows example converter circuitry.

FIG. 2A, FIG. 2B, FIG. 2C, FIG. 2D, FIG. 2E, and FIG. 2F show examples of converter circuitry 102. FIG. 2A shows example converter circuitry 102A as a bridgeless PFC converter. Converter circuitry 102A may include one or more inductors L, a first fast switch QF1 connected between terminal D and terminal A, a second fast switch QF2 connected between terminal A and terminal C, a first slow switch QS1 connected between terminal D and terminal B, and a second slow switch QS2 connected between terminal B and terminal C. The one or more inductors L may be connected between terminal X and terminal A. The fast switches QF1 and QF2 may be operated with a relatively higher switching frequency (e.g., about 100 Hz, about 120 Hz, about 10 KHz, about 200 KHz, or any other appropriate relatively high frequency). The slow switches QS1 and QS2 may be operated with a relatively lower switching frequency (e.g., about 50 Hz, about 60 HZ, or any other appropriate relatively low frequency). For example, the fast switches QF1 and QF2 may be operated (turned ON and OFF) a plurality of times during half of an AC cycle. For example, the slow switches QS1 and QS2 may each be operated only a single time (turned ON or OFF) during half of an AC cycle. Each of the slow switches QS1 and QS2 may be considered to be in a steady state (turned ON or OFF) during half of an AC cycle (e.g., at the beginning of half of an AC cycle, at the end of half of an AC cycle). The fast switches may be made of materials that enable relatively faster switching than the slow switches. The switches QF1, QF2, QS1, and QS2 may be MOSFETS that each include a body diode. Converter circuitry 102A may include a terminal B that is located between a plurality of switches of the converter circuitry (e.g., between a first branch of the converter circuitry and a second branch of the converter circuitry, each branch may include at least one switch connected between two terminals). One or more dampening circuits (e.g., dampening circuitry 104 shown in FIG. 1A or FIG. 1B) may be connected to terminal B. Converter circuitry 102A may include an additional terminal A that is located between a plurality of switches of the converter circuitry 102A (e.g., between a third branch of the converter circuitry 102A and a fourth branch of the converter circuitry 102A, where each branch may include at least one switch connected between two terminals). One or more dampening circuits (e.g., dampening circuitry 104 shown in FIG. 1A or FIG. 1B) may be connected to terminal A. For example, one or more dampening circuits (e.g., dampening circuitry 104 shown in FIG. 1A or FIG. 1B) may be connected to terminal A, for example, if terminal A or terminal X are connected to a ground potential. In some examples, terminal B (which may be the same as terminal Y) may be connected to a ground potential.

Figure 2B:
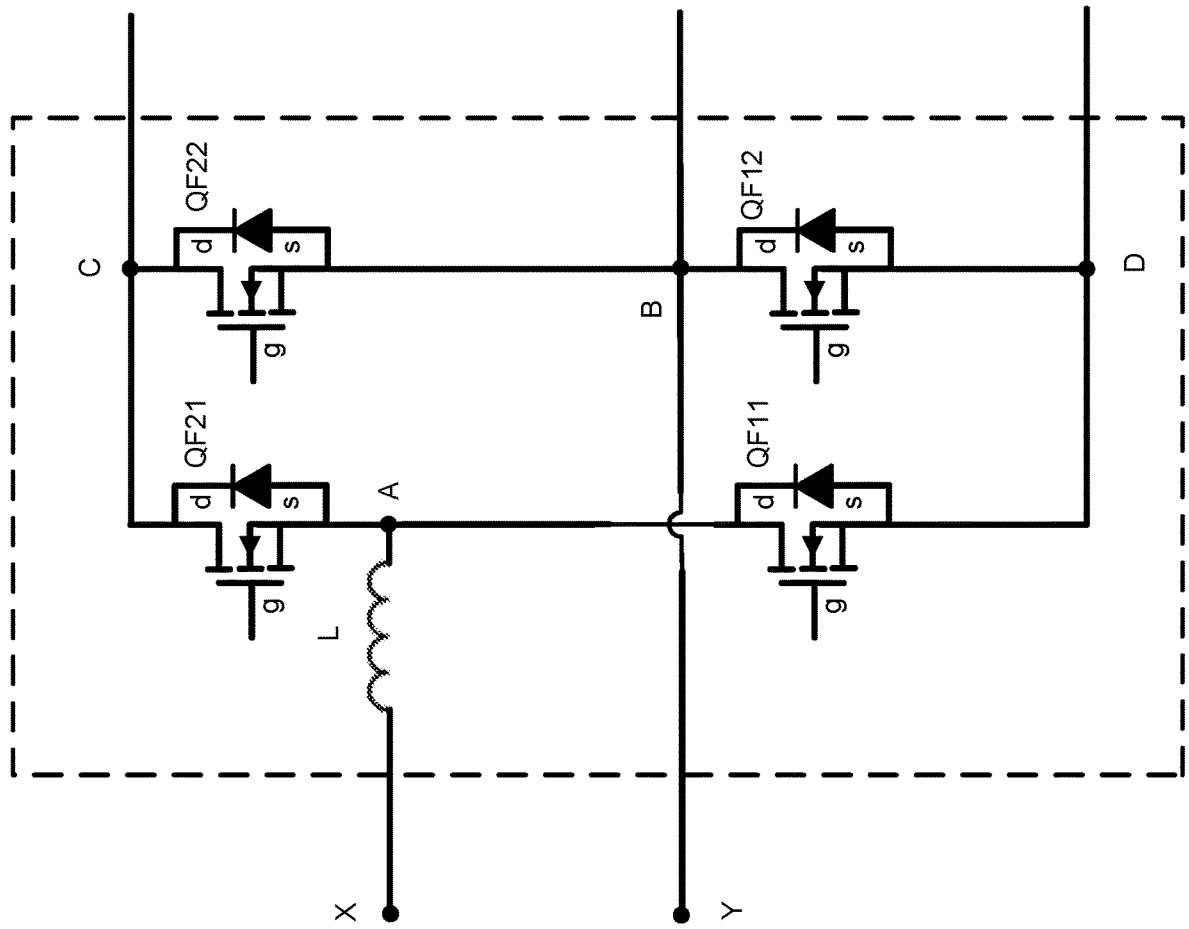
FIG. 2B shows example converter circuitry.

FIG. 2B shows example converter circuitry 102B as a full bridge PFC converter. Converter circuitry 102B may include one or more inductors L, a first fast switch QF11 connected between terminal D and terminal A, a second fast switch QF21 connected between terminal A and terminal C, a third fast switch QF12 connected between terminal D and terminal B, and a fourth fast switch QF22 connected between terminal B and terminal C. Converter circuitry 102B may include four fast MOSFETS (e.g., as opposed to a pair of fast MOSFETS and a pair of slow MOSFETS that may be implemented in converter circuitry 102A). A fast switch may operate in an operating frequency that is at least two times the AC fundamental frequency (e.g., 100 Hz, 120 Hz, 200 KHz, etc.). The AC fundamental frequency may be 50 Hz, 60 Hz, or any other AC fundamental frequencies. The converter circuitry 102B may include terminal B that is located between a plurality of switches of the converter circuitry (e.g., between a first branch of the converter circuitry and a second branch of the converter circuitry, each branch may include at least one switch connected between two terminals). One or more dampening circuits (e.g., dampening circuitry 104 shown in FIG. 1A or FIG. 1B) may be connected to terminal B. The converter circuitry 102B may include an additional terminal A that is located between a plurality of switches of the converter circuitry 102B (e.g., between a third branch of the converter circuitry 102B and a fourth branch of the converter circuitry 102B, where each branch may include at least one switch connected between two terminals). One or more dampening circuits (e.g., dampening circuitry 104 shown in FIG. 1A or FIG. 1B) may be connected to terminal A. For example, one or more dampening circuits (e.g., dampening circuitry 104 shown in FIG. 1A or FIG. 1B) may be connected to terminal A, for example, if terminal A or terminal X are connected to a ground potential. In some examples, terminal B (which may be the same as terminal Y) may be connected to a ground potential.

Figure 2C:
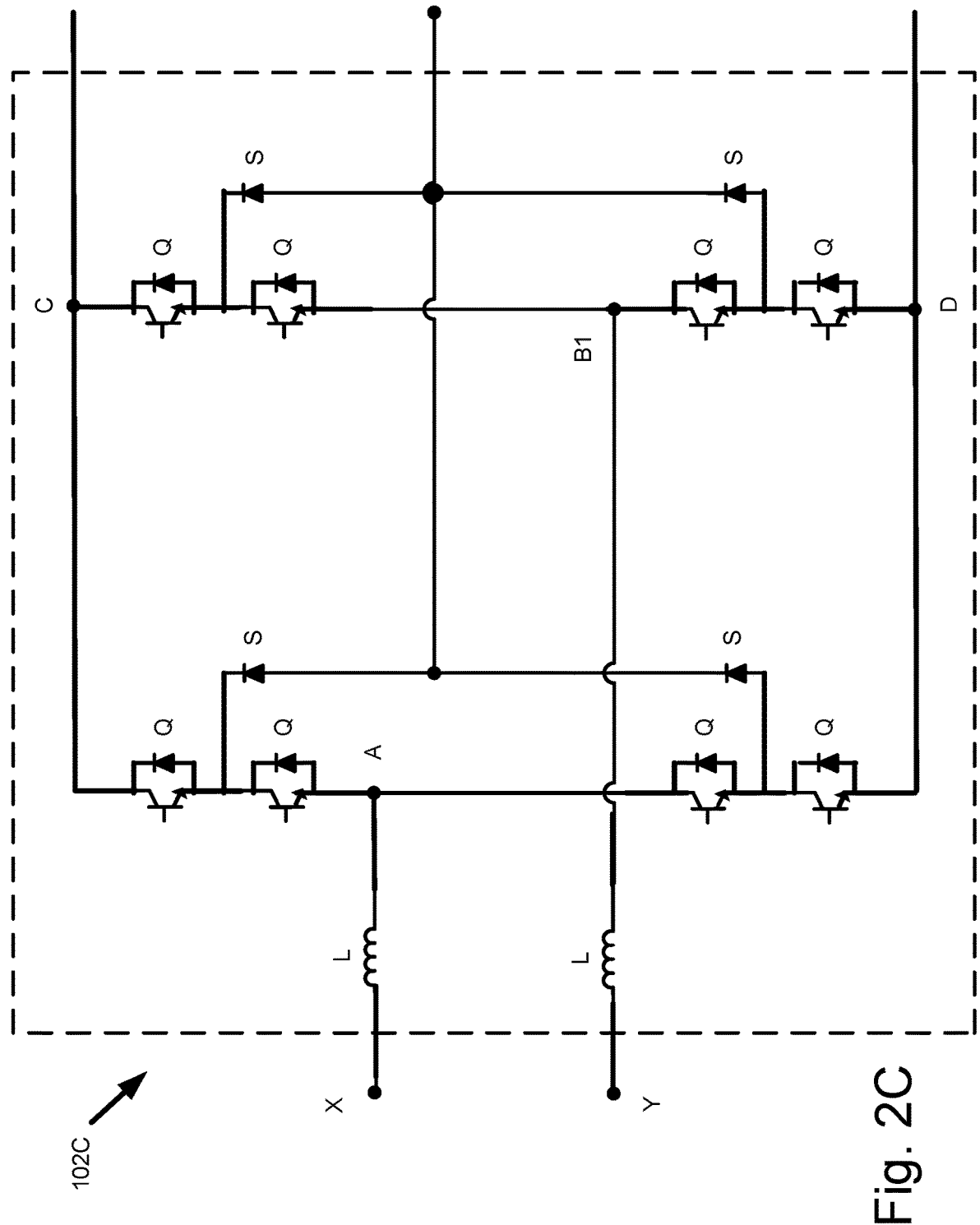
FIG. 2C shows example converter circuitry.

FIG. 2C shows example converter circuitry 102C as an NPC converter. Converter circuitry 102C may include a plurality of inductors L (e.g., one connected to terminal X and one connected to terminal Y), a plurality of switches Q, and a plurality of diodes S. Converter circuitry 102C may include a plurality of terminals B1 and B2. Each of the plurality of terminals B1 and B2 may be located between a plurality of switches of converter circuitry 102C. One or more dampening circuits (e.g., dampening circuitry 104 shown in FIG. 1A or FIG. 1B) may be connected to one or more of terminals B1 and B2 (e.g., between a first branch of the converter circuitry and a second branch of the converter circuitry, where each branch may include at least one switch connected between two terminals). For example, a first dampening circuit (e.g., dampening circuitry 104 shown in FIG. 1A or FIG. 1B) may be connected to terminal B1 and a second dampening circuit (e.g., dampening circuitry 104 shown in FIG. 1A or FIG. 1B) may be connected to terminal B2. Converter circuitry 102C may include an additional terminal (e.g., terminal A) that is located between a plurality of switches of converter circuitry 102C (e.g., between a third branch of the converter circuitry and a fourth branch of the converter circuitry, where each branch may include at least one switch connected between two terminals). One or more dampening circuits (e.g., dampening circuitry 104 shown in FIG. 1A or FIG. 1B) may be connected to terminal A. For example, one or more dampening circuits (e.g., dampening circuitry 104 shown in FIG. 1A or FIG. 1B) may be connected to terminal A, for example, if terminal A or terminal X are connected to a ground potential. In some examples, terminal B1, terminal B2, or terminal Y may be connected to the ground or a ground potential.

Figure 2D:
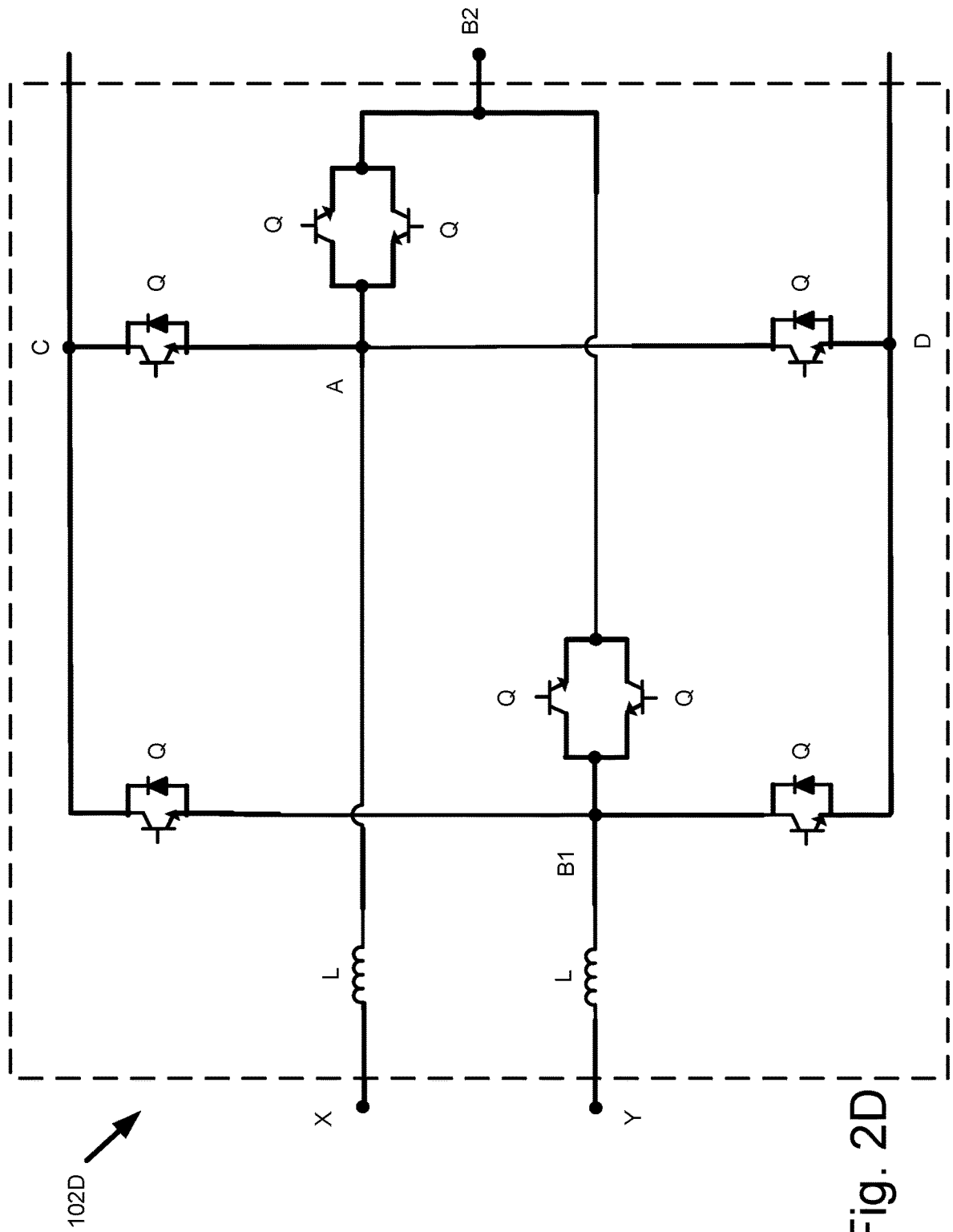
FIG. 2D shows example converter circuitry.

FIG. 2D shows example converter circuitry 102D as a TNPC converter. Converter circuitry 102D may include a plurality of inductors L (e.g., one connected to terminal X and one connected to terminal Y), and a plurality of switches Q. The converter circuitry 102D may include a plurality of terminals B1 and B2. Each of the plurality of terminals B1 and B2 may be located between a plurality of switches of converter circuitry 102D (e.g., between a first branch of converter circuitry 102D and a second branch of converter circuitry 102D). One or more dampening circuits (e.g., dampening circuitry 104 shown in FIG. 1A or FIG. 1B) may be connected to one or more of terminals B1 and B2 (e.g., between a first branch of converter circuitry 102D and a second branch of converter circuitry 102D, where each branch may include at least one switch connected between two terminals). For example, a first dampening circuit (e.g., dampening circuitry 104 shown in FIG. 1A or FIG. 1B) may be connected to terminal B1 and a second dampening circuit (e.g., dampening circuitry 104 shown in FIG. 1A or FIG. 1B) may be connected to terminal B2. Converter circuitry 102D may include an additional terminal (e.g., terminal A) that is located between a plurality of switches of converter circuitry 102D (e.g., between a third branch of converter circuitry 102D and a fourth branch of converter circuitry 102D, where each branch may include at least one switch connected between two terminals). One or more dampening circuits (e.g., dampening circuitry 104 shown in FIG. 1A or FIG. 1B) may be connected to terminal A. For example, one or more dampening circuits (e.g., dampening circuitry 104 shown in FIG. 1A or FIG. 1B) may be connected to terminal A, for example, if terminal A or terminal X are connected to the ground or a ground potential. In some examples, terminal B1, terminal B2, or terminal Y may be connected to the ground or a ground potential.

Figure 2E:
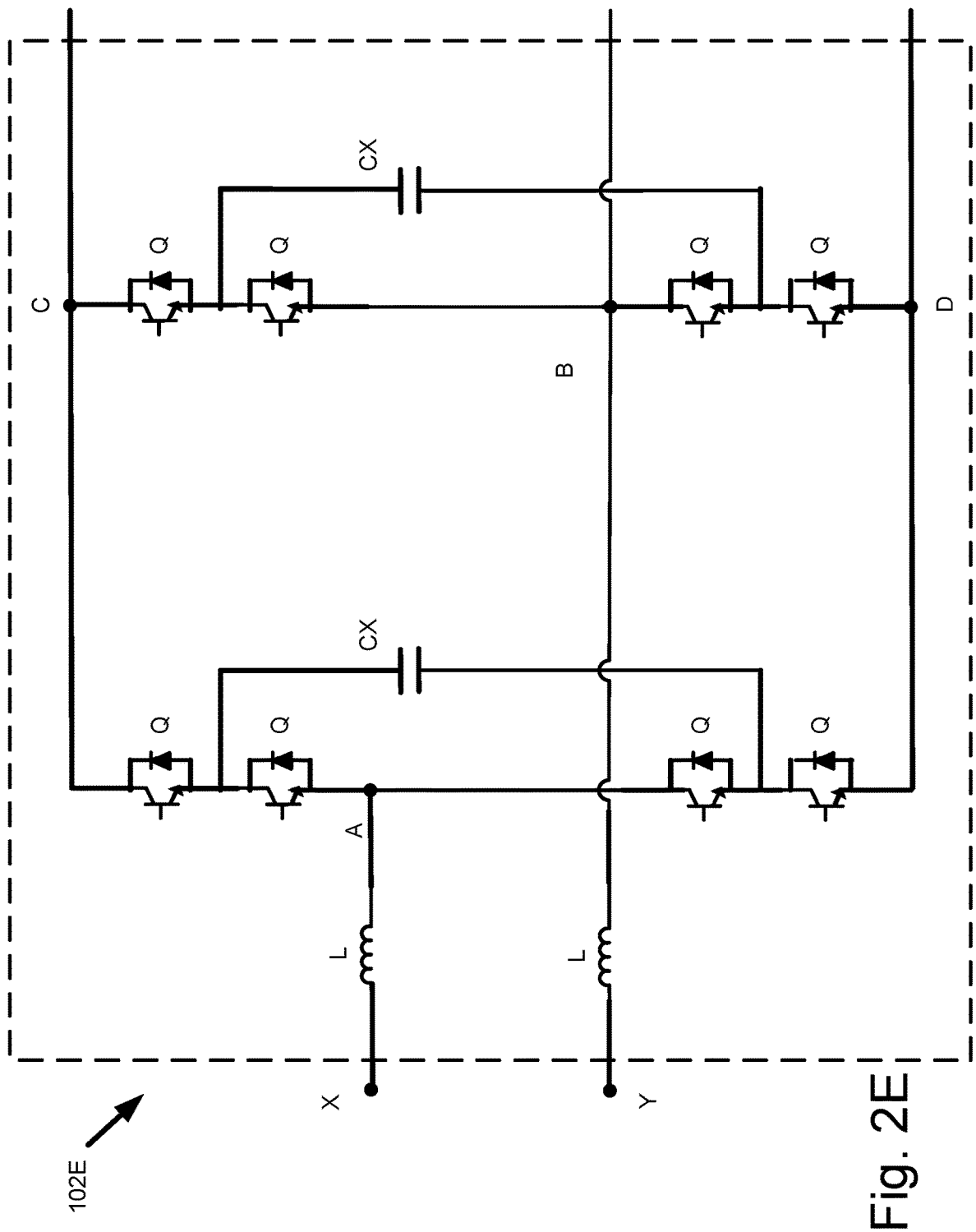
FIG. 2E shows example converter circuitry.

FIG. 2E shows example converter circuitry as a flying capacitor converter. Converter circuitry 102E may include a plurality of inductors L (e.g., one connected to terminal X and one connected to terminal Y), a plurality of switches Q, and a plurality of capacitors CX. Converter circuitry 102E may include terminal B that is located between a plurality of switches of converter circuitry 102E (e.g., between a first branch of converter circuitry 102E and a second branch of converter circuitry 102E, where each branch may include at least one switch connected between two terminals). One or more dampening circuits (e.g., dampening circuitry 104 shown in FIG. 1A or FIG. 1B) may be connected to terminal B. Converter circuitry 102E may include an additional terminal (e.g., terminal A) that is located between a plurality of switches of converter circuitry 102E (e.g., between a third branch of converter circuitry 102E and a fourth branch of converter circuitry 102E, where each branch may include at least one switch connected between two terminals). One or more dampening circuits (e.g., dampening circuitry 104 shown in FIG. 1A or FIG. 1B) may be connected to terminal A. For example, one or more dampening circuits (e.g., dampening circuitry 104 shown in FIG. 1A or FIG. 1B) may be connected to terminal A, for example, if terminal A or terminal X are connected to the ground or a ground potential. In some examples, terminal B or terminal Y may be connected to the ground or a ground potential.

Figure 2F:
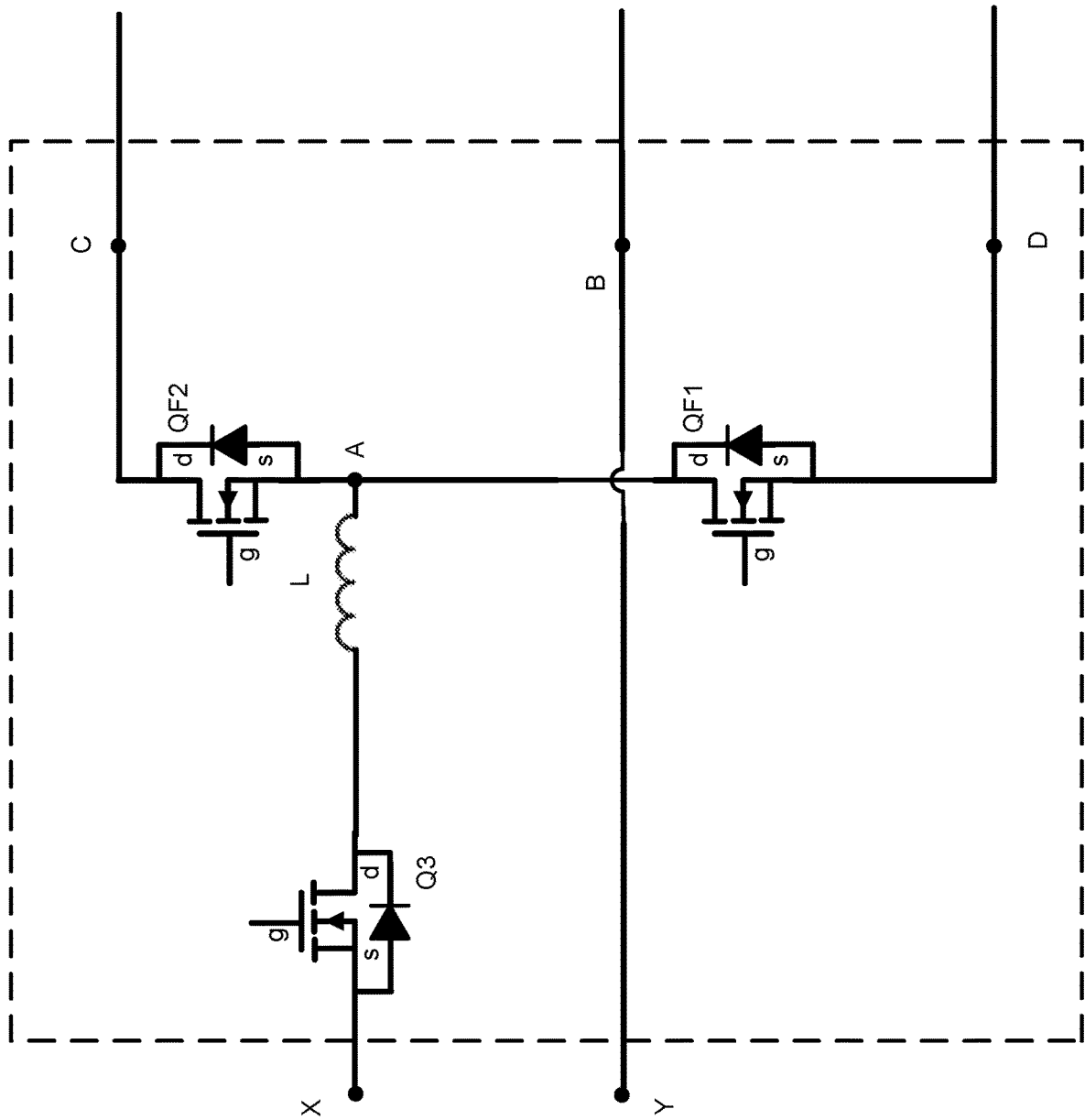
FIG. 2F shows example converter circuitry.

FIG. 2F shows example converter circuitry as a half bridge PFC converter. Converter circuitry 102F may include one or more inductors L, a first fast switch QF1 connected between terminal D and terminal A, a second fast switch QF2 connected between terminal A and terminal C, and a third switch Q3 connected between terminal X and the one or more inductors L. The one or more inductors L may be connected between the third switch Q3 and terminal A. Converter circuitry 102F may include terminal B that is located between a plurality of switches of converter circuitry 102F (e.g., between a first branch of converter circuitry 102F and a second branch of converter circuitry 102F, where each branch may include at least one switch connected between two terminals). One or more dampening circuits (e.g., dampening circuitry 104 shown in FIG. 1A or FIG. 1B) may be connected to terminal B. Converter circuitry 102F may include an additional terminal (e.g., terminal A) that is located between a plurality of switches of converter circuitry 102F (e.g., between a third branch of converter circuitry 102F and a fourth branch of converter circuitry 102F, where each branch may include at least one switch connected between two terminals). One or more dampening circuits (e.g., dampening circuitry 104 shown in FIG. 1A or FIG. 1B) may be connected to terminal A. For example, one or more dampening circuits (e.g., dampening circuitry 104 shown in FIG. 1A or FIG. 1B) may be connected to terminal A, for example, if terminal A or terminal X are connected to the ground or a ground potential. In some examples, terminal B (which may be the same as terminal Y) may be connected to the ground or a ground potential.

As explained above, converter circuitry 102 (e.g., converter circuitry 102A-102F) may have N levels of converter circuitry where N is any appropriate number. The converter circuitry with N levels may have a plurality of output levels. For example, converter circuitry with N levels may have N output levels.

Figure 2G:
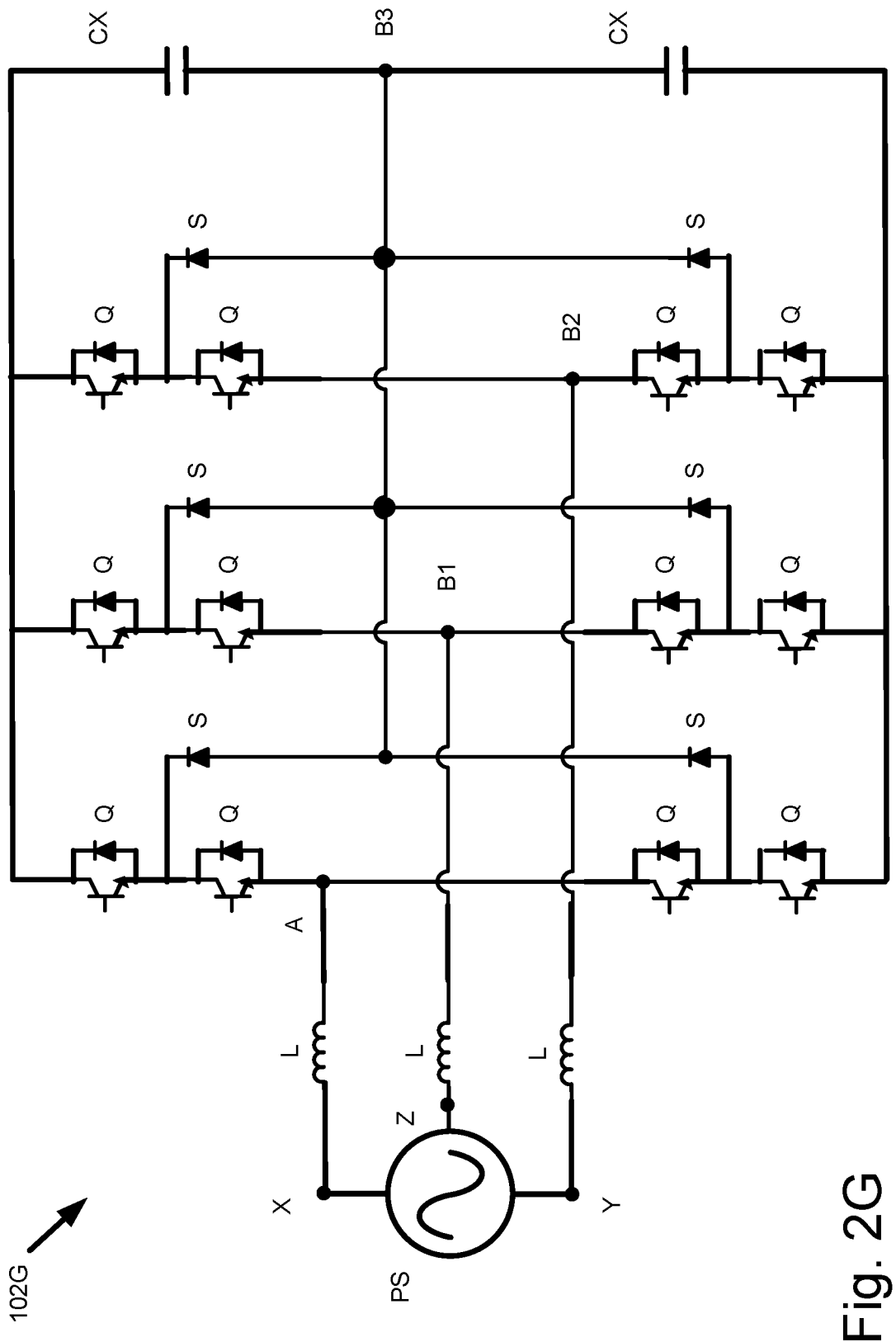
FIG. 2G shows example converter circuitry.
Figure 2H:
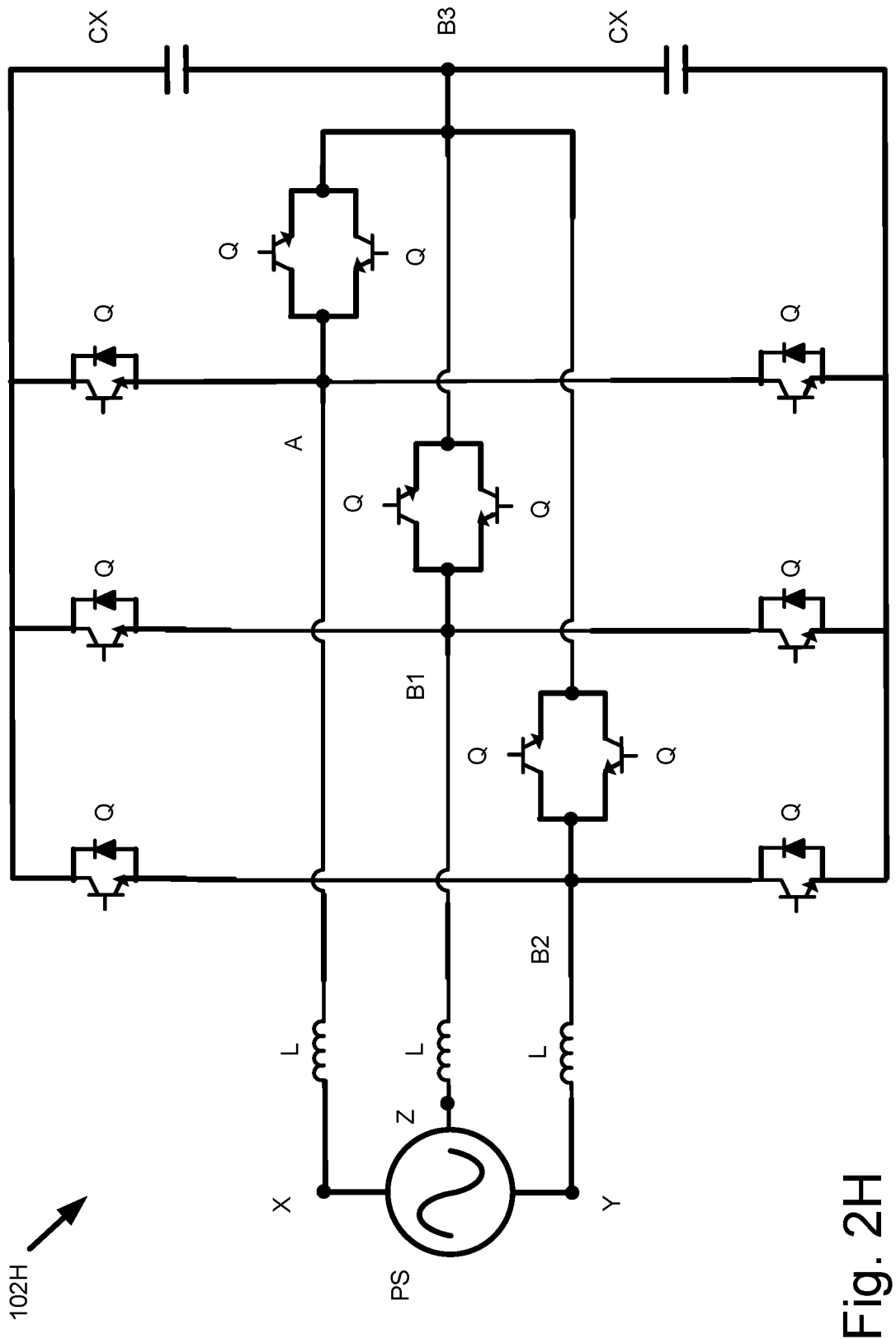
FIG. 2H shows example converter circuitry.
Figure 2I:
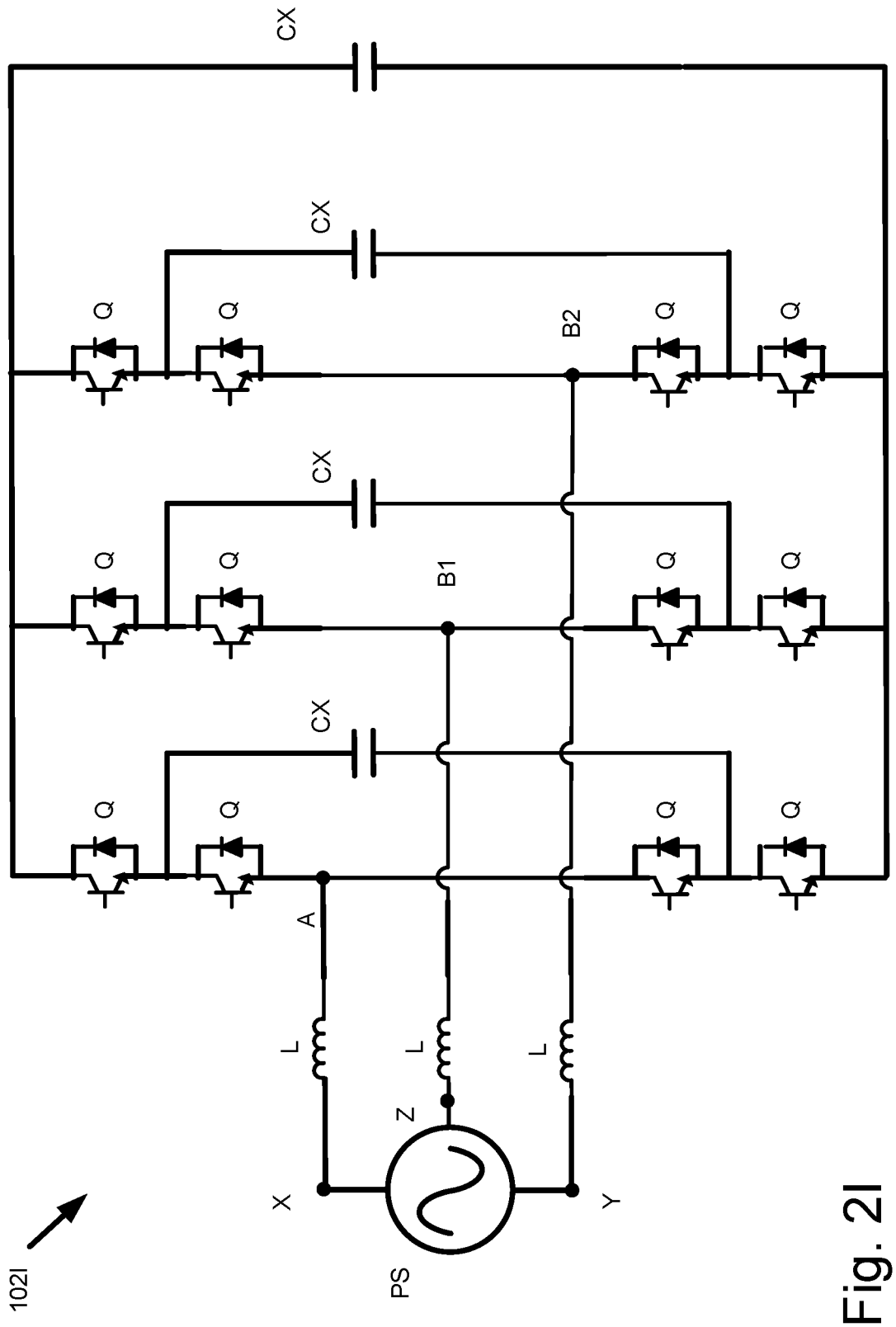
FIG. 2I shows example converter circuitry.

FIG. 2G, FIG. 2H, and FIG. 2I show examples of converter circuitry with 3 levels. Converter circuitry 102G, 102H, and 102I respectively shown in FIG. 2G, FIG. 2H, and FIG. 2I may be implemented as converter circuitry 102 shown in FIG. 1A or FIG. 1B. FIG. 2G shows example converter circuitry 102G as a 3-level NPC converter. Power source PS may be a 3-phase AC power source. Converter circuitry 102G may include a plurality of inductors L (e.g., one connected to terminal X, one connected to terminal Y, and one connected to terminal Z), a plurality of switches Q, a plurality of diodes S, and a plurality of capacitors CX. Converter circuitry 102G may include a plurality of terminals B1, B2, and B3. Each of the plurality of terminals B1, B2, and B3 may be located between a plurality of switches of converter circuitry 102G. One or more dampening circuits (e.g., dampening circuitry 104 shown in FIG. 1A or FIG. 1B) may be connected to one or more of terminals B1, B2, and B3 (e.g., between a first branch of converter circuitry 102G and a second branch of converter circuitry 102G, where each branch may include at least one switch connected between two terminals). For example, a first dampening circuit (e.g., dampening circuitry 104 shown in FIG. 1A or FIG. 1B) may be connected to terminal B1, a second dampening circuit (e.g., dampening circuitry 104 shown in FIG. 1A or FIG. 1B) may be connected to terminal B2, and a third dampening circuit (e.g., dampening circuitry 104 shown in FIG. 1A or FIG. 1B) may be connected to terminal B3. Converter circuitry 102G may include an additional terminal (e.g., terminal A) that is located between a plurality of switches of converter circuitry 102G (e.g., between a third branch of converter circuitry 102G and a fourth branch of converter circuitry 102G, where each branch may include at least one switch connected between two terminals). One or more dampening circuits (e.g., dampening circuitry 104 shown in FIG. 1A or FIG. 1B) may be connected to terminal A. For example, one or more dampening circuits (e.g., dampening circuitry 104 shown in FIG. 1A or FIG. 1B) may be connected to terminal A, for example, if terminal A or terminal X are connected to the ground or a ground potential. In some examples, terminal B1, terminal B2, terminal B3, terminal Y, or terminal Z may be connected to the ground or a ground potential.

FIG. 2H shows example converter circuitry 102H as a 3-level TNPC converter. Power source PS may be a 3-phase AC power source. Converter circuitry 102H may include a plurality of inductors L (e.g., one connected to terminal X, one connected to terminal Y, and one connected to terminal Z), a plurality of switches Q, and a plurality of capacitors CX. Converter circuitry 102H may include a plurality of terminals B1, B2, and B3. Each of the plurality of terminals B1, B2, and B3 may be located between a plurality of switches of converter circuitry 102H. One or more dampening circuits (e.g., dampening circuitry 104 shown in FIG. 1A or FIG. 1B) may be connected to one or more of terminals B1, B2, and B3 (e.g., between a first branch of converter circuitry 102H and a second branch of converter circuitry 102H, where each branch may include at least one switch connected between two terminals). For example, a first dampening circuit (e.g., dampening circuitry 104 shown in FIG. 1A or FIG. 1B) may be connected to terminal B1, a second dampening circuit (e.g., dampening circuitry 104 shown in FIG. 1A or FIG. 1B) may be connected to terminal B2, and a third dampening circuit (e.g., dampening circuitry 104 shown in FIG. 1A or FIG. 1B) may be connected to terminal B3. Converter circuitry 102H may include an additional terminal (e.g., terminal A) that is located between a plurality of switches of converter circuitry 102H (e.g., between a third branch of converter circuitry 102H and a fourth branch of converter circuitry 102H, where each branch may include at least one switch connected between two terminals). One or more dampening circuits (e.g., dampening circuitry 104 shown in FIG. 1A or FIG. 1B) may be connected to terminal A. For example, one or more dampening circuits (e.g., dampening circuitry 104 shown in FIG. 1A or FIG. 1B) may be connected to terminal A, for example, if terminal A or terminal X are connected to the ground or a ground potential. In some examples, terminal B1, terminal B2, terminal B3, terminal Y, or terminal Z may be connected to the ground or a ground potential.

FIG. 2I shows example converter circuitry 102I as a 3-level flying capacitor converter. Power source PS may be a 3-phase AC power source. Converter circuitry 102I may include a plurality of inductors L (e.g., one connected to terminal X, one connected to terminal Y, and one connected to terminal Z), a plurality of switches Q, and a plurality of capacitors CX. Converter circuitry 102I may include a plurality of terminals B1 and B2. Each of the plurality of terminals B1 and B2 may be located between a plurality of switches of converter circuitry 102I. One or more dampening circuits (e.g., dampening circuitry 104 shown in FIG. 1A or FIG. 1B) may be connected to one or more of terminals B1 and B2 (e.g., between a first branch of converter circuitry 102I and a second branch of converter circuitry 102I, where each branch may include at least one switch connected between two terminals). For example, a first dampening circuit (e.g., dampening circuitry 104 shown in FIG. 1A or FIG. 1B) may be connected to terminal B1, and a second dampening circuit (e.g., dampening circuitry 104 shown in FIG. 1A or FIG. 1B) may be connected to terminal B2. Converter circuitry 102I may include an additional terminal (e.g., terminal A) that is located between a plurality of switches of converter circuitry 102I (e.g., between a third branch of converter circuitry 102I and a fourth branch of converter circuitry 102I, where each branch may include at least one switch connected between two terminals). One or more dampening circuits (e.g., dampening circuitry 104 shown in FIG. 1A or FIG. 1B) may be connected to terminal A. For example, one or more dampening circuits (e.g., dampening circuitry 104 shown in FIG. 1A or FIG. 1B) may be connected to terminal A, for example, if terminal A or terminal X are connected to the ground or a ground potential. In some examples, terminal B1, terminal B2, terminal B3, terminal Y, or terminal Z may be connected to the ground or a ground potential.

Figure 3A:
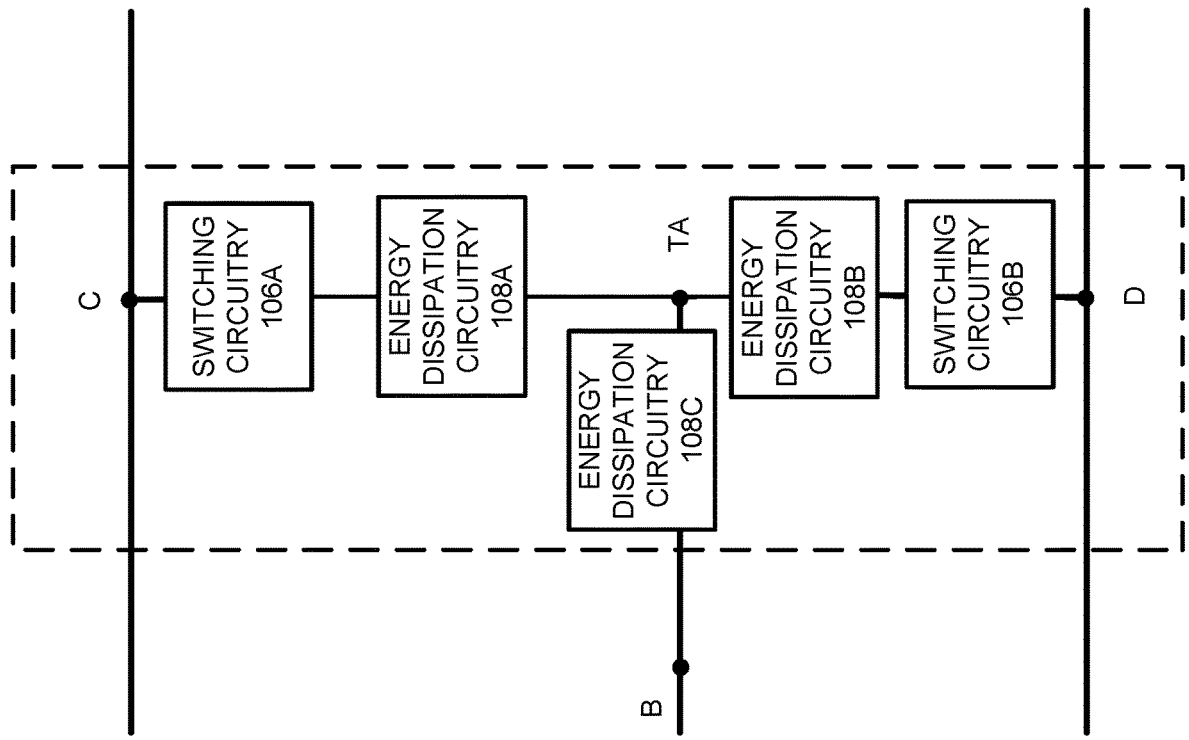
FIG. 3A shows example dampening circuitry.
Figure 3B:
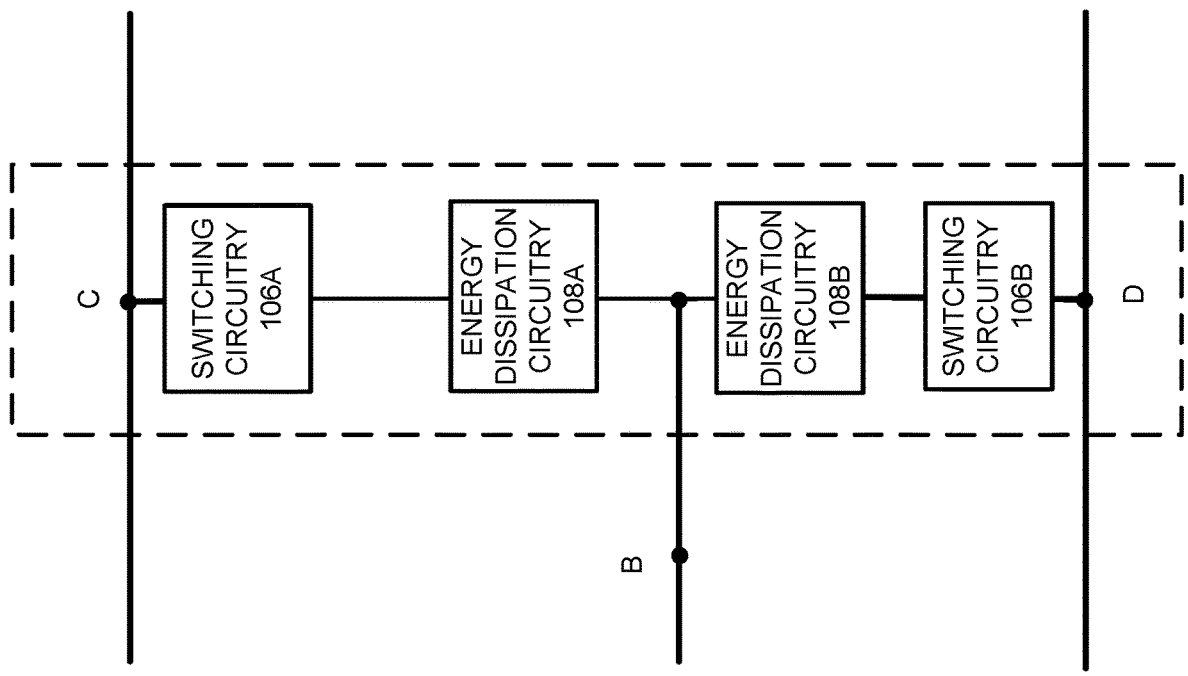
FIG. 3B shows example dampening circuitry.
Figure 3C:
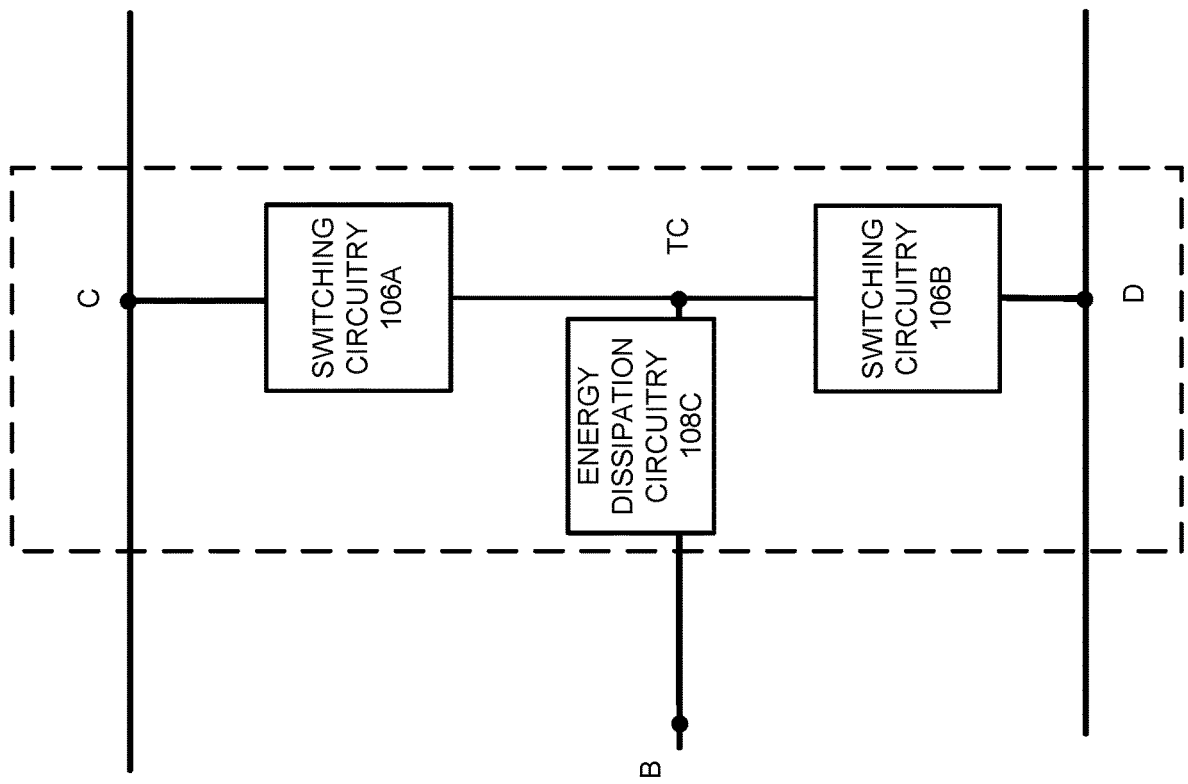
FIG. 3C shows example dampening circuitry.

FIG. 3A, FIG. 3B, and FIG. 3C show examples of dampening circuitry 104. Dampening circuitry 104A, 104B, and 104C respectively shown in FIG. 3A, FIG. 3B, and FIG. 3C may be implemented as dampening circuitry 104 shown in FIG. 1A or FIG. 1B. FIG. 3A shows dampening circuitry 104A. Dampening circuitry 104A may include a first branch of series-connected electrical elements between terminal C and terminal TA. The first branch may include switching circuitry 106A and energy dissipation circuitry 108A that are connected to each other in series. Switching circuitry 106A may have a first terminal connected to terminal C and a second terminal connected to a first terminal of energy dissipation circuitry 108A (e.g., as shown in FIG. 3A). A second terminal of energy dissipation circuitry 108A may be connected to terminal TA (e.g., as shown in FIG. 3A). The order of the electrical elements may be changed. For example, energy dissipation circuitry 108A may have a first terminal connected to terminal C and a second terminal connected to a first terminal of switching circuitry 106A, and a second terminal of switching circuitry 106A may be connected to terminal TA.

Switching circuitry 106A may be arranged to be switched to make or break an electrical pathway between terminal C and terminal TA (e.g., via energy dissipation circuitry 108A). For example, switching circuitry 106A may be switched ON to make an electrical connection between terminal C and terminal TA, and may be switched OFF to break an electrical connection between terminal C and terminal TA (or vice versa).

Dampening circuitry 104A may include a second branch of series-connected electrical elements between terminal D and terminal TA. The second branch may include switching circuitry 106B and energy dissipation circuitry 108B that are connected to each other in series. Switching circuitry 106B may have a first terminal connected to terminal D and a second terminal connected to a first terminal of energy dissipation circuitry 108B (e.g., as shown in FIG. 3A). A second terminal of energy dissipation circuitry 108B may be connected to terminal TA (e.g., as shown in FIG. 3A). In other examples, the order of the electrical elements may be changed. For example, energy dissipation circuitry 108B may have a first terminal connected to terminal D and a second terminal connected to a first terminal of switching circuitry 106B, and a second terminal of switching circuitry 106B may be connected to terminal TA.

Switching circuitry 106B may be arranged to be switched to make or break an electrical pathway between terminal D and terminal TA (e.g., via energy dissipation circuitry 108B). For example, switching circuitry 106B may be switched ON to make an electrical connection between terminal D and terminal TA, and may be switched OFF to break an electrical connection between terminal D and terminal TA (or vice versa).

Dampening circuitry 104A may include a third branch of one or more electrical elements between terminal B and terminal TA. The third branch may include energy dissipation circuitry 108C. Energy dissipation circuitry 108C may have a first terminal connected to terminal B and a second terminal connected to terminal TA.

If there is an electrical connection between terminal C and terminal TA (e.g., switching circuitry 106A is switched ON) and no electrical connection between terminal D and terminal TA (e.g., switching circuitry 106B is switched OFF), energy dissipation circuitry 108C may be connected in series with the first branch (e.g., switching circuitry 106A and energy dissipation circuitry 108A) and there may be an electrical connection between terminal C and terminal B. If there is an electrical connection between terminal D and terminal TA (e.g., switching circuitry 106B is switched ON) and no electrical connection between terminal C and terminal TA (e.g., switching circuitry 106A is switched OFF), energy dissipation circuitry 108C may be connected in series with the second branch (e.g., switching circuitry 106B and energy dissipation circuitry 108B) and there may be an electrical connection between terminal D and terminal B.

Terminal B may be located between a plurality of switches of converter circuitry (e.g., between a first branch of converter circuitry 102 and a second branch of the converter circuitry 102 shown in FIG. 1A or FIG. 1B). Dampening circuit 104A may be connected to the converter circuitry at terminal B. An end of the first electrical pathway (via the first branch and the third branch) may connect to terminal B (between terminal C and terminal B), and an end of the second electrical pathway (via the second branch and the third branch) may connect to terminal B (between terminal D and terminal B).

FIG. 3B shows example dampening circuitry 104B. Dampening circuitry 104B may be similar to other dampening circuitry 104 (e.g., dampening circuitry 104A), except that dampening circuitry 104B might not include energy dissipation circuitry 108C of dampening circuitry 104A.

Dampening circuitry 104B may include a first branch of series-connected electrical elements between terminal C and terminal B. The first branch may include switching circuitry 106A and energy dissipation circuitry 108A that are connected to each other in series. Switching circuitry 106A may have a first terminal connected to terminal C and a second terminal connected to a first terminal of energy dissipation circuitry 108A (e.g., as shown in FIG. 3B). A second terminal of energy dissipation circuitry 108A may be connected to terminal B (e.g., as shown in FIG. 3B). In other examples, the order of the electrical elements may be changed. For example, energy dissipation circuitry 108A may have a first terminal connected to terminal C and a second terminal connected to a first terminal of switching circuitry 106A, and a second terminal of switching circuitry 106A may be connected to terminal B.

Switching circuitry 106A may be arranged to be switched to make or break an electrical pathway between terminal C and terminal B (e.g., via energy dissipation circuitry 108A). For example, switching circuitry 106A may be switched ON to make an electrical connection between terminal C and terminal B, and may be switched OFF to break an electrical connection between terminal C and terminal B (or vice versa).

Dampening circuitry 104B may include a second branch of series-connected electrical elements between terminal D and terminal B. The second branch may include switching circuitry 106B and energy dissipation circuitry 108B that are connected to each other in series. Switching circuitry 106B may have a first terminal connected to terminal D and a second terminal connected to a first terminal of energy dissipation circuitry 108B (e.g., as shown in FIG. 3B). A second terminal of energy dissipation circuitry 108B may be connected to terminal B. In other examples, the order of the electrical elements may be changed. For example, energy dissipation circuitry 108B may have a first terminal connected to terminal D and a second terminal connected to a first terminal of switching circuitry 106B, and a second terminal of switching circuitry 106B may be connected to terminal B.

Switching circuitry 106B may be arranged to be switched to make or break an electrical pathway between terminal D and terminal B (e.g., via energy dissipation circuitry 108B). For example, switching circuitry 106B may be switched ON to make an electrical connection between terminal D and terminal B, and may be switched OFF to break an electrical connection between terminal D and terminal B (or vice versa).

Terminal B may be located between a plurality of switches of converter circuitry (e.g., between a first branch of converter circuitry 102 and a second branch of converter circuitry 102 shown in FIG. 1A or FIG. 1B). Dampening circuit 104B may be connected to the converter circuitry at terminal B. An end of the first electrical pathway (via the first branch) may connect to terminal B (between terminal C and terminal B), and an end of the second electrical pathway (via the second branch) may connect to terminal B (between terminal D and terminal B).

The first branch of series-connected electrical elements of dampening circuitry 104B between terminal C and terminal B may be arranged in parallel with a first branch of the converter circuitry also connected between terminal C and terminal B (which may include a first switch of the converter circuitry). The second branch of series connected electrical elements of dampening circuitry 104B between terminal D and terminal B may be arranged in parallel with a second branch of the converter circuitry also connected between terminal D and terminal B (which may include a second switch of the converter circuitry).

FIG. 3C shows example dampening circuitry 104C. Dampening circuitry 104C may be similar to other dampening circuitry 104 (e.g., dampening circuitry 104A), except that dampening circuitry 104C might not include energy dissipation circuitry 108A and energy dissipation circuitry 108B.

Dampening circuitry 104C may include a first branch of one or more electrical elements between terminal C and terminal TC. The first branch may include switching circuitry 106A. Switching circuitry 106A may have a first terminal connected to terminal C and a second terminal connected to terminal TC.

Switching circuitry 106A may be arranged to be switched to make or break an electrical pathway between terminal C and terminal TC. For example, switching circuitry 106A may be switched ON to make an electrical connection between terminal C and terminal TC, and may be switched OFF to break an electrical connection between terminal C and terminal TC (or vice versa).

Dampening circuitry 104C may include a second branch of one or more electrical elements between terminal D and terminal TC. The second branch may include switching circuitry 106B. Switching circuitry 106B may have a first terminal connected to terminal D and a second terminal connected to terminal TC.

Switching circuitry 106B may be arranged to be switched to make or break an electrical pathway between terminal D and terminal TC. For example, switching circuitry 106B may be switched ON to make an electrical connection between terminal D and terminal TC, and may be switched OFF to break an electrical connection between terminal D and terminal TC (or vice versa).

Dampening circuitry 104C may include a third branch of one or more electrical elements between terminal B and terminal TA. The third branch may include energy dissipation circuitry 108C. Energy dissipation circuitry 108C may have a first terminal connected to terminal B and a second terminal connected to terminal TC.

If there is an electrical connection between terminal C and terminal TC (e.g., switching circuitry 106A is switched ON) and no electrical connection between terminal D and terminal TC (e.g., switching circuitry 106B is switched OFF), energy dissipation circuitry 108C may be connected in series with the first branch (e.g., switching circuitry 106A) and there may be an electrical connection between terminal C and terminal B. If there is an electrical connection between terminal D and terminal TC (e.g., switching circuitry 106B is switched ON) and no electrical connection between terminal C and terminal TC (e.g., switching circuitry 106A is switched OFF), energy dissipation circuitry 108C may be connected in series with the second branch (e.g., switching circuitry 106B) and there may be an electrical connection between terminal D and terminal B.

Terminal B may be located between a plurality of switches of converter circuitry (e.g., between a first branch of converter circuitry 102 and a second branch of converter circuitry 102 shown in FIG. 1A or FIG. 1B). Dampening circuit 104C may be connected to the converter circuitry at terminal B. An end of the first electrical pathway (via the first branch and the third branch) may connect to terminal B (between terminal C and terminal B), and an end of the second electrical pathway (via the second branch and the third branch) may connect to terminal B (between terminal D and terminal B).

Figure 4A:
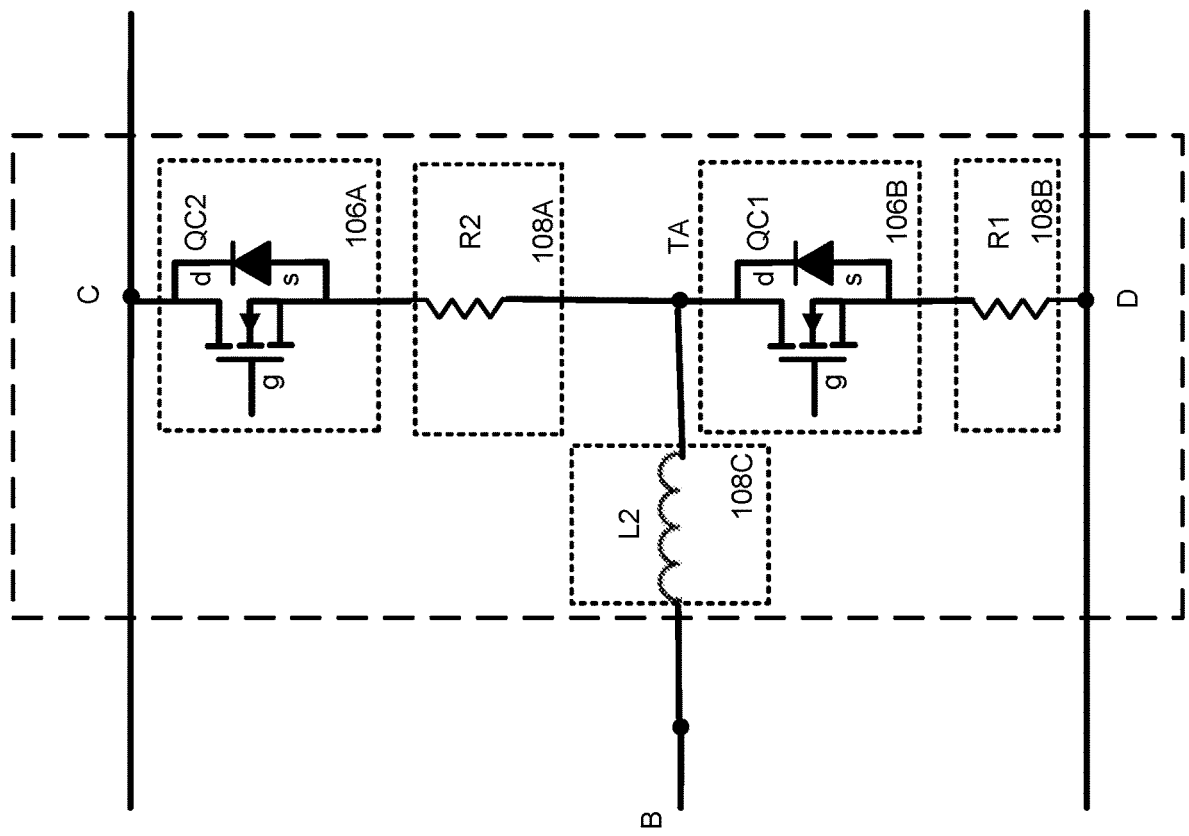
FIG. 4A shows example dampening circuitry.

FIG. 4A, FIG. 4B, FIG. 4C, and FIG. 4D show examples of dampening circuitry. Dampening circuitry 104AA, 104BA, 104CA, and 104CB respectively shown in FIG. 4A, FIG. 4B, FIG. 4C, and FIG. 4D may be implemented as dampening circuitry 104 shown in FIG. 1A or FIG. 1B. FIG. 4A shows dampening circuitry 104AA. Dampening circuitry 104AA may be an example of dampening circuitry 104A. Switching circuitry 106A may be switch QC2, switching circuitry 106B may be switch QC1, energy dissipation circuitry 108A may be resistor R2, energy dissipation circuitry 108B may be resistor R1, and energy dissipation circuitry 108C may be inductor L2 (e.g., as show in FIG. 4A).

Figure 4B:
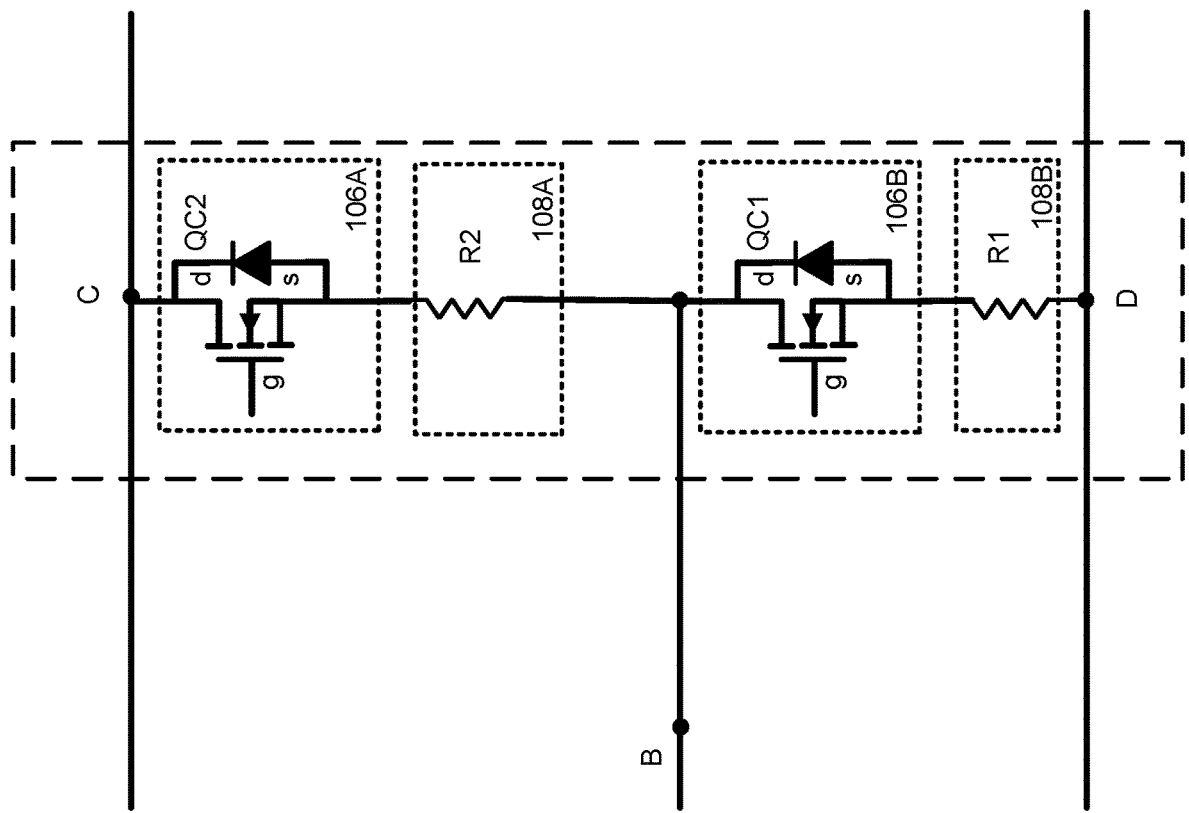
FIG. 4B shows example dampening circuitry.

FIG. 4B shows dampening circuitry 104BA. Dampening circuitry 104BA may be an example of dampening circuitry 104B. Switching circuitry 106A may be switch QC2, switching circuitry 106B may be switch QC1, energy dissipation circuitry 108A may be resistor R2, and energy dissipation circuitry 108B may be resistor R1 (as shown in FIG. 4B). The first branch of series-connected electrical elements of dampening circuitry 104BA between terminal C and terminal B may be arranged in parallel with a first branch of the converter circuitry also connected between terminal C and terminal B (which may include a first switch of the converter circuitry). The second branch of series connected electrical elements of dampening circuitry 104BA between terminal D and terminal B may be arranged in parallel with a second branch of the converter circuitry also connected between terminal D and terminal B (which may include a second switch of the converter circuitry).

Figure 4C:
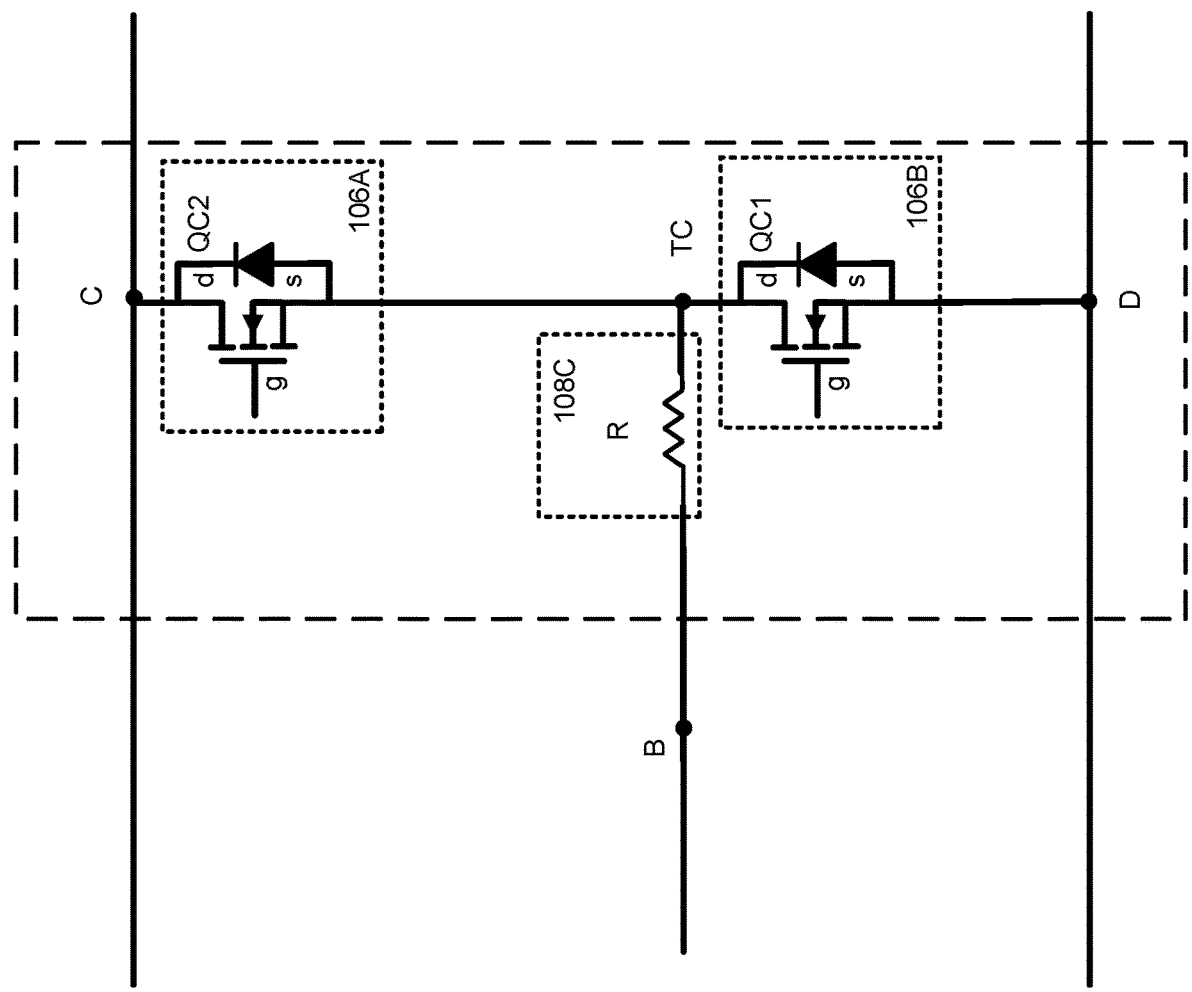
FIG. 4C shows example dampening circuitry.

FIG. 4C shows example dampening circuitry 104CA. Dampening circuitry 104CA may be an example of dampening circuitry 104C. Switching circuitry 106A may be switch QC2, switching circuitry 106B may be switch QC1, and energy dissipation circuitry 108C may be resistor R (as shown in FIG. 4C).

Figure 4D:
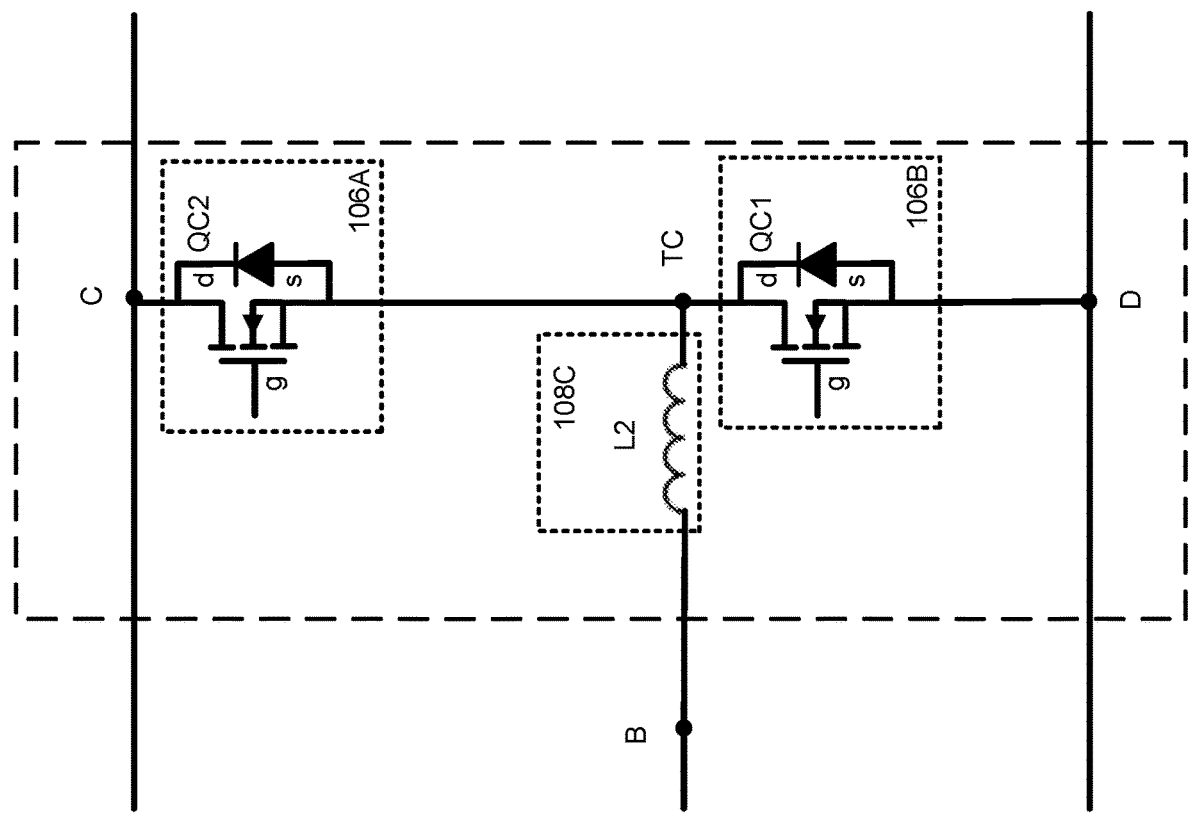
FIG. 4D shows example dampening circuitry.

FIG. 4D shows example dampening circuitry 104CB. Dampening circuitry 104CB may be an example of dampening circuitry 104C. Switching circuitry 106A may be switch QC2, switching circuitry 106B may be switch QC1, and energy dissipation circuitry 108C may be inductor L2 (as shown in FIG. 4D).

Figure 5A:
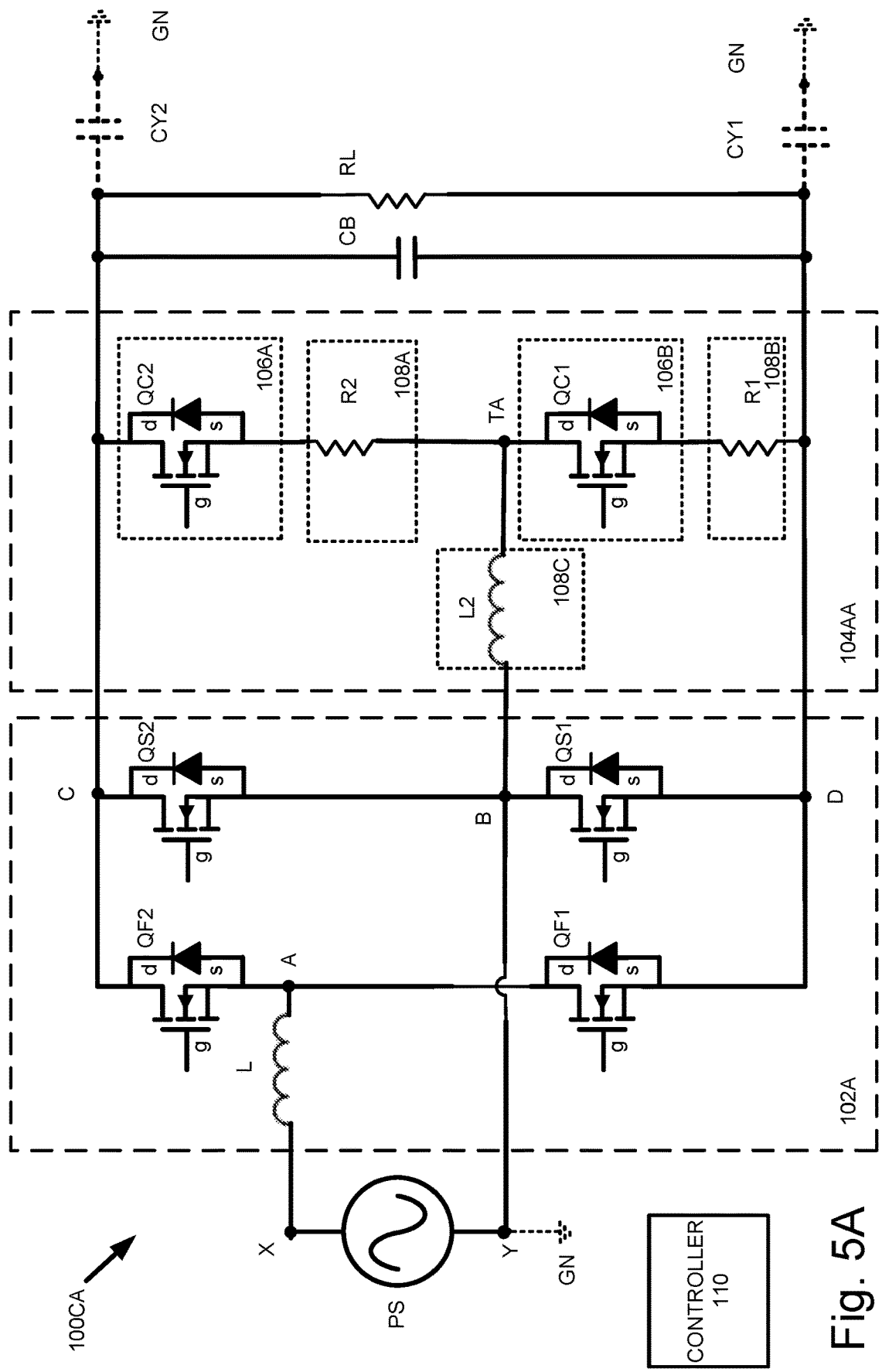
FIG. 5A shows an example power conversion system.

FIG. 5A, FIG. 5B, FIG. 5C, and FIG. 5D show examples of a power conversion system. FIG. 5A shows example power conversion system 100CA. Converter circuitry 102 (e.g., shown in FIG. 1A or FIG. 1B) may be converter circuitry 102A, and dampening circuitry 104 (e.g., shown in FIG. 1A or FIG. 1B) may be dampening circuitry 104AA. Controller 110 (e.g., shown in FIG. 1A, FIG. 1B) may be controller 110 shown in FIG. 5A. Controller 110 may be configured to control one or more switching elements (e.g., one or more switches) of the power conversion system 100CA.

Figure 5B:
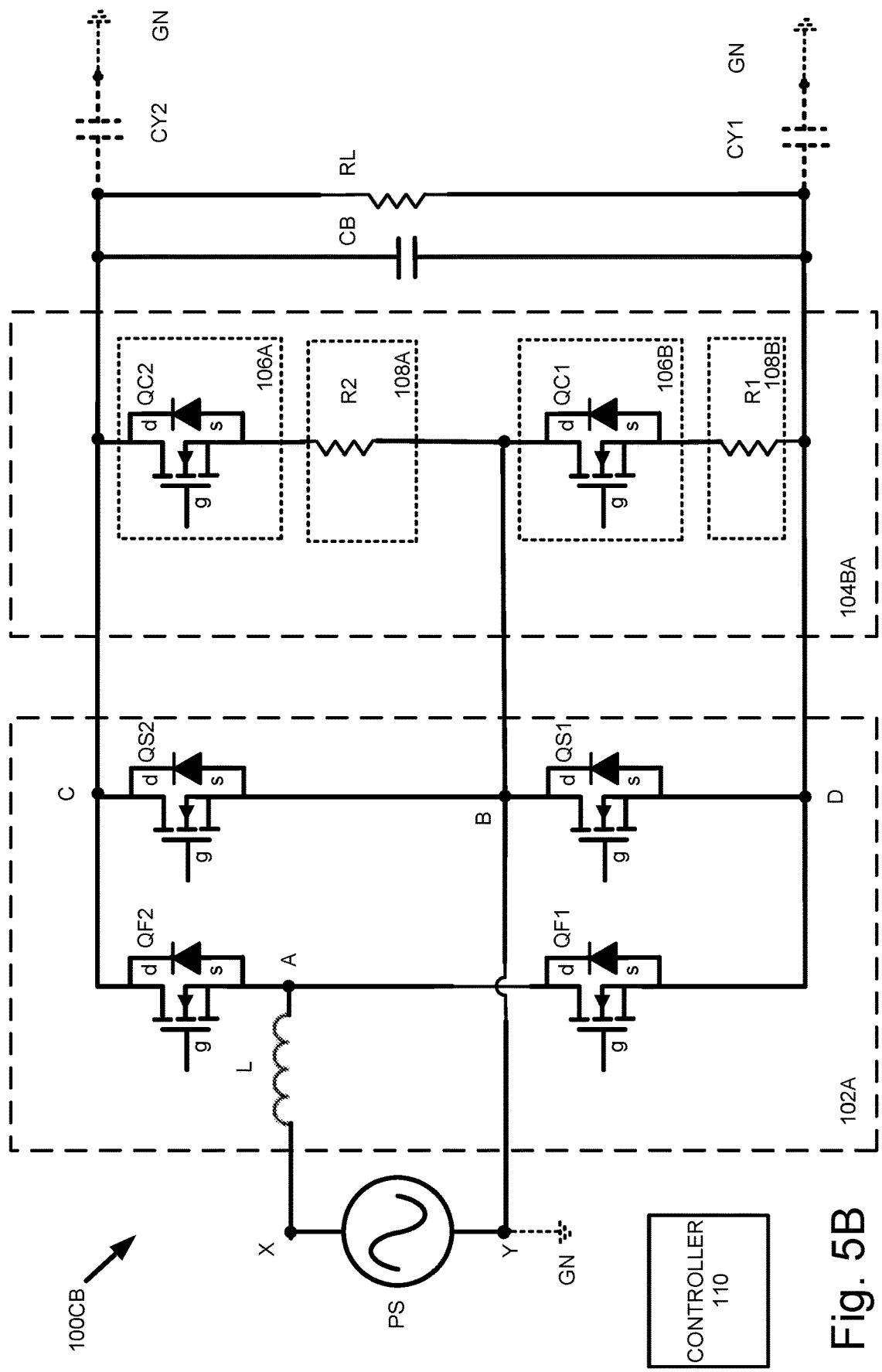
FIG. 5B shows an example power conversion system.

FIG. 5B shows example power conversion system 100CB. Converter circuitry 102 (e.g., shown in FIG. 1A or FIG. 1B) may be converter circuitry 102A, and dampening circuitry 104 (e.g., shown in FIG. 1A or FIG. 1B) may be dampening circuitry 104BA. Controller 110 (e.g., shown in FIG. 1A, FIG. 1B) may be controller 110 shown in FIG. 5B. The first branch of series-connected electrical elements of dampening circuitry 104BA between terminal C and terminal B may be arranged in parallel with a first branch of converter circuitry 102A also connected between terminal C and terminal B (which may include switch QS2 of converter circuitry 102A). The second branch of series-connected electrical elements of dampening circuitry 104BA between terminal D and terminal B may be arranged in parallel with a second branch of converter circuitry 102A also connected between terminal D and terminal B (which may include switch QS1 of converter circuitry 102A). Controller 110 may be configured to control one or more switching elements (e.g., one or more switches) of power conversion system 100CA.

Figure 5C:
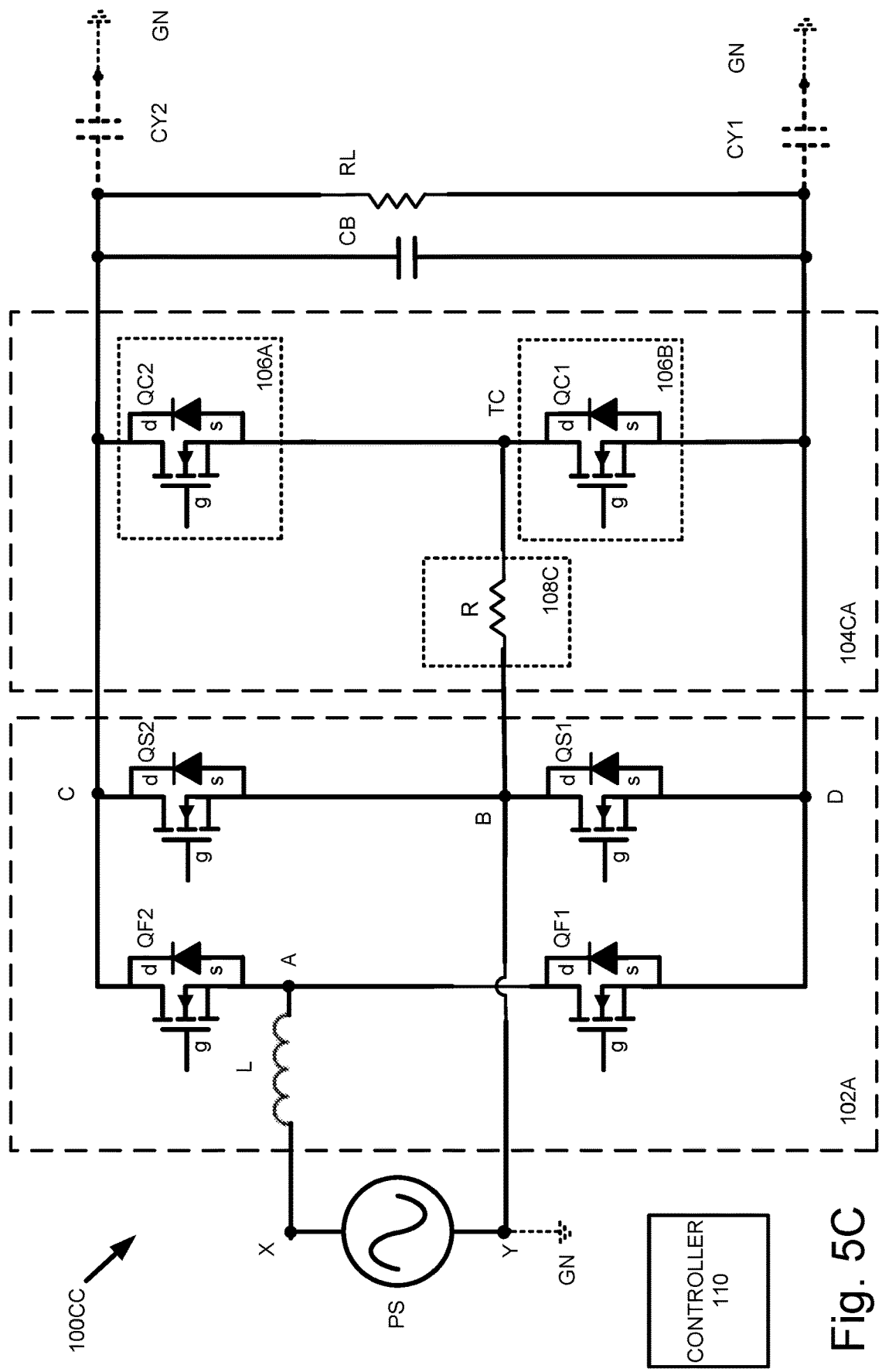
FIG. 5C shows an example power conversion system.

FIG. 5C shows example power conversion system 100CC. Converter circuitry 102 (e.g., shown in FIG. 1A or FIG. 1B) may be converter circuitry 102A, and dampening circuitry 104 (e.g., shown in FIG. 1A or FIG. 1B) may be dampening circuitry 104CA. Controller 110 (e.g., shown in FIG. 1A, FIG. 1B) may be controller 110 shown in FIG. 5C. Controller 110 may be configured to control one or more switching elements (e.g., one or more switches) of power conversion system 100CA.

Figure 5D:
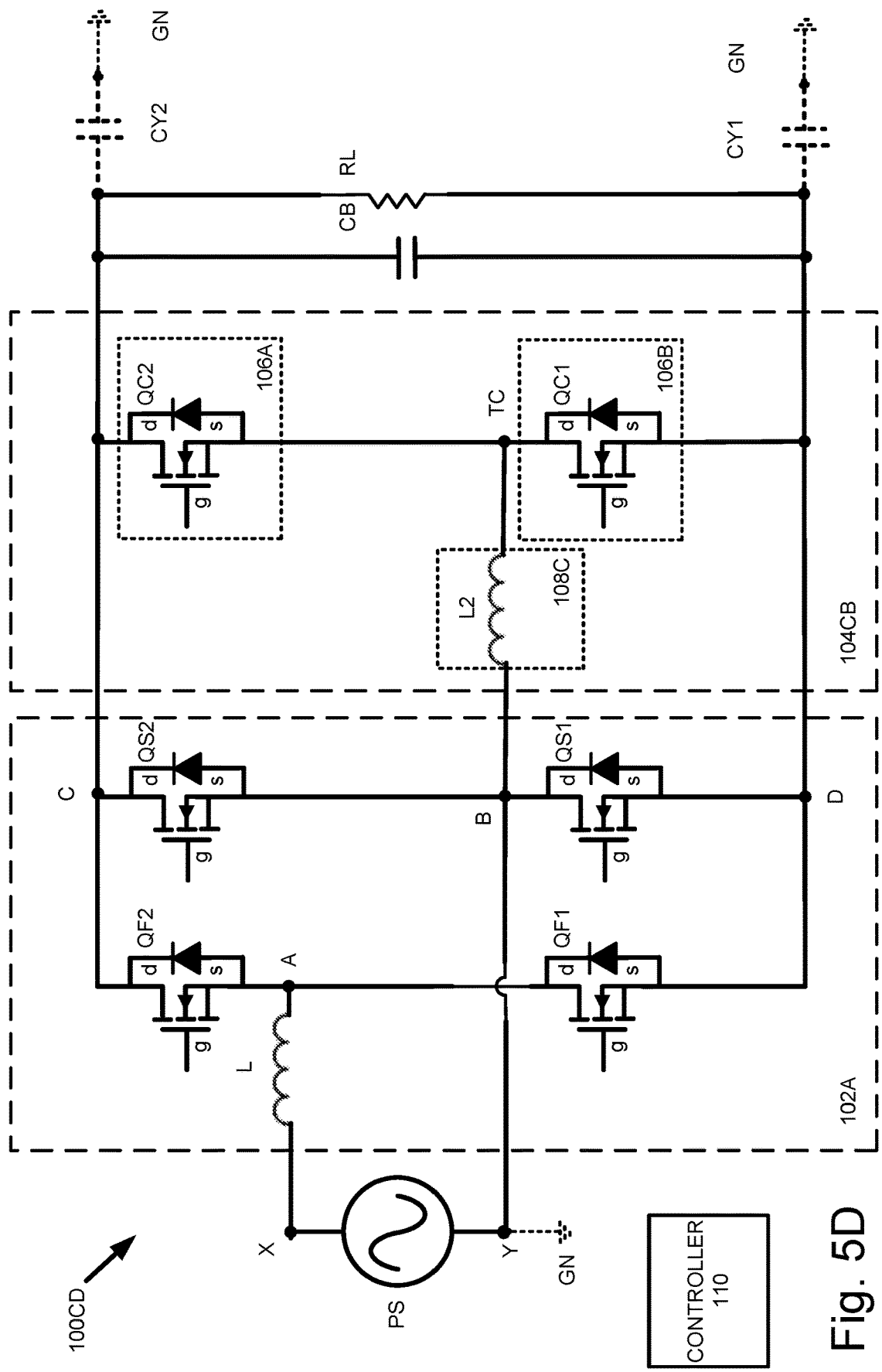
FIG. 5D shows an example power conversion system.

FIG. 5D shows example power conversion system 100CD. Converter circuitry 102 (e.g., shown in FIG. 1A or FIG. 1B) may be converter circuitry 102A, and dampening circuitry 104 (e.g., shown in FIG. 1A or FIG. 1B) may be dampening circuitry 104CB. Controller 110 (e.g., shown in FIG. 1A, FIG. 1B) may be controller 110 shown in FIG. 5D. Controller 110 may be configured to control one or more switching elements (e.g., one or more switches) of power conversion system 100CA.

Figure 6A:
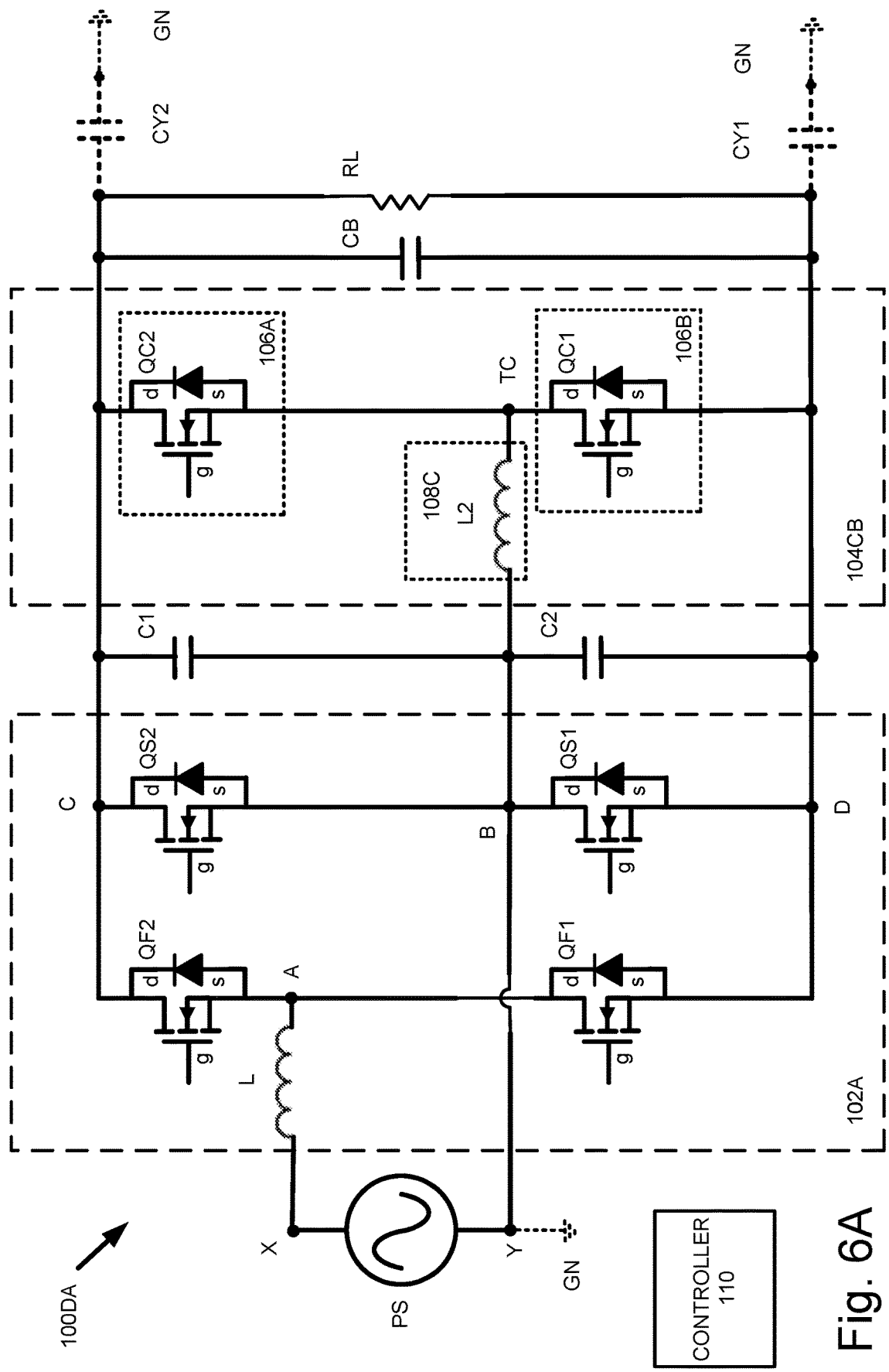
FIG. 6A shows an example power conversion system.
Figure 6B:
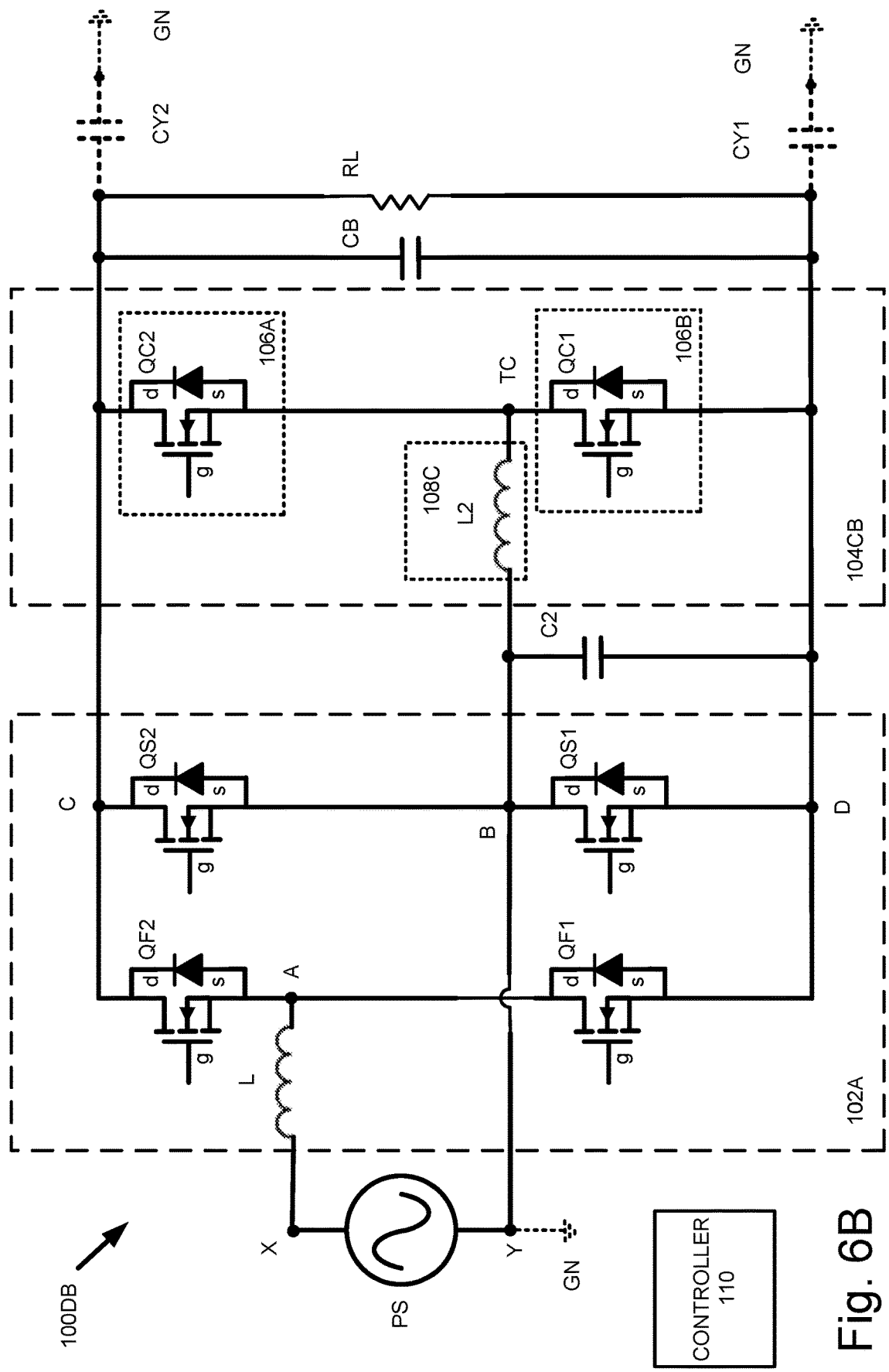
FIG. 6B shows an example power conversion system.
Figure 6C:
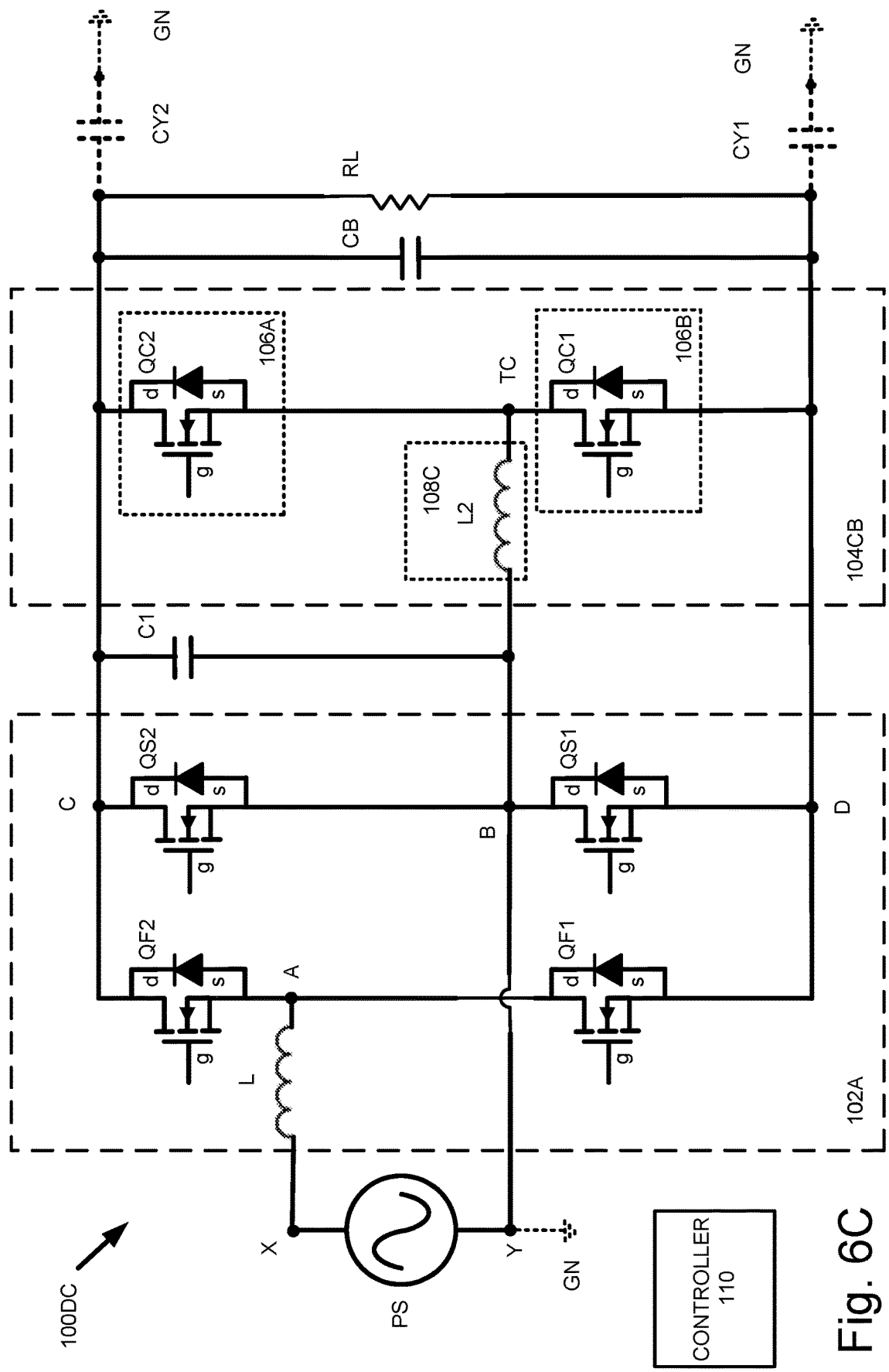
FIG. 6C shows an example power conversion system.

FIG. 6A, FIG. 6B, and FIG. 6C show examples of power conversion system. Controller 110 (e.g., shown in FIG. 1A, FIG. 1B) may be controller 110 shown in FIGS. 6A-6C. Controller 110 may be configured to control one or more switching elements (e.g., one or more switches) of the power conversion system 100.

Figure 6D:
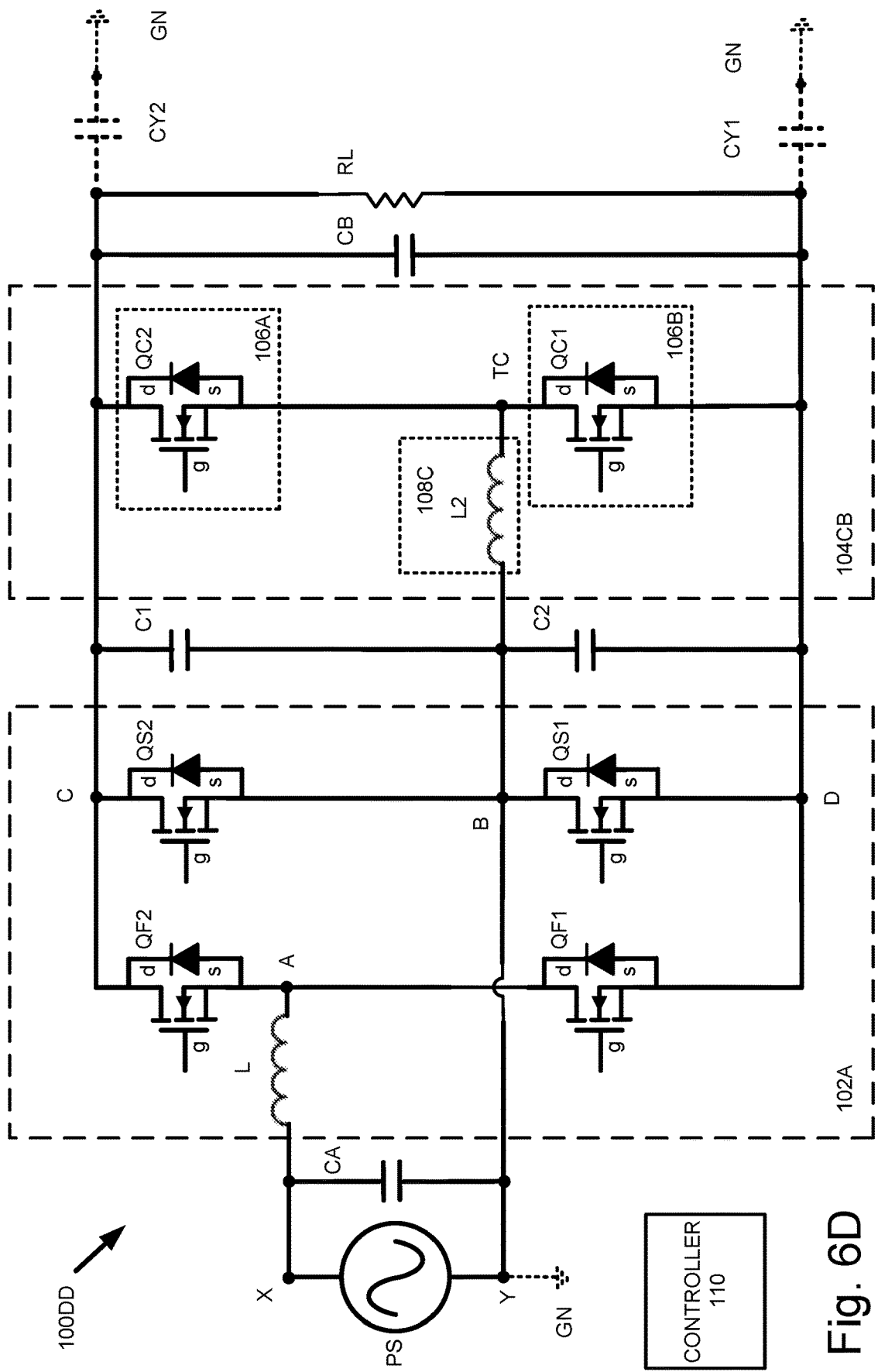
FIG. 6D shows an example power conversion system.

FIG. 6A shows example power conversion system 100DA. Power conversion system 100DA may be similar to other power conversion systems described herein. Power conversion system 100DA may include one or more capacitors C1, C2 connected to one or more of the DC terminals (e.g., terminals C and D) and to a terminal between converter circuitry 102A and dampening circuitry 104CB. First capacitor C1 may have a first terminal connected to terminal C and a second terminal connected to terminal B (e.g., as shown in FIG. 6A). Second capacitor C2 may have a first terminal connected to terminal D and a second terminal connected to terminal B (e.g., as shown in FIG. 6A). In some examples, power conversion system may have only one of capacitor C1 or capacitor C2 (e.g., other than parasitic capacitors, such as parasitic capacitors CY1 and CY2 as shown in FIG. 6A, or other capacitors, such as capacitors CA or CB). FIG. 6B shows example power conversion system 100DB that has capacitor C2 connected between terminal D and terminal B without having capacitor C1 between terminal C and terminal B. FIG. 6C shows example power conversion system 100DC that has capacitor C1 connected between terminal C and terminal B without having capacitor C2 between terminal D and terminal B. The one or more capacitors C1 and C2 may be arranged to reduce and/or limit ripples and to smooth voltage. FIG. 6D shows example power conversion system 100DD that has capacitor C1, capacitor C2, and capacitor CA connected between terminal X and terminal Y.

Figure 7:
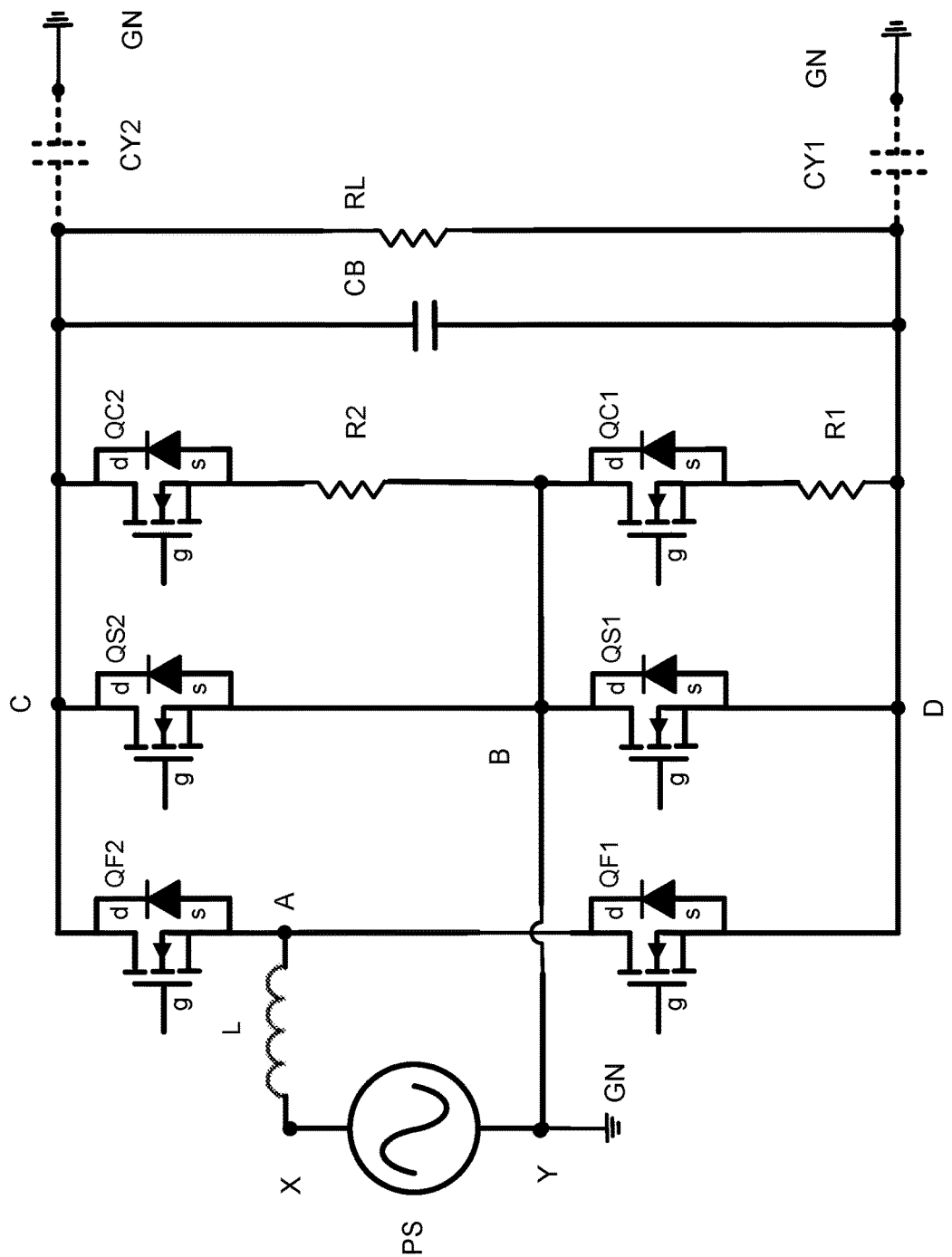
FIG. 7 shows an example power conversion system.

FIG. 7 shows example power conversion system 100E. Power conversion system 100E may be similar to other power systems described herein. Dashed lines delineating converter circuitry 102 (e.g., including inductor L and switches QF1, QF2, QS1, and QS2) and dampening circuitry 104 (e.g., including resistors R1 and R2 and switches QC1 and QC2) are not shown in FIG. 7. An example of a similar power conversion system showing the dashed lines delineating converter circuitry 102 and dampening circuitry 104 is power conversion system 100CB shown in FIG. 5B. Power conversion system 100E will be used as the basis for example operations of power conversion systems shown in FIG. 8A to FIG. 8L. Controller 110 (e.g., shown in FIG. 1A, FIG. 1B) may be controller 110 shown in FIG. 7. Controller 110 may be configured to control one or more switching elements (e.g., one or more switches) of power conversion system 100E.

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L show example operations of power conversion system 100E. Elements of power conversion system 100E that might not be associated with each figure's operation state (e.g., elements that may be switched OFF in a particular state) have been removed to simplify FIGS. 8A-8L. Current paths are indicated by arrows in the figures to describe example operations. Current paths of common mode current are indicated by dashed arrows in the figures to describe example operations. Controller 110 (e.g., shown in FIG. 1A, FIG. 1B) may be controller 110 shown in FIGS. 8A-8L. Controller 110 may be configured to control one or more switching elements (e.g., one or more switches) of power conversion system 100E.

Figure 8A:
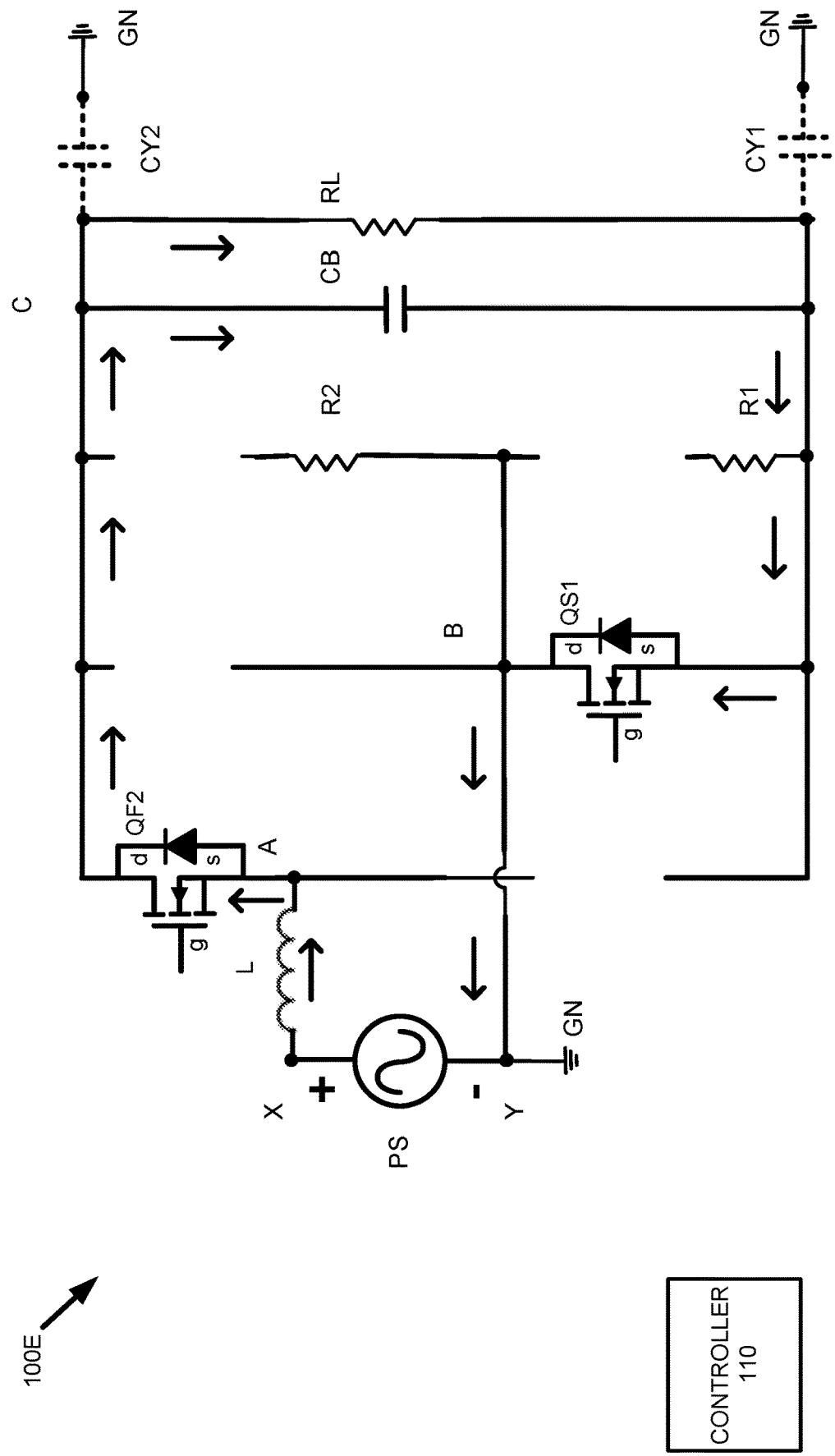
FIG. 8A shows an example power conversion system.
Figure 8B:
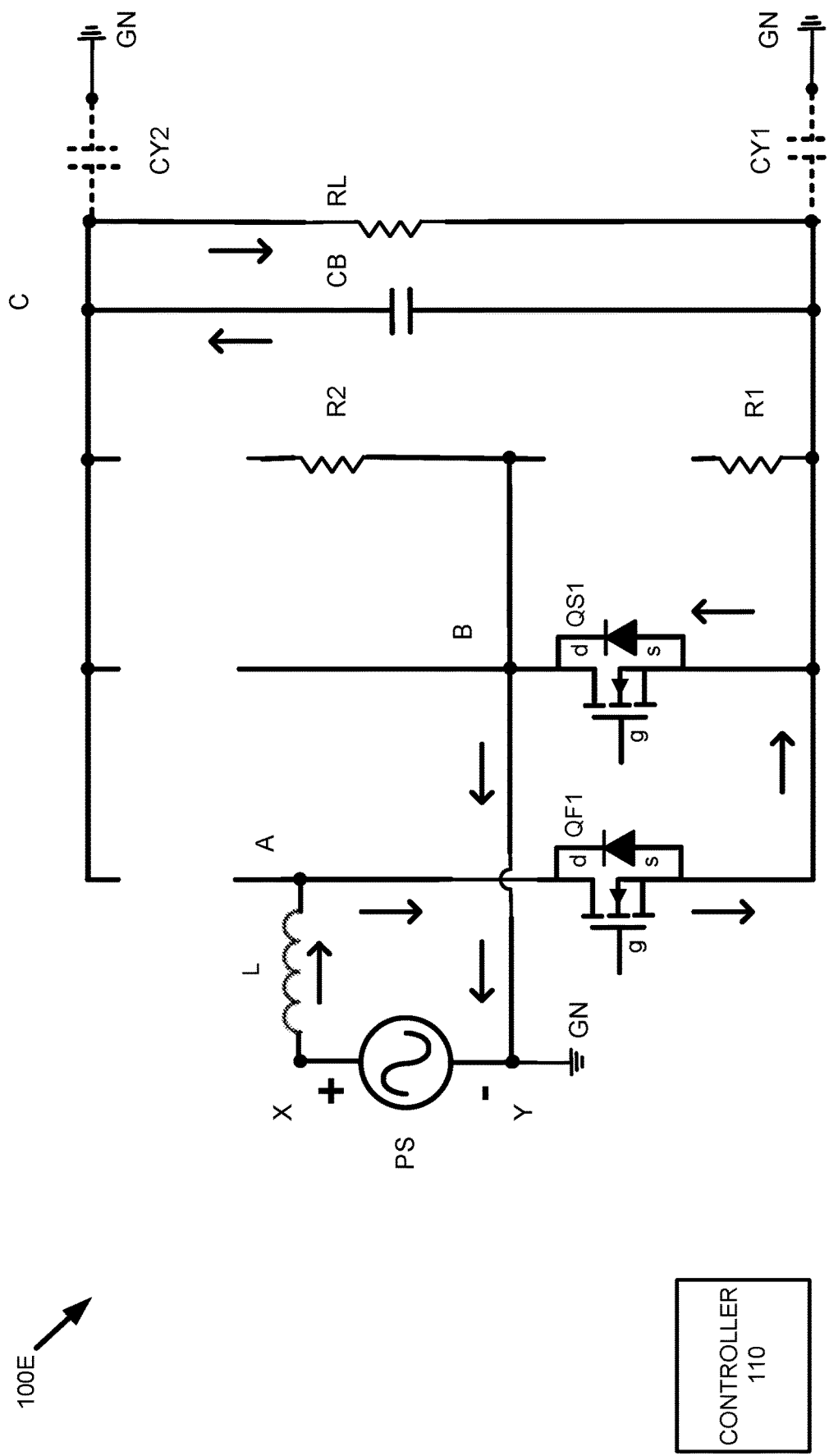
FIG. 8B shows an example power conversion system.

FIG. 8A and FIG. 8B show example power conversion system 100E during a positive half cycle. Power source PS may provide a positive output across the AC terminals (e.g., with a positive voltage potential on terminal X and a negative voltage potential on terminal Y). Switch QS1 may be switched ON and switch QF2 may also be switched ON. Switch QS1 may remain switched ON for a longer time period than switch QF2. For example, switch QS1 may be switched at a slower switching frequency than the switching frequency of switch QF2 (which may have a relatively faster switching frequency). The fast switches QF1 and QF2 may be operated with a relatively higher switching frequency (e.g., about 100 Hz, about 120 Hz, or any other appropriate relatively high frequency). The slow switches QS1 and QS2 may be operated with a relatively lower switching frequency (e.g., about 50 Hz, about 60 HZ, or any other appropriate relatively low frequency). The fast switches may be made of materials that enable relatively faster switching than the slow switches. As shown in FIG. 8B, during the positive half cycle, while switch QS1 is switched ON, switch QF2 may be switched OFF and switch QF1 may be switched ON. During the positive half cycle, switch QS1 may remain switched ON while switch QF2 and switch QF1 are switched ON in an alternating manner (e.g., if switch QF2 is switched ON, switch QF1 is switched OFF, and vice versa). During the positive half cycle, switch QS1 remains in a steady ON state while switch QF2 and switch QF1 are switched alternatingly.

If switch QS1 is switched ON and Switch QF2 is also switched ON (e.g., as shown in FIG. 8A), a current may flow from terminal X to terminal Y via switch QF2 and switch QS1 (e.g., as shown by the arrows in FIG. 8A). Load RL may receive power by a DC voltage across the DC terminals (e.g., terminals C and D). Capacitor CB may be charged (e.g., a positive voltage $V_{CD}$ across capacitor CB from terminal D to terminal C) by the voltage across the DC terminals in this state.

If switch QS1 is switched ON and Switch QF1 is also switched ON (e.g., as shown in FIG. 8B), a current may flow from terminal X to terminal Y via switch QF1 and switch QS1 (e.g., as shown by the arrows in FIG. 8B). Load RL may receive power by a DC voltage across the DC terminals (e.g., from capacitor CB). Capacitor CB may be discharged to provide a DC voltage to the load RL in this state.

As shown in FIGS. 8A and 8B the converter circuitry 102 may be arranged to convert an AC input from AC power source PS to a DC output on load RL. In other examples, converter circuitry 102 may be bi-directional converter circuitry that may be arranged to convert a DC input from a DC power source to an AC output on a load.

During operation in the negative half cycle preceding the present positive half cycle, there may be a buildup of electrical charge (which may result in a voltage potential at a terminal of the power conversion system 100E relative to a ground potential GN). There may be a buildup of electrical charge due to common mode switching and/or parasitic capacitance. This electrical charge may build up at one or more terminals of the power conversion system 100E (e.g., due to parasitic capacitance). For example, due to parasitic capacitance represented by capacitor CY1 and capacitor CY2, respectively, there may be a voltage potential at terminal C and/or terminal D with respect to ground potential GN. The difference of the voltage potential at terminal C with respect to a ground potential GN (e.g., a positive voltage $V_{CG}$ across capacitor CY2 from to the ground potential GN to terminal C) may be more significant at some point than the difference of the voltage potential at terminal D with respect to ground potential GN.

Figure 8C:
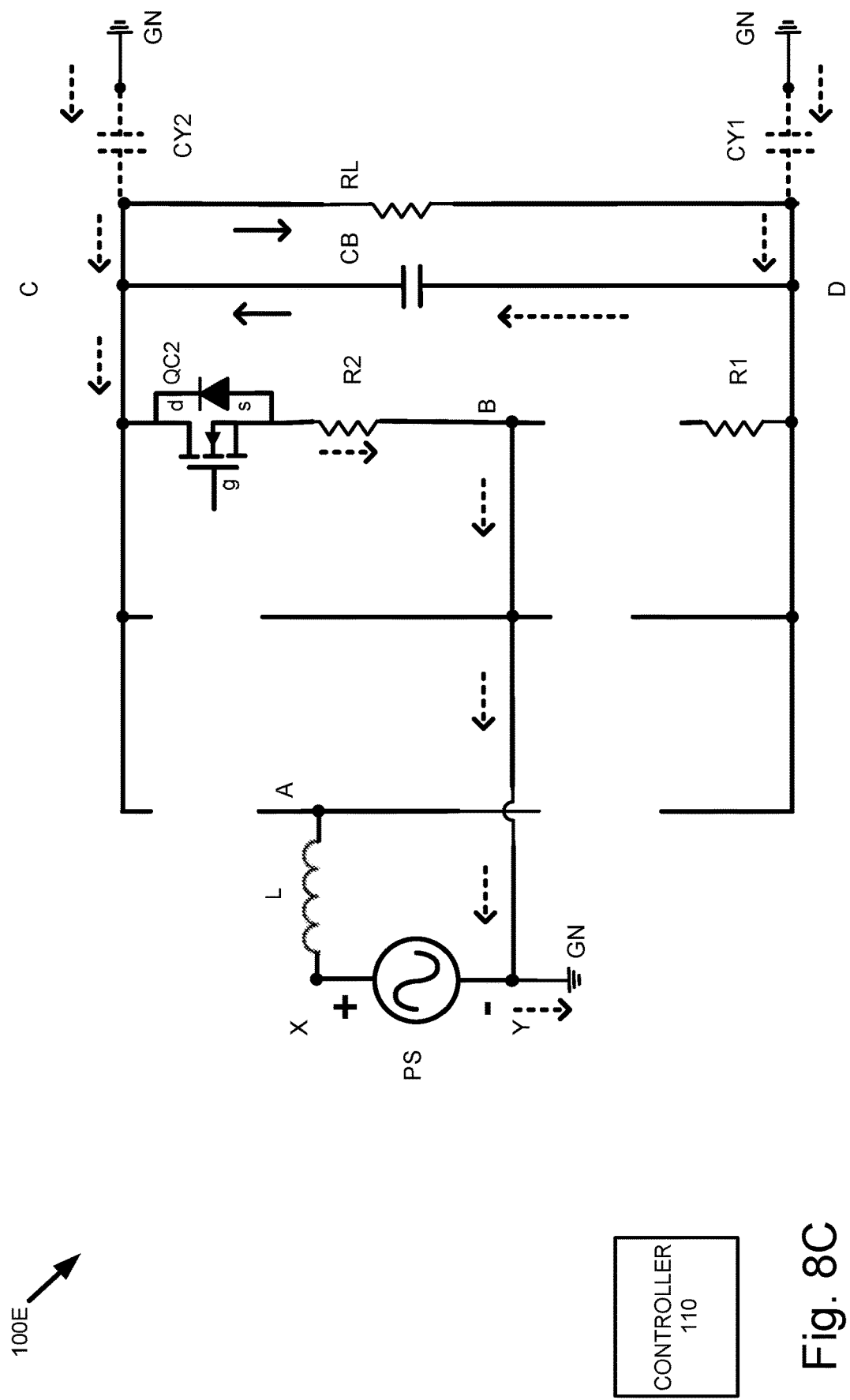
FIG. 8C shows an example power conversion system.

FIG. 8C shows example power conversion system 100E during a transition from the positive half cycle to a negative half cycle (e.g., before the AC cycle passes the zero crossing). During the negative half cycle, power source PS may provide a negative output across the AC terminals, with a negative voltage potential on terminal X and a positive voltage potential on terminal Y. All of the switches QS1, QS2, QF1, and QF2 of converter circuitry 102 may be switched OFF. The slow switch QS1 that was switched ON during the positive half cycle (e.g., as shown in FIGS. 8A and 8B) may be switched OFF before the zero crossing of the AC cycle (e.g., before the AC voltage of the power source PS reaches about 0 volt). One or more switching elements of switching circuitry 106 (e.g., switching circuitry 106A, switch QC2) of dampening circuitry 104 may be switched ON to soft switch a slow switch (e.g., slow switch QS2) that will be switched ON during the negative half cycle. The one or more switching elements of switching circuitry 106 of dampening circuitry 104 may be switched ON to discharge a charge and reduce a voltage that was built up (e.g., a voltage at parasitic capacitors CY1 and CY2). The voltage may be due to a common mode current that charged parasitic capacitors CY1 and CY2 in the previous common mode switching (e.g., in the previous transition from the previous negative half cycle to the present positive half cycle) and/or a current that charged parasitic capacitors CY1 and CY2 in the previous states. For example, the voltage may be built up due to parasitic capacitance. For example, the voltage potential may be associated with charge built up on terminal C represented by capacitor CY1 and/or charge built up on terminal D represented by capacitor CY2. Dampening circuitry 104 may be switched ON to mitigate the common mode current that charges the parasitic capacitors CY1 and CY2. For example, while switch QS1 is ON during the positive half cycle the voltage at terminal D of parasitic capacitor CY1 may be considered an about 0 voltage potential, since parasitic capacitor CY1 is connected to a ground potential on both ends of the parasitic capacitor CY1 (e.g., parasitic capacitor CY1 is directly connected to the ground potential GN at terminal Y via switch QS1 at the left end of capacitor CY1 and to ground potential GN at the right end of capacitor CY1). When switch QS1 is switched OFF and switch QC2 is switched ON, due to the voltage across capacitor CB, the voltage at terminal D becomes a negative voltage, and the voltage built-up on parasitic capacitor CY1 (e.g., during the previous transition and/or the previous states) may be changed. Since the voltage on the left end of parasitic capacitor CY1 goes from an about 0 potential to a negative potential, common mode current may flow from the right end of the parasitic capacitor CY1 to the ground potential at terminal Y, as the voltage across parasitic capacitor CY1 changes. Similarly, when switch QS1 is switched OFF and switch QC2 is switched ON, due to the voltage across capacitor CB, the voltage at terminal C is a positive voltage (e.g., the voltage at the positive terminal of parasitic capacitor CY2 is the voltage of capacitor CB [e.g., $V_{CD}$] which is greater than zero) which is now connected to the ground potential at terminal Y, and the voltage built-up on parasitic capacitor CY2 (e.g., during the previous transition and/or the previous states) may be discharged (e.g., a positive voltage $V_{CG}$ across capacitor CY2 decreases toward zero voltage and/or a positive charge discharged by decreasing a positive potential at terminal C toward the ground potential GN). Common mode current may flow from the parasitic capacitor CY2 to the ground potential at terminal Y, as capacitor CY2 may be discharged. The current paths of the common mode current are indicated by dashed arrows in FIG. 8C. In addition to the common mode current, there is also other current flowing from the capacitor CB to the load RL indicated by the non-dashed arrows.

One or more electrical elements (e.g., resistor R2) of energy dissipation circuitry 108 (e.g., energy dissipation circuitry 108A and 108B) may be arranged to dissipate energy when dampening circuitry 104 discharges the built up voltage (e.g., the common mode voltage related to parasitic capacitors CY1 and CY2). For example, switch QC2 may be switched ON to make an electrical connection between terminal B and terminal C via resistor R2. Resistor R2 may be arranged to dissipate the energy related to the built up voltage (e.g. voltages across parasitic capacitors CY1 and CY2 due to parasitic capacitance) and to mitigate the common mode current. Resistor R2 dissipating the energy during switching may assist with the soft switching of the converter circuitry during the transition between the states (also referred to as common mode switching) which may smooth out the switching process. Switching ON switch QC2 (that may be connected to resistor R2 and form the electrical pathway with resistor R2 to be connected to converter circuitry 102) before switching ON slow switch QS2 (that will be switched ON during the negative half cycle) may be done to soft switch the slow switch (e.g., slow switch QS2) to the ON state, and may provide a relatively smooth transition with a relatively smaller jump in current and relatively more gradual change in voltage between a first state (e.g., the positive half cycle) and a second state (e.g., the negative half cycle). Switch QC2 may be switched ON during the positive half cycle before the zero crossing of the AC cycle (e.g., before the AC voltage of the power source PS reaches about 0 volts). For example, in a case where there is no energy dissipation circuitry 108 (e.g., no resistor R2) and either switch QC2 and/or switch QS2 may be switched ON for the transition from the positive half cycle to a negative half cycle without a dissipation element, then there may be a relatively high common mode voltage and a relatively high common mode current for the discharge of the parasitic capacitors CY1 and CY2. By including dampening circuitry 104 with switching circuitry 106 and dissipation circuitry 108, that is able to soft switch the slow switch QS2 for the upcoming half cycle and dissipate energy related to the common mode switching, the common mode current and common mode voltage related to the parasitic capacitance and common mode switching may be mitigated and reduced. Resistor R2 may be referred to as a discharge element, since it is arranged to assist with the discharge of parasitic capacitors CY1 and CY2. As described above, at least in some examples, a single dissipation element may be used to dissipate energy during discharge and charge of the parasitic capacitors CY1 and CY2. For example, there may be a single resistor, or a single inductor, arranged as a single charge/discharge element.

In FIG. 8C, only switch QC2 is shown as switched ON to smooth the transition (and discharge the voltage). In some examples, fast switches QF1 and QF2 may also be used to smooth the transition between a first state (e.g., the positive half cycle) and a second state (e.g., the negative half cycle). For example, after the AC cycle passed the zero crossing, one or more of the fast switches QF1 and QF2 may also be used to soft switch the slow switch QS2. For example, before the AC cycle reaches the zero crossing, all of the switches QS1, QS2, QF1, and QF2 of converter circuitry 102 may be switched OFF and switch QC2 may be switched ON. After the AC cycle passed the zero crossing, one or more of the fast switches QF1 and QF2 may also be used to soft switch slow switch QS2 to the ON state.

Figure 8D:
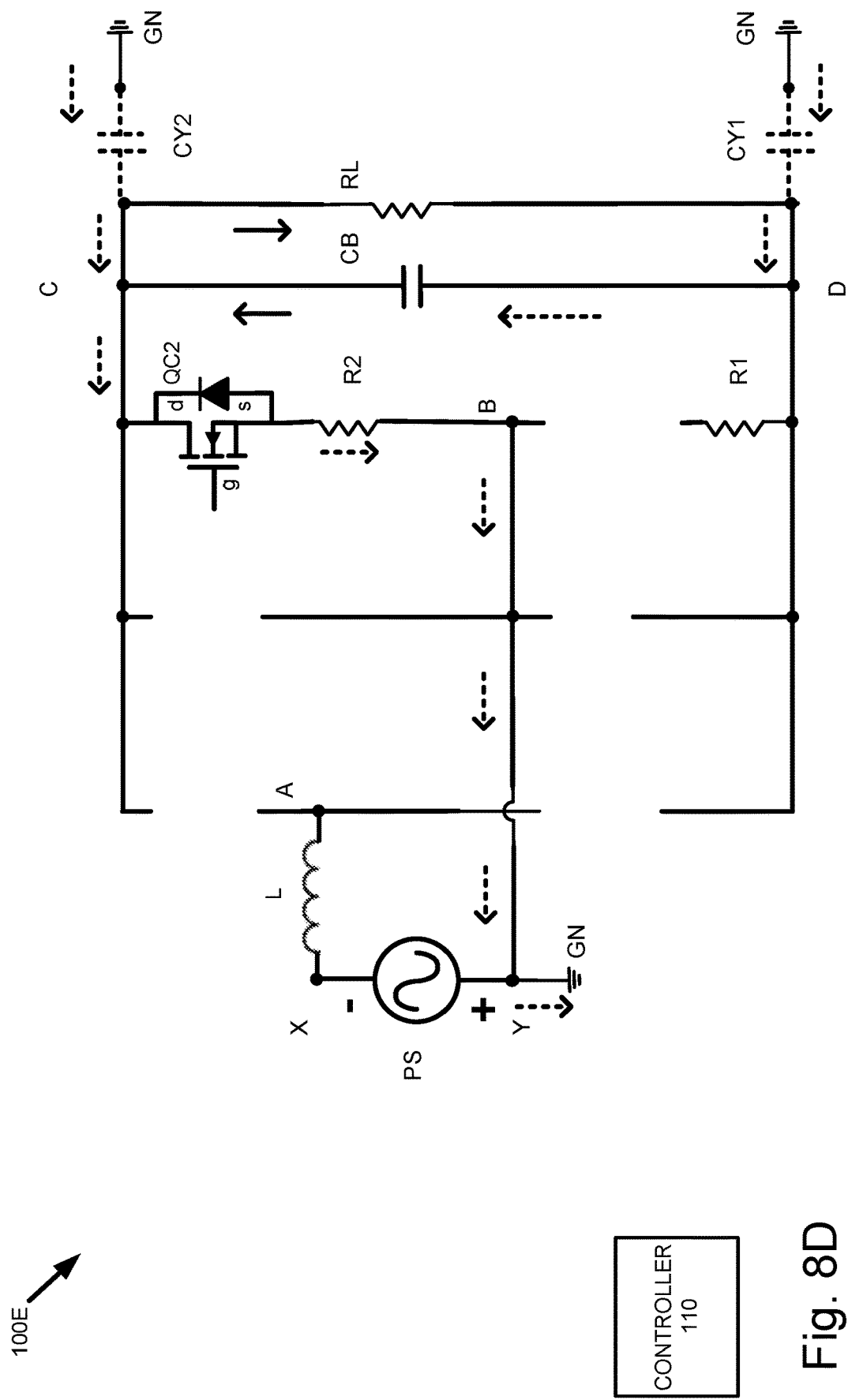
FIG. 8D shows an example power conversion system.

FIG. 8D shows example power conversion system 100E during the transition from the positive half cycle to the negative half cycle (e.g., after the AC cycle passed the zero crossing), before slow switch QS2 is switched ON. Power source PS may provide a negative output across the AC terminals (e.g., with a negative voltage potential on terminal X and a positive voltage potential on terminal Y). Common mode current may continue to flow and reduce the voltage across the parasitic capacitance as shown by the dashed arrows in FIG. 8D.

Figure 8E:
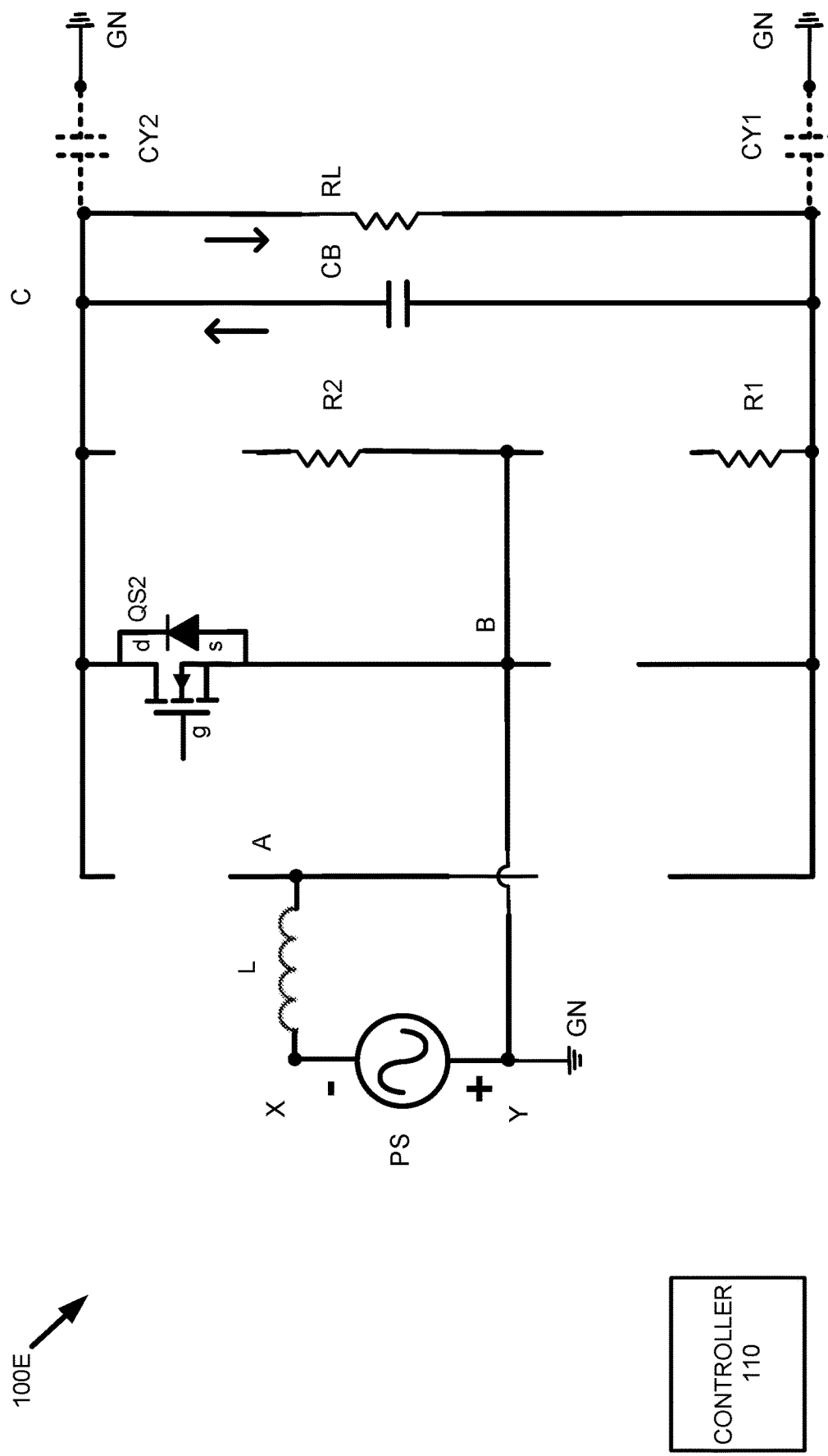
FIG. 8E shows an example power conversion system.

FIG. 8E shows example power conversion system 100E after the transition from the positive half cycle to the next negative half cycle (e.g., after the AC cycle passed the zero crossing) after slow switch QS2 has been switched ON (e.g., in a steady state). During the negative half cycle, converter circuitry 102 may be arranged to convert an AC input from the AC power source PS to a DC output on load RL. Switch QC2 may be switched OFF (e.g., as shown in FIG. 8E). For example, switch QC2 may be switched OFF after switch QS2 is switched ON (e.g., after a relatively short time period). Alternatively, after switch QS2 is switched ON, switch QC2 may remain switched ON for a relatively longer time period during the negative half cycle (e.g., as shown in FIG. 8K). For example, switch QC2 may remain switched ON during the negative half cycle while switch QS2 remains switched ON during the negative half cycle. If switch QS2 is switched ON, it makes an electrical connection between terminal B and terminal C in parallel to the pathway of switch QC2 in series with resistor R2 (as shown, for example, in FIG. 8K). Since the electrical pathway made by switch QS2 may have a relatively lower resistance than the electrical pathway made by switch QC2 that includes resistor R2, current will substantially flow through the path with the relatively lower resistance via switch QS2 even if switch QC2 remains switched ON (e.g., while switch QS2 is switched ON).

Figure 8F:
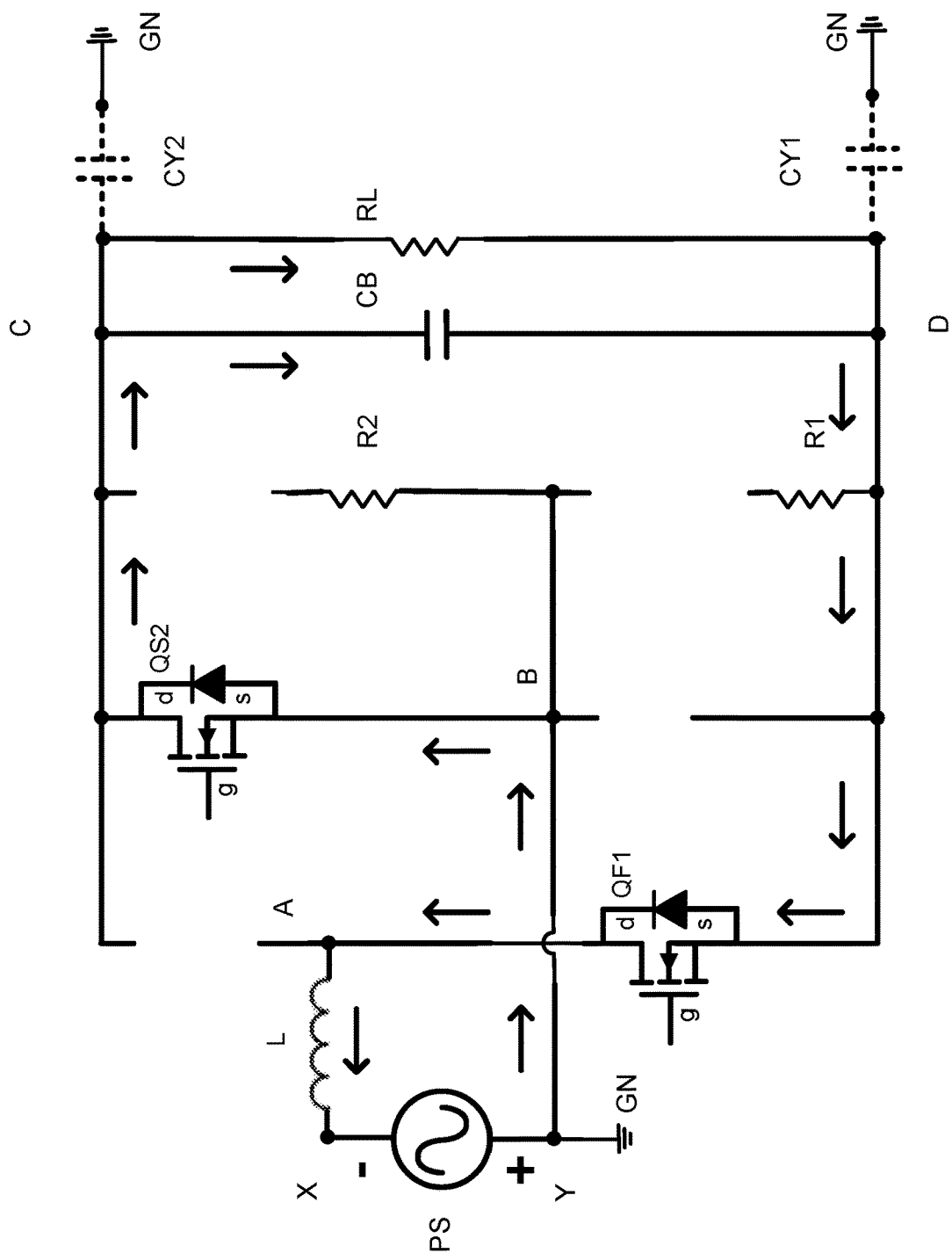
FIG. 8F shows an example power conversion system.
Figure 8G:
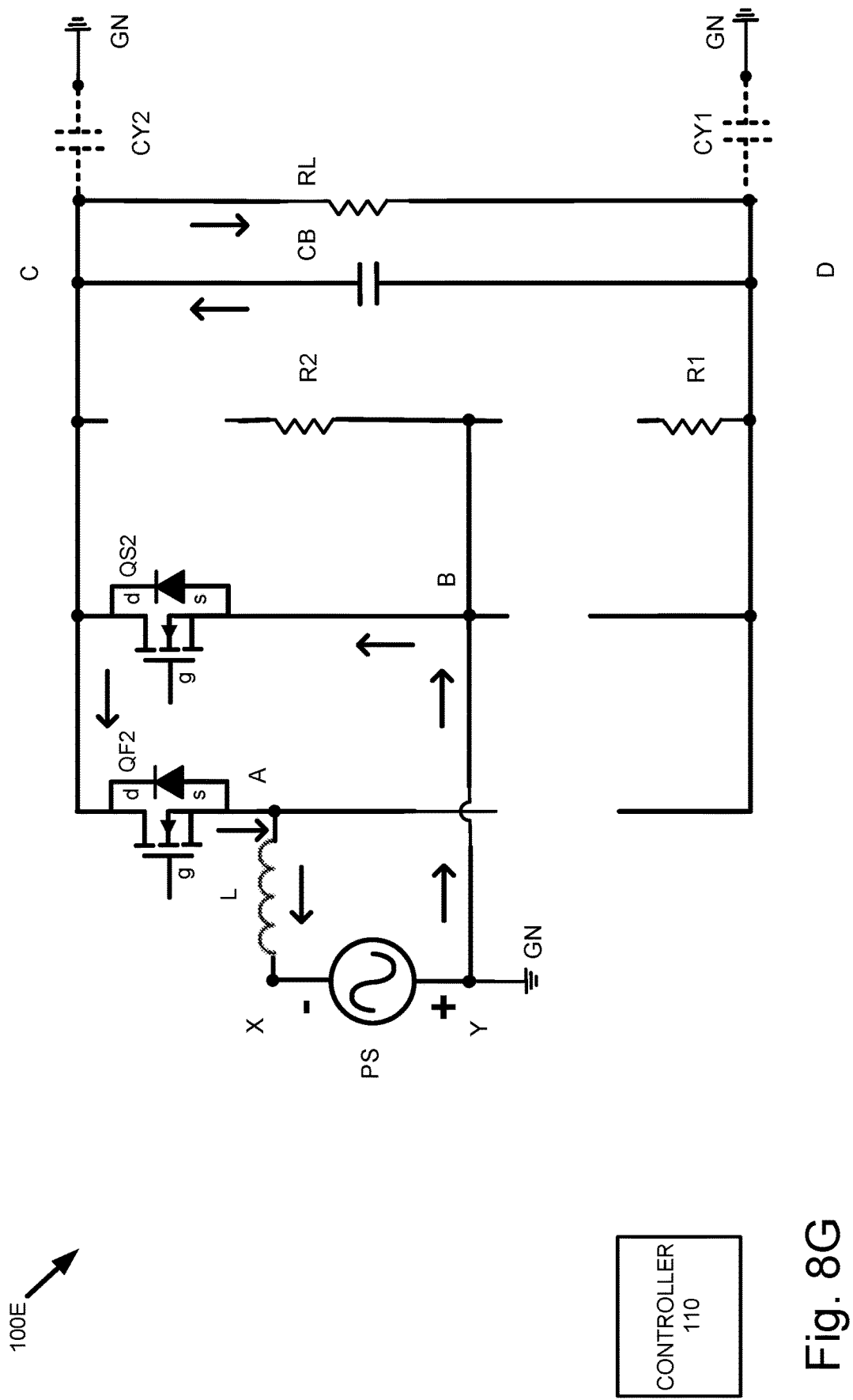
FIG. 8G shows an example power conversion system.

FIG. 8F and FIG. 8G show example power conversion system 100E during a negative half cycle. Power source PS may provide a negative output across terminals X and Y (e.g., the AC terminals with a negative voltage potential on terminal X and a positive voltage potential on terminal Y). Switch QS2 may be switched ON and switch QF1 may also be switched ON (e.g., as show in FIG. 8F). Switch QS2 may remain switched ON for a longer time period than switch QF1. Switch QS2 may be switched at a slower switching frequency than the switching frequency of switch QF1 (which may have a relatively faster switching frequency). As shown in FIGS. 8F and 8G, during the negative half cycle, while switch QS2 is switched ON, switch QF1 may be switched OFF and switch QF2 may be switched ON. During the negative half cycle, switch QS2 may remain switched ON while switch QF1 and switch QF2 are switched ON in an alternating manner (e.g., if switch QF1 is switched ON, switch QF2 is switched OFF, and vice versa). During the negative half cycle, switch QS2 remains in a steady ON state while switch QF1 and switch QF2 are switched alternatingly.

If switch QS2 is switched ON and Switch QF1 is also switched ON (e.g., as shown in FIG. 8F), a current may flow from terminal Y to terminal X via switch QS2 and switch QF1 (e.g., as shown by the arrows in FIG. 8F). Load RL may receive power associated with a DC voltage across terminals C and D (e.g., the DC terminals including terminal C and terminal D). Capacitor CB may be charged (e.g., a positive voltage $V_{CD}$ across capacitor CB from terminal D to terminal C) by the voltage across terminals C and D in this state.

If switch QS2 is switched ON and Switch QF2 is also switched ON (e.g., as shown in FIG. 8G), a current may flow from terminal Y to terminal X via switch QS2 and switch QF2 (e.g., as shown by the arrows in FIG. 8G). Load RL may receive power associated with a DC voltage across terminals C and D (e.g., the DC terminals including terminal C and terminal D). Capacitor CB may be discharged to provide power, associated with the DC voltage, to the load RL in this state.

Converter circuitry 102 may be arranged to convert an AC input from AC power source PS to a DC output on load RL (e.g., as shown in FIGS. 8F and 8G). In some implementations, converter circuitry 102 may be bi-directional converter circuitry that may be arranged to convert a DC input from a DC power source to an AC output on a load.

During operation in the negative half cycle preceding the upcoming positive half cycle, there may be a buildup of electrical charge (which may result in a voltage potential at a terminal of the power conversion system 100E relative to a ground potential GN). There may be a buildup of electrical charge due to common mode switching and/or parasitic capacitance. This electrical charge may occur at one or more terminals of the power conversion system 100E (e.g., due to parasitic capacitance). For example, due to parasitic capacitance represented by capacitor CY1 and capacitor CY2, respectively, there may be a voltage potential at terminal C and/or terminal D with respect to ground potential GN. The difference of the voltage potential at terminal D with respect to a ground potential GN (e.g., a negative voltage $V_{DG}$ across capacitor CY1 from to the ground potential GN to terminal D) may be more significant at some point than the difference of the voltage potential at terminal C with respect to ground potential GN.

Figure 8H:
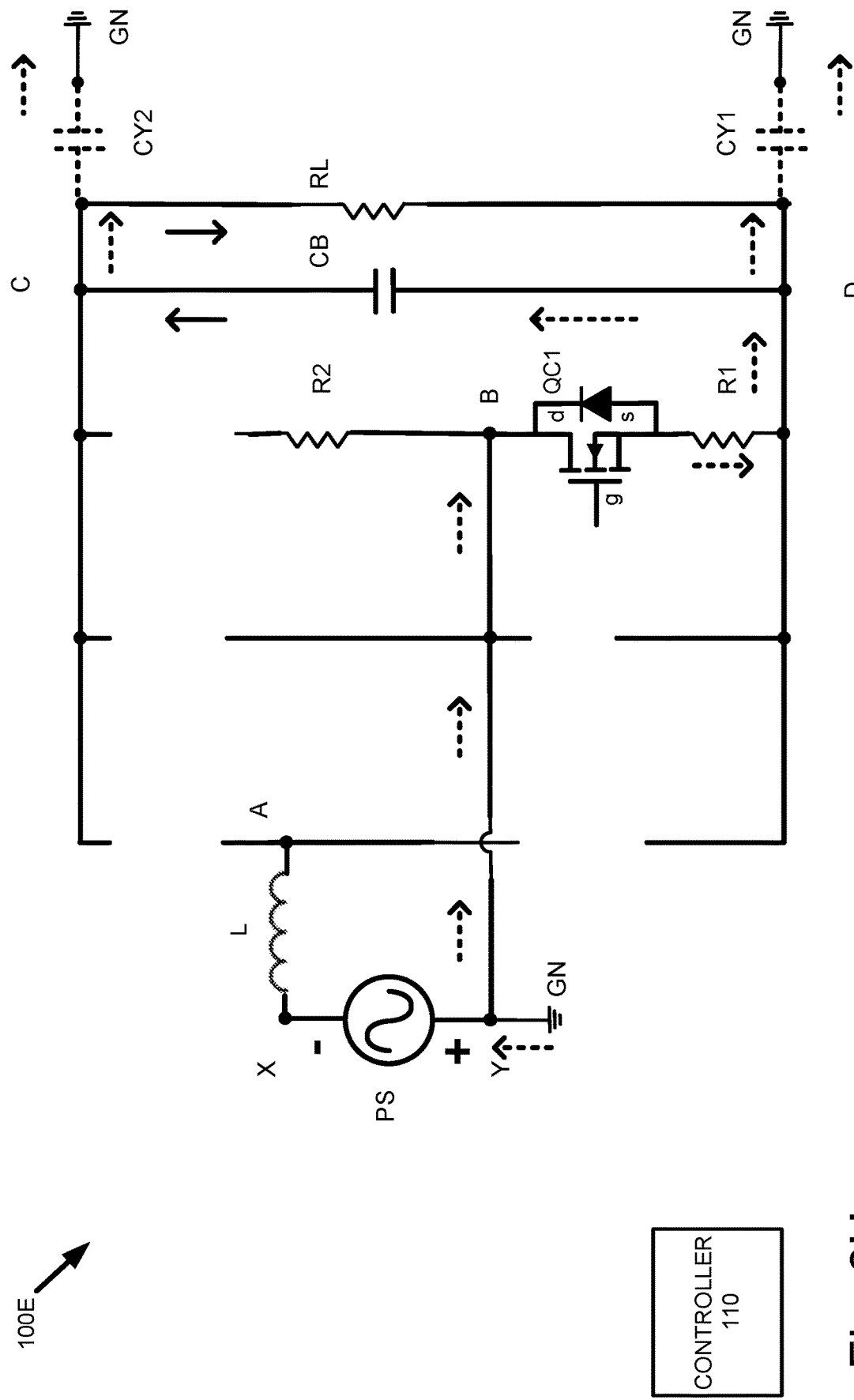
FIG. 8H shows an example power conversion system.

FIG. 8H shows example power conversion system 100E during a transition from the negative half cycle to a positive half cycle (e.g., before the AC cycle passes the zero crossing from the negative half cycle to the positive half cycle). During the positive half cycle, power source PS may provide a positive output across terminals X and Y (e.g., the AC terminals with a positive voltage potential on terminal X and a negative voltage potential on terminal Y). Switches QS1, QS2, QF1, and QF2 of converter circuitry 102 may be switched OFF. Slow switch QS2 that was switched ON during the negative half cycle (e.g., as shown in FIG. 8E, FIG. 8F and FIG. 8G) may be switched OFF before the zero crossing of the AC cycle (e.g., before the AC voltage of the power source PS reaches about 0 volt). One or more switching elements of switching circuitry 106 of dampening circuitry 104 may be switched ON to soft switch a slow switch (e.g., slow switch QS1) that will be switched ON during the positive half cycle. The one or more switching elements (e.g., switch QC1) of switching circuitry 106 of dampening circuitry 104 may be switched ON to mitigate common mode current, reduce charge that may be built-up (e.g., due to common mode voltage and/or parasitic capacitance), and reduce a voltage that may be built up (e.g., at parasitic capacitors CY1 and CY2). The voltage may be due to a common mode current that charges parasitic capacitors in the pending common mode switching (e.g., in the pending transition from the present negative half cycle to the upcoming positive half cycle) and/or a current that charged parasitic capacitors CY1 and CY2 in the previous states. For example, the voltage may be built up due to parasitic capacitance. The voltage potential may be charge built up on terminal C represented by capacitor CY1 and/or charge built up on terminal D represented by capacitor CY2. Dampening circuitry 104 may be switched ON to mitigate the common mode current that charges the parasitic capacitors CY1 and CY2. For example, while switch QS2 is ON during the negative half cycle the voltage at terminal D of parasitic capacitor CY1 may be considered a negative voltage potential, since parasitic capacitor CY1 is connected to a negative potential at terminal X via switch QF1 at the left end of parasitic capacitor CY1, or to the negative terminal of capacitor CB at the left end of parasitic capacitor CY1 (e.g., while terminal Y at ground potential GN remains connected to terminal C via switch QS2). When switch QS2 is switched OFF and switch QC1 is switched ON (e.g., as shown in FIG. 8H), due to the voltage at terminal D of parasitic capacitor CY1 going to an about 0 voltage potential, since parasitic capacitor CY1 is now connected to a ground potential on both ends of the parasitic capacitor CY1 (e.g., parasitic capacitor CY1 is directly connected to the ground potential GN at terminal Y via switch QS1 at the positive end of capacitor CY1 and to ground potential GN at the negative end of capacitor CY1), the built-up voltage (e.g., a negative voltage $V_{DG}$ across capacitor CY1 from ground potential GN to terminal D) on parasitic capacitor CY1 may be discharged (e.g., a negative voltage $V_{DG}$ across capacitor CY1 decreases toward zero voltage and/or a negative charge discharged by increasing a negative potential at terminal D toward the ground potential GN). Since the voltage potential at terminal D of parasitic capacitor CY1 goes from a negative voltage potential to an about 0 voltage potential, common mode current may flow to the parasitic capacitor CY1 away from terminal Y and toward the right end of parasitic capacitor CY1, as parasitic capacitor CY1 is discharged. Similarly, when switch QS2 is switched OFF and switch QC1 is switched ON, due to the voltage across capacitor CB, the voltage at terminal C is a positive voltage (e.g., the voltage at the positive terminal of parasitic capacitor CY2 is the voltage of capacitor CB [e.g., $V_{CD}$] which is greater than zero), a voltage may be built-up on parasitic capacitor CY2 and parasitic capacitor CY2 may be charged. Common mode current may flow to the parasitic capacitor CY2 toward the ground potential at the right end of parasitic capacitor CY2, as the voltage across capacitor CY2 changes.

One or more electrical elements (e.g., resistor R1) of energy dissipation circuitry 108 may be arranged to dissipate energy when dampening circuitry 104 discharges the built up charge and/or voltage (e.g., when parasitic capacitors CY1 and CY2 are charged via the dampening circuitry 104) due to the common mode voltage and common mode current. For example, switch QC1 may be switched ON to make an electrical connection between terminal B and terminal D via resistor R1. Resistor R1 may be arranged to dissipate the energy related to the built up voltage (e.g., common mode voltage) that may build up at the parasitic capacitors (e.g. due to parasitic capacitance) and to mitigate the common mode current. Resistor R1 dissipating the energy during switching may assist with the soft switching of the converter circuitry during the transition between the states (also referred to as common mode switching) which may smooth out the switching process. Switching ON switch QC1 (that may be connected to resistor R1 and form the electrical pathway with resistor R1 to be connected to converter circuitry 102) before switching ON slow switch QS1 (e.g., that may be switched ON during the positive half cycle) may be done to soft switch a slow switch (e.g., slow switch QS1) to the ON state, and may provide a relatively smooth transition with a relatively smaller jump in current and relatively more gradual change in voltage between the second state (e.g., the negative half cycle) and the first state (e.g., the positive half cycle). Switch QC1 may be switched ON during the negative half cycle before the zero crossing of the AC cycle (e.g., before the AC voltage of the power source PS reaches about 0 volt). For example, in a case where there is no energy dissipation circuitry 108 (e.g., no resistor R1) and either switch QC1 and/or switch QS1 are switched ON for the transition from the negative half cycle to the positive half cycle without a dissipation element, then there may be a relatively high common mode voltage and a relatively high common mode current for the discharge of the parasitic capacitors CY1 and CY2. By including dampening circuitry 104 with switching circuitry 106 and dissipation circuitry 108, that is able to soft switch the slow switch QS1 for the upcoming half cycle and dissipate energy related to the common mode switching, the common mode current and common mode voltage related to the parasitic capacitance and common mode switching may be mitigated and reduced. Resistor R1 may be referred to as a discharge element, since it is arranged to assist during the discharge of parasitic capacitors CY1 and CY2. As described above, at least in some examples, a single dissipation element may be used to dissipate energy during discharge and charge of the parasitic capacitors CY1 and CY2. There may be a single resistor, or a single inductor, arranged as a single charge/discharge element.

In FIG. 8H, only switch QC1 is shown as switched ON to smooth the transition (and mitigate the common mode current). In some examples, fast switches QF1 and QF2 may also be used to smooth the transition from the second state (e.g., the negative half cycle) to the first state (e.g., the positive half cycle). For example, after the AC cycle passed the zero crossing, one or more of fast switches QF1 and QF2 may also be used to soft switch slow switch QS1. For example, before the AC cycle reaches the zero crossing, switches QS1, QS2, QF1, and QF2 of converter circuitry 102 may be switched OFF and switch QC1 may be switched ON. After the AC cycle passed the zero crossing, one or more of fast switches QF1 and QF2 may also be used to soft switch slow switch QS1 to the ON state.

Figure 8I:
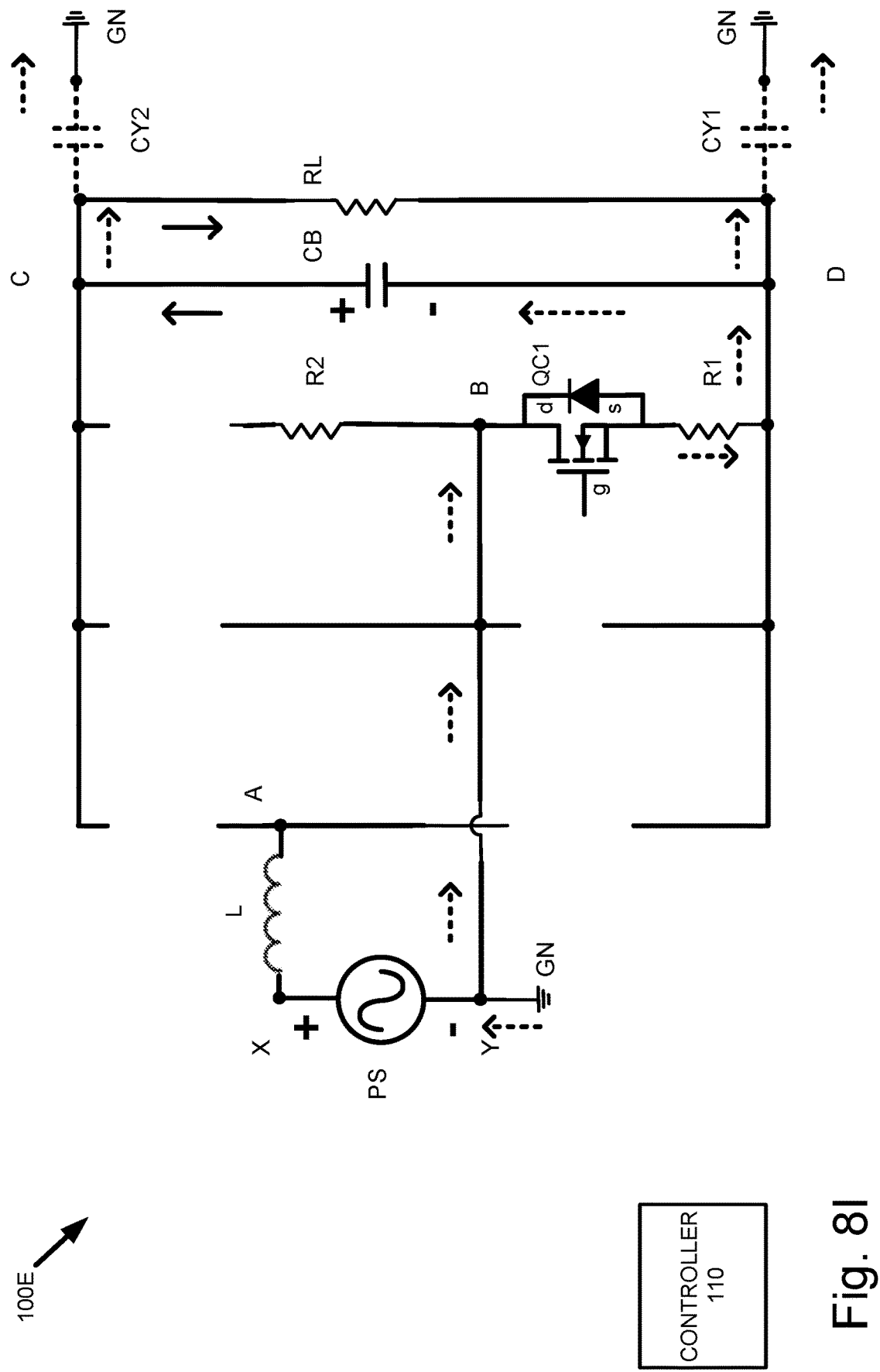
FIG. 8I shows an example power conversion system.

FIG. 8I shows example power conversion system 100E during the transition from the negative half cycle to the positive half cycle (e.g., after the AC cycle passed the zero crossing), before slow switch QS1 is switched ON. Power source PS may provide a positive output across terminals X and Y (e.g., the AC terminals with a positive voltage potential on terminal X and a negative voltage potential on terminal Y). Common mode current may continue to flow and reduce the voltage across the parasitic capacitance as shown by the dashed arrows in FIG. 8I.

Figure 8J:
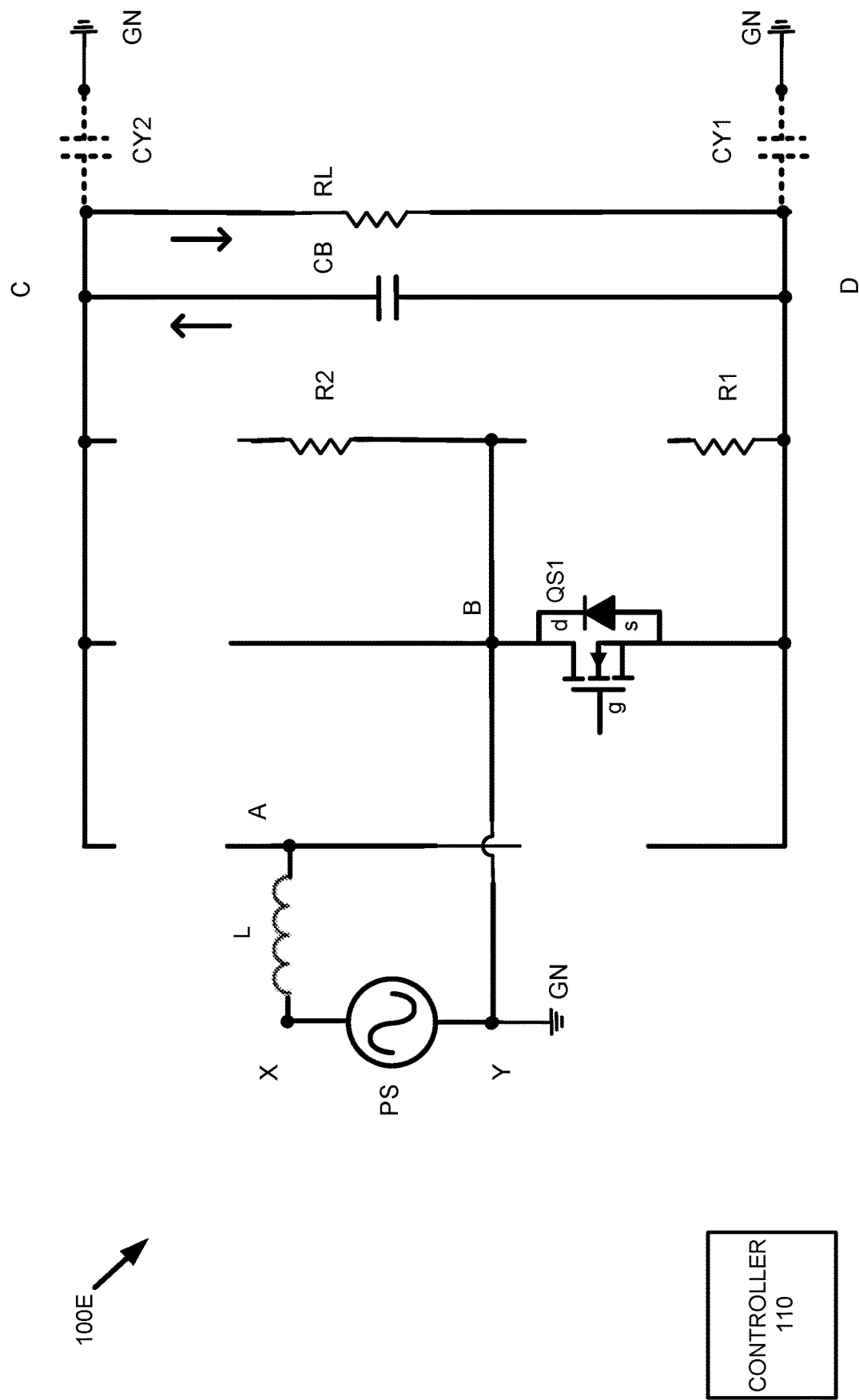
FIG. 8J shows an example power conversion system.
Figure 8K:
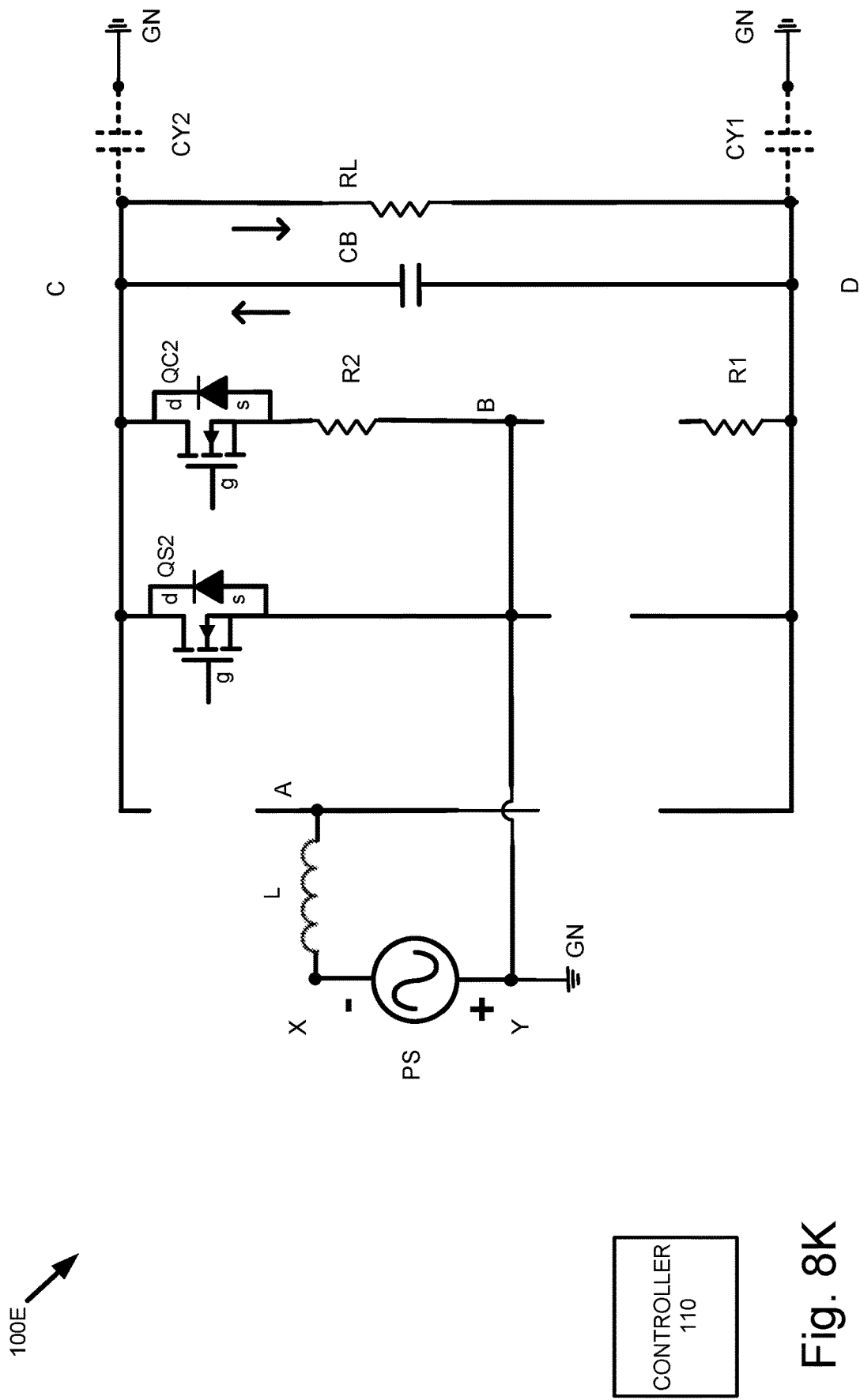
FIG. 8K shows an example power conversion system.
Figure 8L:
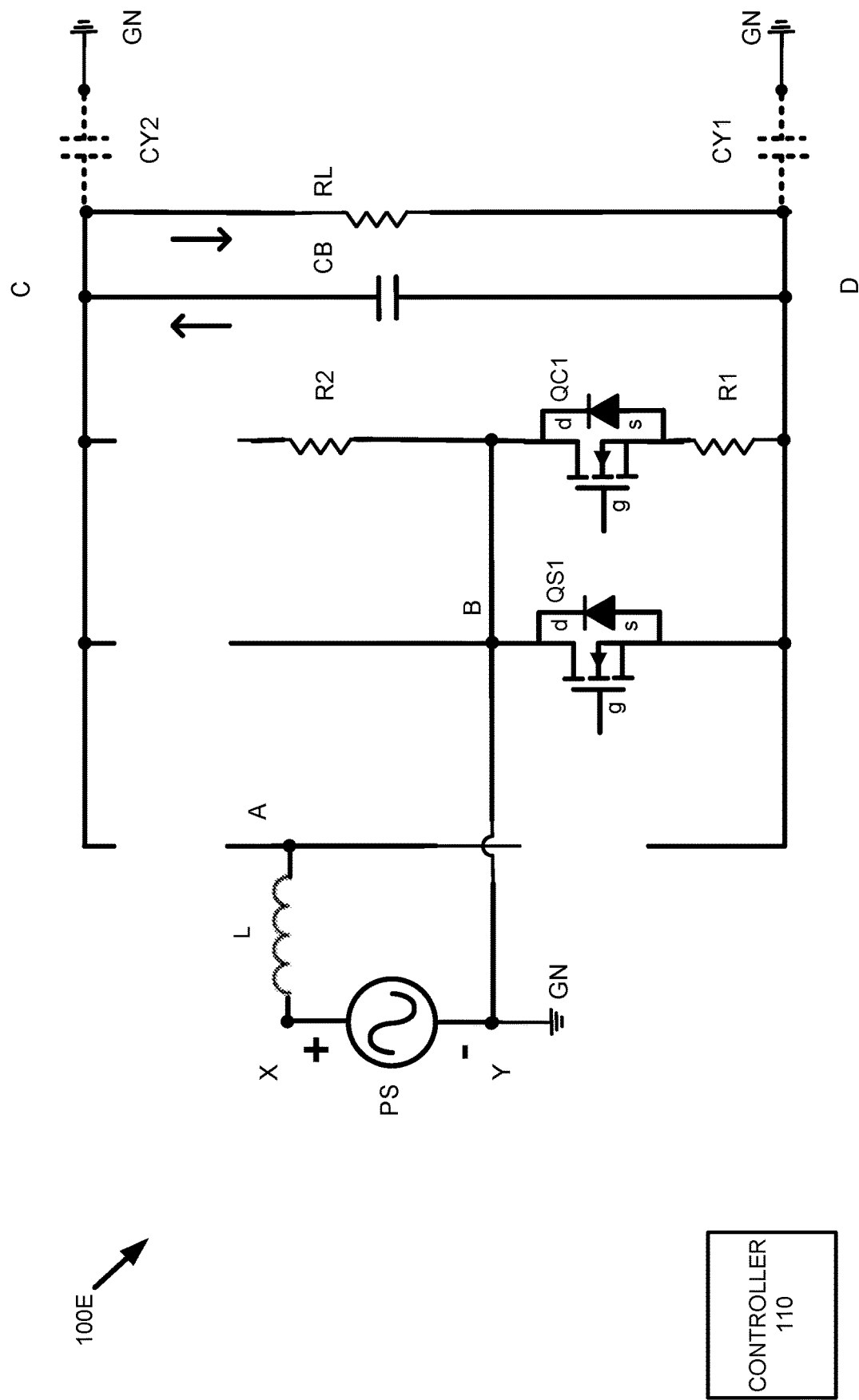
FIG. 8L shows an example power conversion system.

FIG. 8J shows example power conversion system 100E after the transition from the negative half cycle to the next positive half cycle (e.g., after the AC cycle passed the zero crossing) after slow switch QS1 may be switched ON (e.g., in a steady ON state). During the positive half cycle, converter circuitry 102 may be arranged to convert an AC input from AC power source PS to a DC output on load RL. Switch QC1 may be switched OFF (e.g., as shown in FIG. 8J). For example, switch QC1 may be switched OFF after switch QS1 is switched ON (e.g., after a relatively short time period). Alternatively, after switch QS1 is switched ON, switch QC1 may remain switched ON for a relatively longer time period during the positive half cycle (e.g., as shown in FIG. 8L). For example, switch QC1 may remain switched ON during the positive half cycle while switch QS1 remains switched ON during the positive half cycle. If switch QS1 is switched ON, it makes an electrical connection between terminal D and terminal B in parallel to the pathway of switch QC1 in series with resistor R1 (as shown, for example, in FIG. 8L). Since the electrical pathway made by switch QS1 has a relatively lower resistance than the electrical pathway made by QC1 that includes resistor R1, current will substantially flow through the path with the relatively lower resistance via switch QS1 even if switch QC1 remains switched ON.

After the operation shown in FIG. 8J (or FIG. 8L), the next cycle of operation may continue in the positive half cycle as described above with regards to FIG. 8A and FIG. 8B, and so forth. In the positive half cycle, slow switch QS1 may remain switched ON (e.g., in a steady state) while fast switches QF1 and QF2 may be switched ON and OFF in an alternating manner.

As described above, FIG. 8K shows example power conversion system 100E (e.g., after the transition from the positive half cycle to the negative half cycle where both switch QC2 and switch QS2 may remain switched ON during the negative half cycle). For example, after switch QC2 assists the soft switch of slow switch QS2 to the ON state, switch QC2 may remain switched ON during the negative half cycle while switch QS2 remains switched ON during the negative half cycle (even though switch QC2 may be substantially bypassed after switch QS2 is turned ON by the electrical pathway that switch QS2 forms). Switch QC2 may be substantially bypassed, for example, if R2 provides much higher resistance in comparison with the resistance on the electrical pathway via switch QS2.

As described above, FIG. 8L shows example power conversion system 100E (e.g., after the transition from the negative half cycle to the positive half cycle where both switch QC1 and switch QS1 may remain switched ON during the positive half cycle). For example, after switch QC1 assists the soft switch of slow switch QS1 to the ON state, switch QC1 may remain switched ON during the positive half cycle while switch QS1 remains switched ON during the positive half cycle (even though switch QC1 may be substantially bypassed after switch QS1 is turned ON by the electrical pathway that switch QS1 forms). Switch QC1 may be substantially bypassed, for example, if R1 provides much higher resistance in comparison with the resistance on the electrical pathway via switch QS1.

FIG. 9A, FIG. 9B, FIG. 9C, FIG. 9D, and FIG. 9E show examples of graphs of AC voltage and switch states. Graph 900 shows an example of an AC curve. For example, graph 900 may represent the AC voltage ($V_{AC}$) of AC power source PS of a power conversion system.

Graph 902A shows an example of switching states of different switches of a power conversion system. Graph 902A will be further described with reference to power conversion system 100E of FIG. 8A-8L, but may be applied to other similar power conversion systems.

Time t0 up to time t7 may occur during a negative half of an AC cycle. Switch QS2 may be switched ON (e.g., in a steady state) during the negative half of the AC cycle (e.g., as shown in FIGS. 8D, 8E, 8F, 8G and 8H). Switch QS2 may be switched OFF at time t6 of the negative half cycle before the zero crossing at time t7. Switch QS1 may be switched OFF during the negative half cycle. Switches QF1 and QF2 may be switched in an alternating fashion during the negative half cycle. For example, switch QF1 may be switched ON from time t0 to time t2 and from time t4 to time t6 (as shown in FIG. 8F where switch QF1 is ON and switch QF2 is OFF), and switch QF2 may be switched ON from time t2 to time t4 (as shown in FIG. 8G where switch QF2 is ON and switch QF1 is OFF). For example, there may be an additional time delay (e.g., a time gap) between the switching of the switches QF1 and QF2 to avoid that the switches QF1 and QF2 are turned ON at the same time. As an example, there may be a time delay between the switching of other switches to avoid the undesirable overlap (e.g., both switches QF1 and QF2 may be switched OFF during the time gap around time t2). As an example, the time delay may be about ones of microseconds, tens of microseconds, hundreds of microseconds, ones of milliseconds, tens of milliseconds, or any other appropriate amount of time. For example, the time delay may be in a range of about 1 us to about 1000 us, or in a range of about 1 ms to about 10 ms. Before the transition from the negative half cycle to the positive half cycle (e.g., before the zero crossing at time t7) the switches QS1, QS2, QF1, and QF2 of converter circuitry 102 may all be switched OFF and switch QC1 may be switched ON (e.g., as shown in FIG. 8H). As an example, the time before the transition may be about ones of microseconds, tens of microseconds, hundreds of microseconds, ones of milliseconds, tens of milliseconds, or any other appropriate amount of time. For example, the time may be in a range of about 1 us to about 1000 us, or in a range of about 1 ms to about 10 ms. For example, the time may depend on a capacitance of one or more capacitors of the system (e.g., a determined parasitic capacitance, or the capacitance of a different capacitor of the system), a voltage of the power source, a switching frequency of one or more switches of the system, etc. Switch QC1 may be switched ON to assist the soft switching of switch QS1 (e.g., that may be turned ON during the positive half cycle). Switch QC1 may be switched ON to provide a smooth transition between a first state and a second state (e.g., between a first half of an AC cycle and a second half of an AC cycle). Switch QC1 may be switched ON to mitigate common mode current during the charging of parasitic capacitors due to parasitic capacitance and common mode switching. For example, the voltage potential may be charge built up on terminal C represented by capacitor CY1 and/or charge built up on terminal D represented by capacitor CY2. Switch QC1 may be switched ON at time t6 before the zero crossing of the AC cycle at time t7, for example, to reduce the voltage (e.g., by dissipating energy via resistor R1) before switch QS1 is switched on (e.g., as shown in FIG. 8J).

Figure 9A:
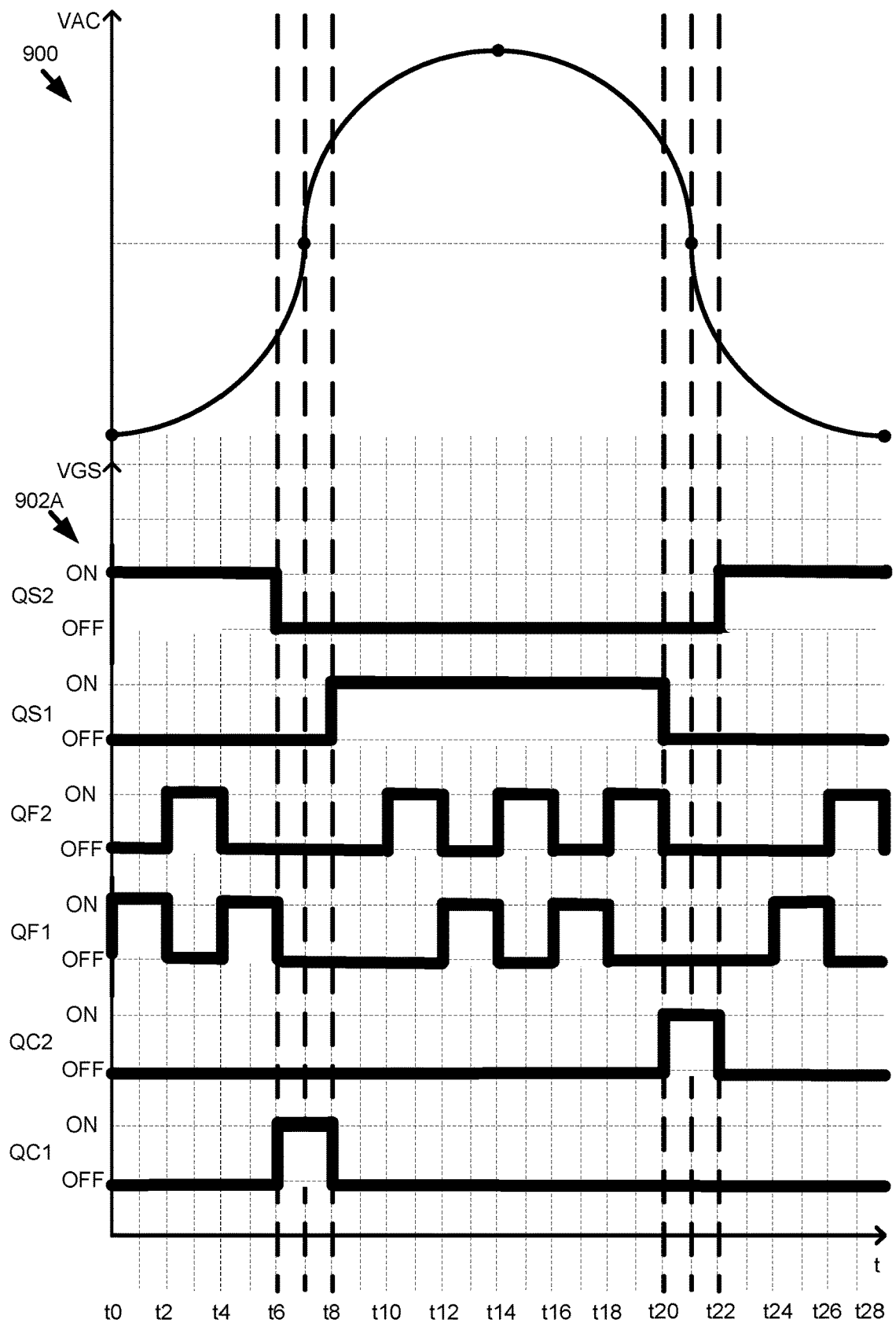
FIG. 9A shows an example graph.

Time t7 up to time t21 may occur during a positive half of an AC cycle. Switch QS1 may be switched ON (e.g., in a steady state) during the positive half of the AC cycle (as shown in FIG. 8J, FIG. 8A, and FIG. 8B). As an example, switch QS1 may be switched ON (e.g., at time t8) after the transition from the negative half cycle to the positive half cycle (e.g., after the zero crossing at time t7). As an example, the time after the transition may be about ones of microseconds, tens of microseconds, hundreds of microseconds, ones of milliseconds, tens of milliseconds, or any other appropriate amount of time. For example, the time may be in a range of about 1 us to about 1000 us, or in a range of about 1 ms to about 10 ms. For example, the time may depend on a capacitance of one or more capacitors of the system (e.g., a determined parasitic capacitance, or the capacitance of a different capacitor of the system), a voltage of the power source, a switching frequency of one or more switches of the system, etc. In some examples, switch QS1 may be switched ON after a certain amount of voltage (e.g., charge due to parasitic capacitance) has been discharged by the dampening circuitry 104. For example, switch QS1 may be switched ON after a charge across parasitic capacitor CY1 with negative polarity (e.g., from ground potential GN to terminal D) has been discharged by the dampening circuitry 104 such that the voltage potential at terminal D changes (e.g., increases) toward the ground potential GN. Switch QS1 may be switched OFF at time t20 of the positive half cycle before the zero crossing at time t21. Switch QS2 may be switched OFF during the positive half cycle. Switches QF1 and QF2 may be switched in an alternating manner during the positive half cycle. For example, as shown in FIG. 9A, switch QF1 may be switched ON from time t12 to time t14, time t16 to time t18, etc. (as shown in FIG. 8B where switch QF1 is ON and switch QF2 is OFF), and switch QF2 may be switched ON from time t10 to time t12, from time t14 to time t16, from time t18 to time t20, etc. (as shown in FIG. 8A where switch QF2 is ON and switch QF1 is OFF). For example, as described above, there may be an additional time delay between the switching of switches QF1 and QF2 to avoid that the switches are turned ON at the same time. As an example, there may be a time delay between the switching of other switches to avoid the undesirable overlap. As an example, the time delay may be about ones of microseconds, tens of microseconds, hundreds of microseconds, ones of milliseconds, tens of milliseconds, or any other appropriate amount of time. For example, the time delay may be in a range of about 1 us to about 1000 us, or in a range of about 1 ms to about 10 ms. Before the transition from the positive half cycle to the negative half cycle (e.g., before the zero crossing at time t21), switches QS1, QS2, QF1, and QF2 of converter circuitry 102 may all be switched OFF and switch QC2 may be switched ON (e.g., as shown in FIG. 8C). As an example, the time before the transition may be about ones of microseconds, tens of microseconds, hundreds of microseconds, ones of milliseconds, tens of milliseconds, or any other appropriate amount of time. For example, the time may be in a range of about 1 us to about 1000 us, or in a range of about 1 ms to about 10 ms. For example, the time may depend on a capacitance of one or more capacitors of the system (e.g., a determined parasitic capacitance, or the capacitance of a different capacitor of the system), a voltage of the power source, a switching frequency of one or more switches of the system, etc. Switch QC2 may be switched ON to assist the soft switching of switch QS2 (e.g., that may be turned ON during the negative half cycle). Switch QC2 may be switched ON to provide a smooth transition between a first state and a second state (e.g., between a first half of an AC cycle and a second half of an AC cycle). Switch QC2 may be switched ON to discharge built-up charge and reduce a voltage potential between a terminal of the power conversion system and a ground potential (e.g., the voltage built-up due to parasitic capacitance). Switch QC2 may be switched ON to mitigate common mode current during the discharging of parasitic capacitors due to parasitic capacitance and common mode switching. For example, the voltage potential may be charge built up on terminal C represented by capacitor CY2 and/or charge built up on terminal D represented by capacitor CY1 during the previous transition between the negative half cycle and the positive half cycle. Switch QC2 may be switched ON at time t20 before the zero crossing of the AC cycle at time t21.

Figure 9B:
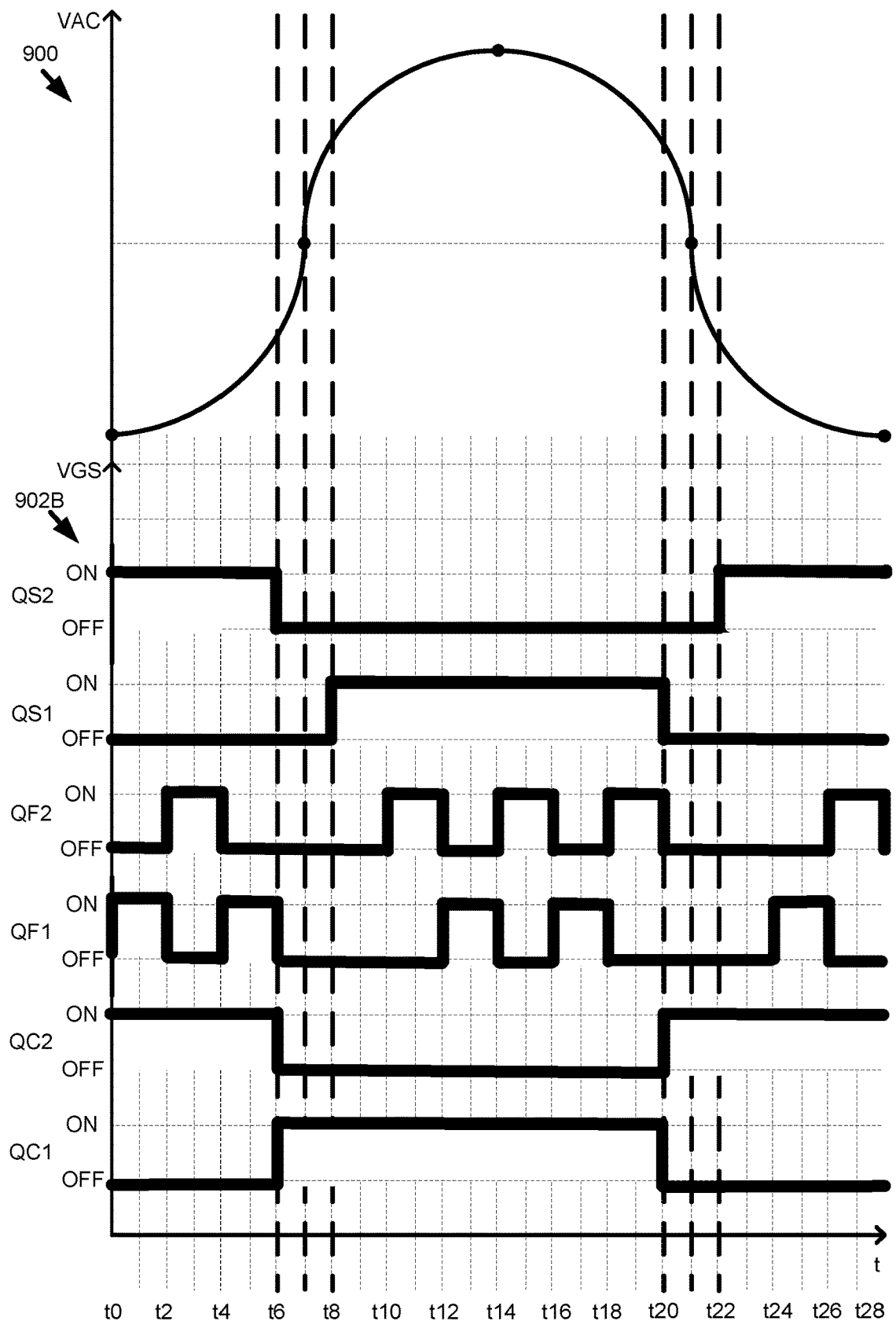
FIG. 9B shows an example graph.

Switch QS2 may be switched ON again after the transition from the positive half cycle to the negative half cycle (e.g., after the zero crossing at time t21). For example, the time after the transition may be about ones of microseconds, tens of microseconds, hundreds of microseconds, ones of milliseconds, tens of milliseconds, or any other appropriate amount of time. For example, the time may be in a range of about 1 us to about 1000 us, or in a range of about 1 ms to about 10 ms. For example, the time may depend on a capacitance of one or more capacitors of the system (e.g., a determined parasitic capacitance, or the capacitance of a different capacitor of the system), a voltage of the power source, a switching frequency of one or more switches of the system, etc. In some examples, switch QS2 may be switched ON after a certain amount of voltage (e.g., charge due to parasitic capacitance) has been discharged by dampening circuitry 104. The operation may proceed accordingly in the negative half cycle as described above. For example, as shown in FIG. 9A and FIG. 9B, switch QF1 may be switched ON from time t24 to time t26, from time t0 to time t2, from time t4 to time t6, etc. (as shown in FIG. 8F where switch QF1 is ON and switch QF2 is OFF), and switch QF2 may be switched ON from time t26 to time t28, from time t2 to time t4, etc. (as shown in FIG. 8G where switch QF2 is ON and switch QF1 is OFF).

Graph 902B shows an example of switching states of different switches of a power conversion system. Graph 902B will be further described with reference to power conversion system 100E of FIGS. 8A-8D, FIGS. 8F-8H, FIG. 8K and FIG. 8L, but may be applied to other similar power conversion systems.

Graph 902B of FIG. 9B shows an example where switch QC2 remains ON after switch QS2 has been switched ON (as shown for example in FIG. 8K). Graph 902B of FIG. 9B also shows an example where switch QC1 remains ON after switch QS1 has been switched ON (as shown for example in FIG. 8L). Although, switch QC1 is shown as remaining ON during almost the entire negative half cycle, and switch QC2 is shown as remaining ON during almost the entire positive half cycle, in some implementations, they may remain switched ON for less time than the entire half cycle. For example, switch QC1 may be switched OFF at a time between time t6 and time t20, and switch QC2 may be switched OFF at a time between time t20 and time t28 or between time t0 and time t6.

Figure 9C:
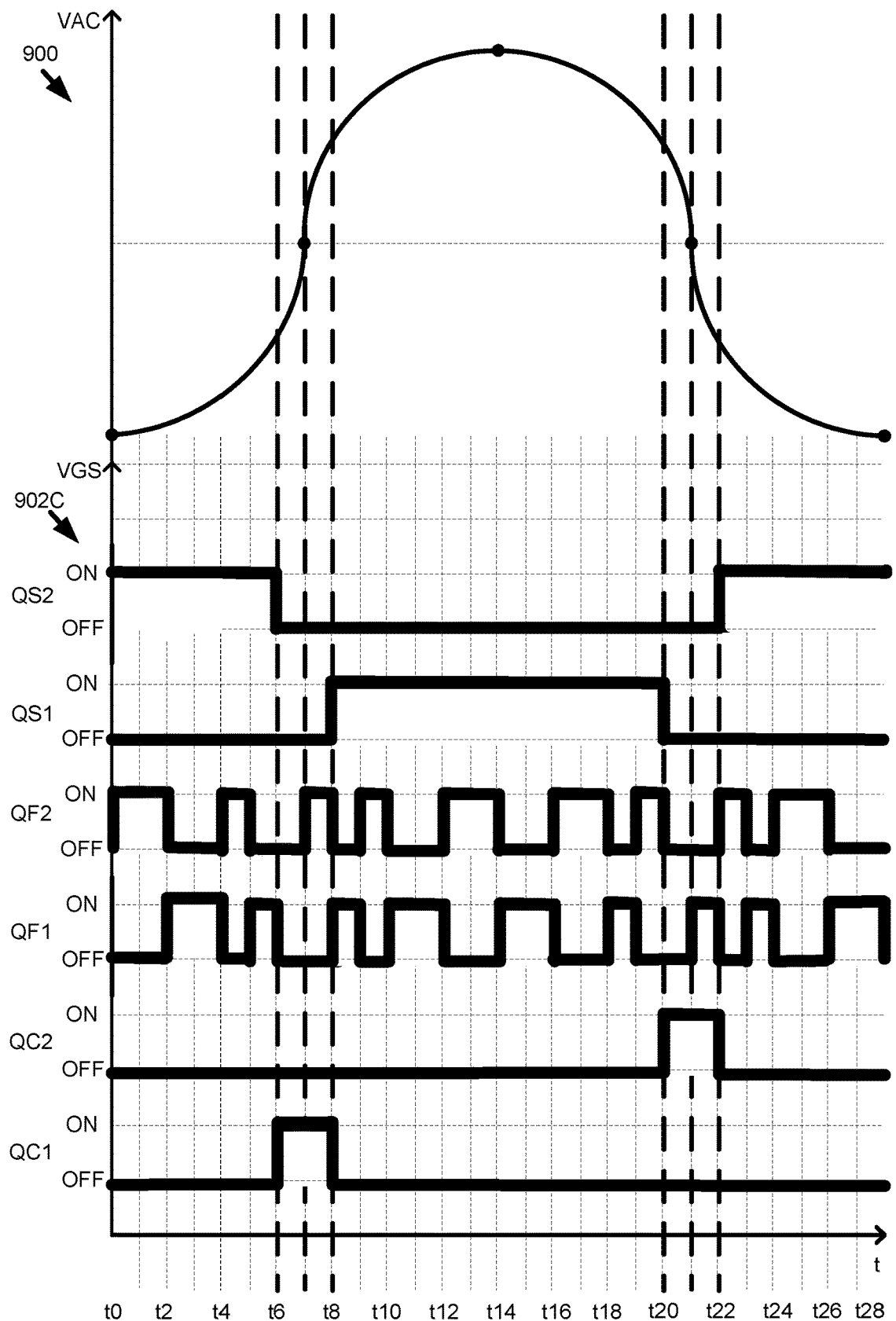
FIG. 9C shows an example graph.

Graph 902C of FIG. 9C shows an example of switching different switches of a power conversion system 100. In FIG. 9C one or more of the fast switches QF1, QF2 may be used to assist with the transition between different states. Switches QF1, QF2 may also be used to assist with the soft switching between a first half and a second half of an AC cycle. In graph 902C, for the transition between the negative half cycle and the positive half cycle, switch QF2 may be switched ON after the zero crossing at time t7 and before slow switch QS1 is turned ON at time t8. Switch QF1 may be switched on at time t8 to assist with the soft switching of switch QS1 at time t8. For the transition between the positive half cycle and the negative half cycle switch QF1 may be switched ON after the zero crossing at time 21 and before slow switch QS2 is turned ON at time t22. Switch QF2 may be switched on at time t22 to assist with the soft switching of switch QS2 at time t22.

Figure 9D:
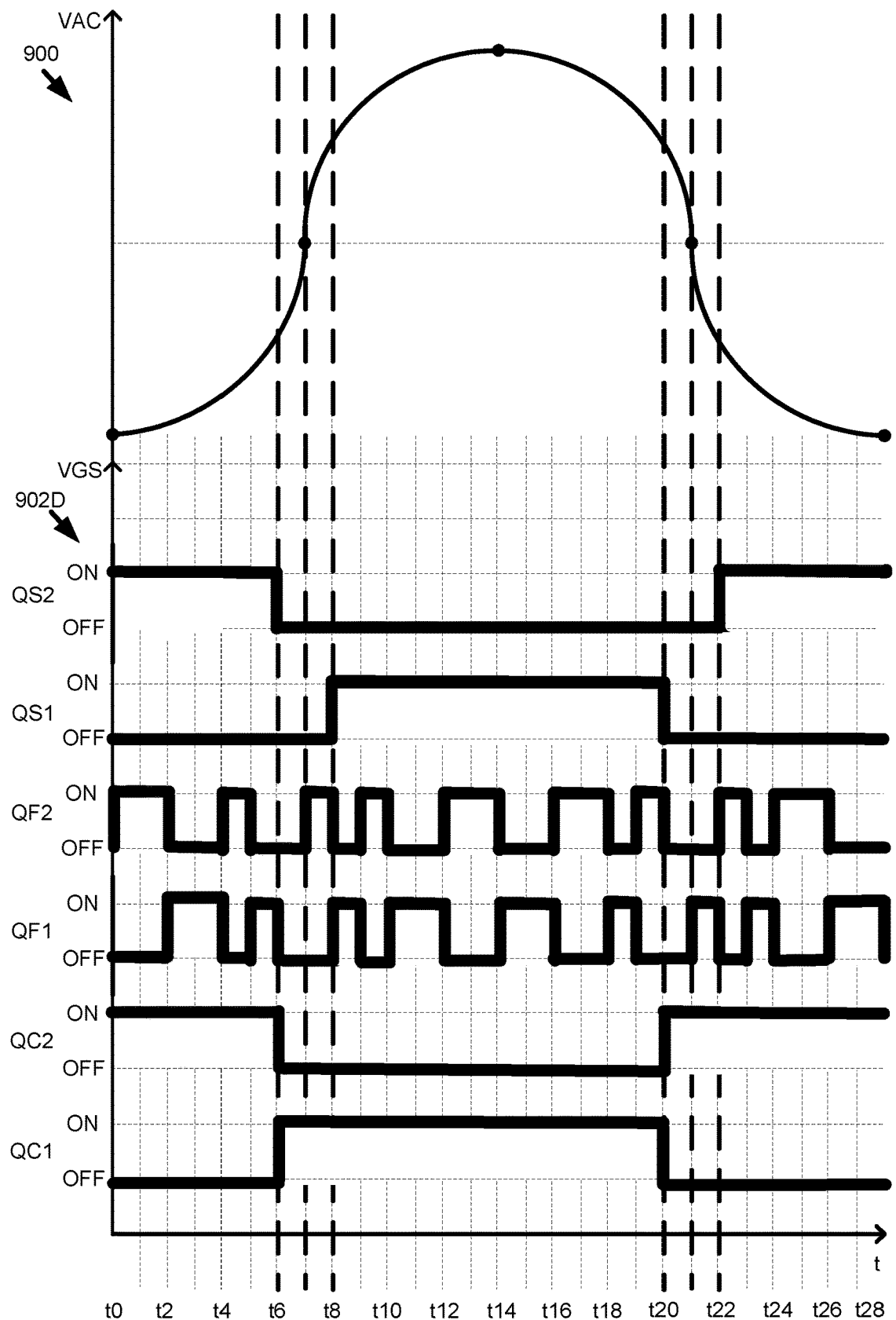
FIG. 9D shows an example graph.

Graph 902D of FIG. 9D shows an example of switching different switches of a power conversion system 100. In FIG. 9D one or more of the fast switches QF1, QF2 may be used to assist with the transition between different states and where switch QC2 remains ON after switch QS2 has been switched ON (as shown for example in FIG. 8K) and where switch QC1 remains ON after switch QS1 has been switched ON (as shown for example in FIG. 8L). Although, switch QC1 is shown as remaining ON during almost the entire negative half cycle, and switch QC2 is shown as remaining ON during almost the entire positive half cycle, in some implementations, they may remain switched ON for less time than the entire half cycle. For example, switch QC1 may be switched OFF at a time between time t6 and time t20, and switch QC2 may be switched OFF at a time between time t20 and time t28 or between time t0 and time t6.

Figure 9E:
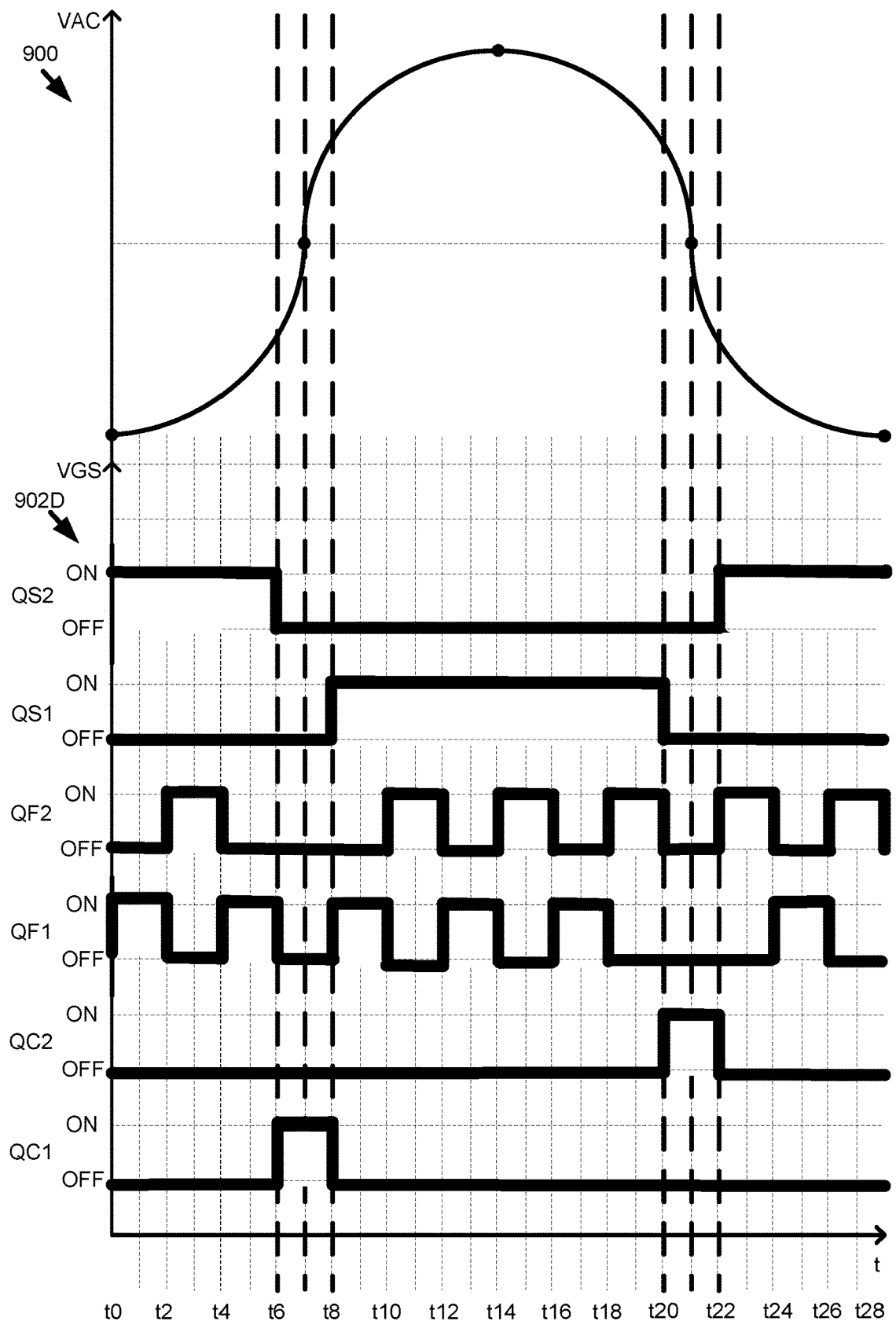
FIG. 9E shows an example graph.

Graph 902E of FIG. 9E shows an example of switching different switches of a power conversion system 100. In FIG. 9E one of the fast switches QF1, QF2 may be switched ON at substantially the same time as the slow switch QS1, QS2 that is switched ON for the given half cycle. For example, switch QF1 and switch QS1 may both be switched on at time t8. Switch QF2 and switch QS2 may both be switched on at time t22. In this example, there might not be the implementation shown in FIG. 8E where just switch QS2 is turned ON and there might not be the implementation shown in FIG. 8J where just switch QS1 is turned ON. In this example, the modes of operation may include the implementations shown in FIGS. 8A-8D and 8F-8I. This example may also include an implementation where switch QC2 remains ON after switch QS2 has been switched ON (similar to the example shown in FIG. 8K, except that one of the fast switches QF1, QF2 is also switched ON) and where switch QC1 remains ON after switch QS1 has been switched ON (similar to the example shown in FIG. 8L, except that one of the fast switches QF1, QF2 is also switched ON).

Although switch QS1 was described as being switched ON during the positive half cycle and switch QC1 was described as assisting with the transition between the negative half cycle to the positive half cycle, and switch QS2 was described as being switched ON during the negative half cycle and switch QC2 was described as assisting with the transition between the positive half cycle to the negative half cycle, in some examples it may be the opposite. For example, switch QS1 may be switched ON during the negative half cycle and switch QC1 may assist with the transition between the positive half cycle to the negative half cycle, and switch QS2 may be switched ON during the positive half cycle and switch QC2 may assist with the transition between the negative half cycle to the positive half cycle.

Figure 10A:
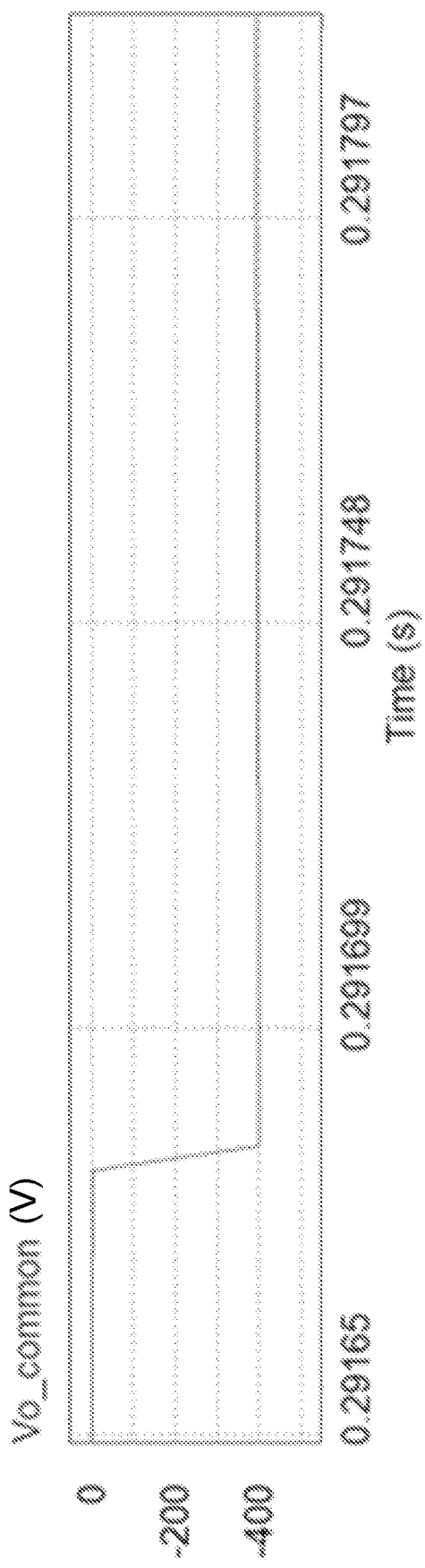
FIG. 10A shows an example graph.
Figure 10B:
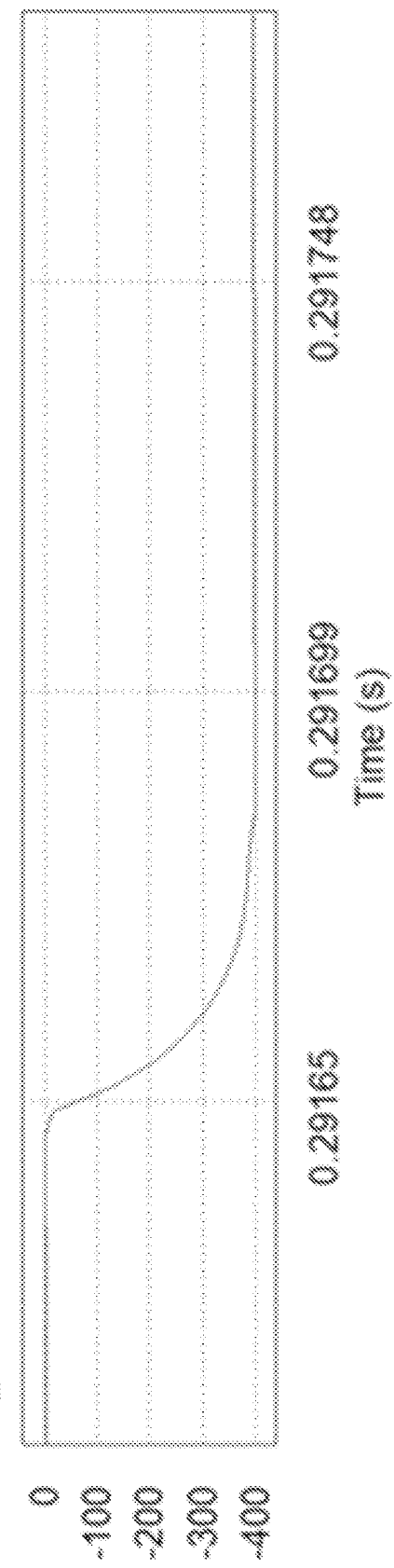
FIG. 10B shows an example graph.

FIG. 10A shows an example of the sharp change of common mode voltage (Vo_common) that may occur during a transition between different states (e.g., different halves of an AC cycle). The sharp change of common mode voltage may also be referred to as common mode switching, when soft switching is not performed to assist smoothing (e.g., without using the dampening circuitry described herein). The common mode voltage (Vo_common) may be the voltage across one or more capacitors related to the power conversion system. For example, the common mode voltage (Vo_common) may be the voltage built up at a terminal of the power conversion system and the ground having a ground potential (e.g., the voltage built-up due to parasitic capacitance). For example, the voltage potential may be charge built up on terminal C (e.g., relative to a ground potential) represented by capacitor CY1 and/or charge built up on terminal D (e.g., relative to a ground potential) represented by capacitor CY2. The common mode voltage (Vo_common) may change relatively quickly and relatively sharply from about 0 volt to about −400 volt in a relatively short time period. For example, the common mode voltage (Vo_common) may change from about 0 volt to about −400 volt in a range of ones of microseconds to tens of microseconds (e.g., in a range of about 2 microseconds to about 8 microseconds). A similar change may occur when the common mode voltage (Vo_common) changes from about 0 volt to about 400 volt. FIG. 10B shows an example of a smooth change of common mode voltage (Vo_common) when there is common mode switching with soft switching and smoothing with dissipation of common mode current (e.g., when using the dampening circuitry described herein). The common mode voltage (Vo_common) may change relatively less quickly and relatively less sharply (e.g., in a parabolic sloping curve, as opposed to an almost linear descent) from about 0 volt to about −400 volt in a relatively longer time period and with a relatively smoother transition. For example, the common mode voltage (Vo_common) may change from about 0 volt to about −400 volt in a range of tens of microseconds to hundreds of microseconds (e.g., in a range of about 10 microseconds to about 90 microseconds). A similar change may occur when the common mode voltage (Vo_common) changes from about 0 volt to about 400 volt. As a result, there may be less noise (EMI) when performing the common mode switching with soft switching and smooth transition.

Figure 11A:
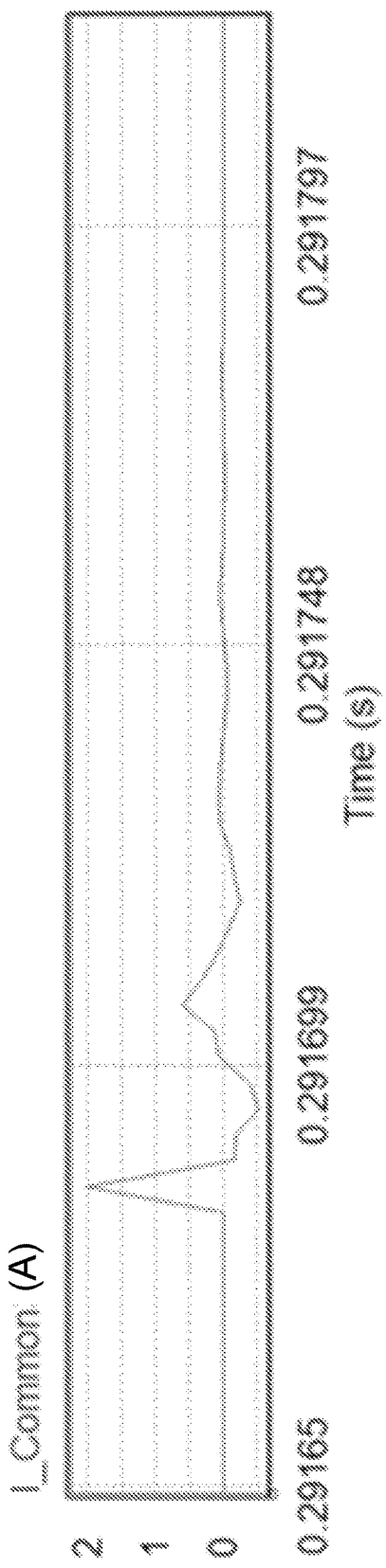
FIG. 11A shows an example graph.
Figure 11B:
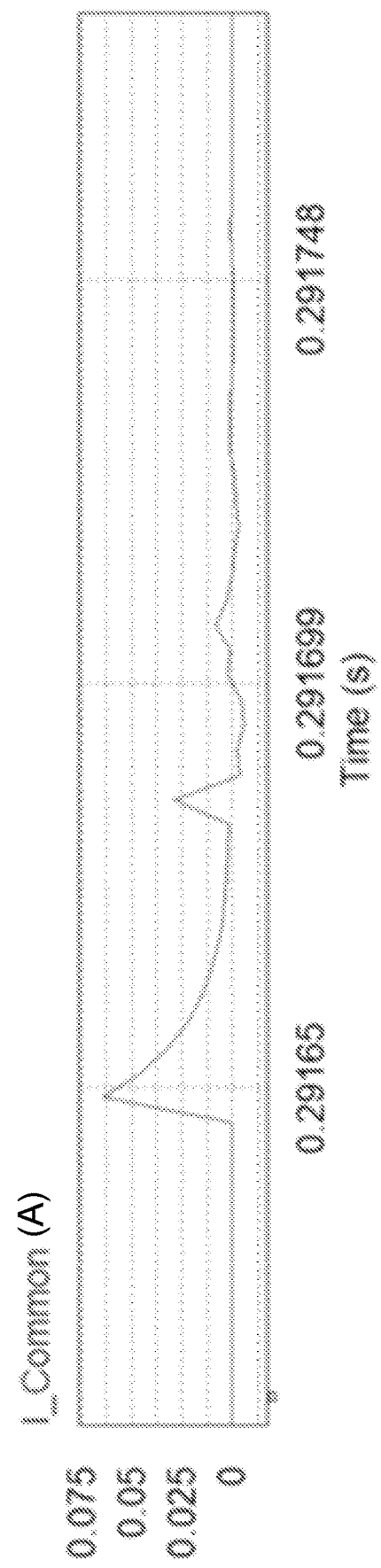
FIG. 11B shows an example graph.

FIG. 11A shows an example of the relatively high spike of current that may occur during a transition between different states (e.g., different halves of an AC cycle). The relatively high spike of current may occur during common mode switching, for example, when soft switching is not performed to assist smoothing (e.g., without using the dampening circuitry described herein). The common mode current (I_common) may be the current flowing due to one or more capacitors related to the power conversion system. For example, the common mode current (I_common) may be the current flowing due to capacitor CY1 and/or capacitor CY2. The common mode current (I_common) flowing due to one or more capacitors may be determined using the derivative of the voltage across the capacitor with respect to time (e.g., the derivative of the common mode voltage (Vo_common) shown in FIG. 10A). The common mode current (I_common) may spike relatively sharply from about 0 A to about 2 A, which may be relatively high current spike, and may cause issues such as noise. FIG. 11B shows an example of the relatively lower spike of common mode current (I_common), for example, when there is common mode switching with soft switching and smoothing with dissipation of common mode current (e.g., when using the dampening circuitry described herein). The common mode current (I_common) shown in FIG. 11B may be the derivative of the common mode voltage (Vo_common) shown in FIG. 10B. The common mode current (I_common) may spike from about 0 A to about 0.06 A which may be a lower current spike (about thirty times less than the spike shown in FIG. 11A) due to the relatively smoother transition between the different states. As a result, there may be less noise (EMI) when performing the common mode switching with soft switching and smooth transition.

An apparatus may comprise: converter circuitry configured to convert an input power to an output power, wherein the converter circuitry is configured to: transition, in a first time period, from a first state to a second state, and transition, in a second time period, from the second state to the first state; and dampening circuitry comprising: first energy dissipation circuitry; and second energy dissipation circuitry. The first energy dissipation circuitry may be connected to a terminal of the converter circuitry and configured to discharge a first voltage associated with common mode switching within the first time period. The second energy dissipation circuitry may be connected to the terminal of the converter circuitry and configured to discharge a second voltage associated with common mode switching within the second time period. In the first state, a first slow switch of the converter circuitry may be in an ON state. In the second state, a second slow switch of the converter circuitry may be in an ON state. The first state may be during a positive half cycle of an alternating current (AC) power associated with the converter circuitry. The second state may be during a negative half cycle of the AC power associated with the converter circuitry. The converter circuitry may comprise an inductor. The converter circuitry may be further configured to: connect, during the positive half cycle, a positive terminal of an AC power source to a terminal of the inductor, connect, during the positive half cycle, a negative terminal of the AC power source to ground potential, connect, during the negative half cycle, the negative terminal of the AC power source to the terminal of the inductor, and connect, during the negative half cycle, the positive terminal of the AC power source to ground potential. During the first state, a first fast switch and a second fast switch may be alternately switched to convert input alternating current (AC) power to output direct current (DC) power. During the second state, the first fast switch and the second fast switch may be alternately switched to convert input AC power to output DC power. The converter circuitry may comprise at least one of: a bridgeless power converter, a power factor correction (PFC) converter, an alternating current (AC) to direct current (DC) converter, a bi-directional converter, or a DC to AC inverter. The converter circuitry may comprise a first slow switch, a second slow switch, a first fast switch, and a second fast switch. The dampening circuitry may further comprise: a first switch configured to discharge the first voltage; and a second switch configured to discharge the second voltage. The dampening circuitry may further comprise a first switch, and the first energy dissipation circuitry may comprise a first resistor. The dampening circuitry may further comprise a second switch, and the second energy dissipation circuitry comprises a second resistor. The first switch and the first resistor may be connected to each other in series, and the second switch and the second resistor may be connected to each other in series. The first energy dissipation circuitry may comprise a first resistor, and the second energy dissipation circuitry may comprise a second resistor. The first energy dissipation circuitry may be configured in parallel to a first switch of the converter circuitry, and the second energy dissipation circuitry may be configured in parallel to a second switch of the converter circuitry. The terminal of the converter circuitry may comprise a node located between a plurality of switches of the converter circuitry. A terminal of a first switch of the converter circuitry and a terminal of a second switch of the converter circuitry may be connected to the terminal of the converter circuitry. The first switch may be a first slow switch, and the second switch may be a second slow switch. The terminal of the converter circuitry may be connected to at least one of: a ground potential, a neutral potential, or a terminal of an AC power source. During the first state, the first voltage may be a voltage potential between a first terminal of the apparatus and a ground potential, and related to parasitic capacitance. During the second state, the second voltage may be a second voltage potential between a second terminal of the apparatus and the ground potential, and related to parasitic capacitance. A first switch may be configured to be activated to connect a first resistor to the converter circuitry to discharge the first voltage. The first voltage may be associated with parasitic capacitance, and the first switch may be configured to be activated before a first zero crossing of an AC power source. A second switch may be configured to be activated to connect a second resistor to the converter circuitry to discharge the second voltage. The second voltage may be associated with parasitic capacitance, and the second switch may be configured to be activated before a second zero crossing of the AC power source.

A method may comprise: operating converter circuitry coupled to dampening circuitry, wherein the converter circuitry is configured to convert an input power to an output power, and the dampening circuitry comprises first energy dissipation circuitry and second energy dissipation circuitry; discharging, using the first energy dissipation circuitry, a first voltage associated with common mode switching within a first time period in which the converter circuitry transitions from a first state to a second state; and discharging, using the second energy dissipation circuitry, a second voltage associated with common mode switching within a second time period in which the converter circuitry transitions from the second state to the first state.

An apparatus may comprise: converter circuitry, the converter circuitry being configured to convert an input power to an output power; and dampening circuitry, the dampening circuitry comprising: first energy dissipation circuitry; and second energy dissipation circuitry, wherein the first energy dissipation circuitry is connected to a terminal of the converter circuitry and configured to discharge a first voltage associated with common mode switching within a first time period in which the converter circuitry transitions from a first state to a second state; and wherein the second energy dissipation circuitry is connected to the terminal of the converter circuitry and configured to discharge a second voltage associated with common mode switching within a second time period in which the converter circuitry transitions from the second state to the first state.

The first state may be a state with a first slow switching element of the converter circuitry turned ON. The second state may be a state with a second slow switching element of the converter circuitry turned ON. The first state may be during a positive half cycle of an alternating current (AC) power associated with the converter circuitry. During the positive half cycle, a positive terminal of an AC power source may be connected to a terminal of an inductor, and a negative terminal of the AC power source may be connected to a ground potential. The second state may be during a negative half cycle of an alternating current (AC) power associated with the converter circuitry. During the negative half cycle, a negative terminal of an AC power source may be connected to a terminal of an inductor, and a positive terminal of the AC power source may be connected to a ground potential. During the first state, a first fast switching element and a second fast switching element are alternately switched to convert an input AC power to an output DC power. During the second state, a first fast switching element and a second fast switching element are alternately switched to convert an input AC power to an output DC power. The converter circuitry may be at least one of: a bridgeless power converter, a power factor correction (PFC) converter, an alternating current (AC) to direct current (DC) converter, a bi-directional converter, or a DC to AC inverter. The converter circuitry comprises a plurality of switching elements. The plurality of switching elements comprises a first slow switching element, a second slow switching element, a first fast switching element, and a second fast switching element. The plurality of switching elements comprises at least one of: a switch, a transistor, or a diode. The dampening circuitry further comprises a first switch to discharge the first voltage. The first energy dissipation circuitry comprises a first resistor. The dampening circuitry further comprises a first switch, and the first energy dissipation circuitry comprises a first resistor. The first switch and the first resistor are connected to each other in series. The dampening circuitry further comprises a second switch to discharge the second voltage. The second energy dissipation circuitry comprises a second resistor. The dampening circuitry further comprises a second switch and the second energy dissipation circuitry comprises a second resistor. The second switch and the second resistor are connected to each other in series. The first energy dissipation circuitry may be configured in parallel to a first switching element of the converter circuitry. The second energy dissipation circuitry may be configured in parallel to a second switching element of the converter circuitry. The terminal of the converter circuitry comprises a node located between a plurality of switching elements of the converter circuitry. A terminal of a first switching element of the converter circuitry and a terminal of a second switching element of the converter circuitry are connected to the terminal of the converter circuitry. The first switching element may be a first slow switch, and the second switching element may be a second slow switch. The terminal of the converter circuitry may be connected to a ground potential. The ground potential may be a virtual neutral potential. The terminal of the converter circuitry may be connected to a terminal of an AC power source. During the first state, the first voltage may be a voltage potential between a terminal of the apparatus and a ground potential related to a parasitic capacitance. During the second state, the second voltage may be a voltage potential between a terminal of the apparatus and a ground potential related to the parasitic capacitance. A first switch may be configured to be activated to connect a first resistor to the converter circuitry to discharge the first voltage, wherein the first voltage may be associated with a parasitic capacitance. The first switch may be configured to be activated before a first zero crossing of an AC power source. A second switch may be configured to be activated to connect a second resistor the converter circuitry to discharge the second voltage, wherein the second voltage may be associated with the parasitic capacitance. The second switch may be configured to be activated before a second zero crossing of the AC power source.

An apparatus may comprise: converter circuitry, the converter circuitry being configured to convert an input power to an output power; and dampening circuitry, the dampening circuitry being configured to soft switch a first switch of the converter circuitry when the converter circuitry is between a first state and a second state, and to soft switch a second switch of the converter circuitry when the converter circuitry is between the second state and the first state.

The first state may be a half cycle of an AC cycle. The second state may be a different half cycle of the AC cycle. Energy dissipation circuitry of the dampening circuitry may be configured to be connected to the converter circuitry before the first switch is activated in the second state. The energy dissipation circuitry of the dampening circuitry may be configured to be connected to the converter circuitry before the second switch is activated in the first state.

An apparatus may comprise: converter circuitry configured to convert an input power to an output power; and dampening circuitry operatively connected to the converter circuitry to: when starting a negative half of an alternating current (AC) cycle, reduce a charge accumulated during a transition from a previous negative half of the AC cycle to the present positive half of the AC cycle; and when starting a positive half of a second AC cycle, reduce a charge accumulated during a transition from the negative half of the AC cycle to the positive half of the second AC cycle.

An apparatus may comprise: converter circuitry configured to convert an input power to an output power; first dampening circuitry operatively connected to the converter circuitry to reduce, when starting a negative half of an alternating current (AC) cycle, a charge accumulated during a transition from a previous negative half of the AC cycle to the present positive half of the AC cycle; and second dampening circuitry operatively connected to the converter circuitry to reduce, when starting a positive half of a second AC cycle, a charge accumulated during a transition from the negative half of the AC cycle to the positive half of the second AC cycle.

An apparatus may comprise: converter circuitry configured to convert an input power to an output power; and dampening circuitry operatively connected to the converter circuitry to: before starting a negative half of an alternating current (AC) cycle, reduce a charge accumulated during a positive half of the AC cycle; and before starting a positive half of a second AC cycle, reduce a charge accumulated during the negative half of the AC cycle.

An apparatus may comprise: converter circuitry configured to convert an input power to an output power; first dampening circuitry operatively connected to the converter circuitry to reduce, before starting a negative half of an alternating current (AC) cycle, a charge accumulated during a positive half of the AC cycle; and second dampening circuitry operatively connected to the converter circuitry to reduce, before starting a positive half of a second AC cycle, a charge accumulated during the negative half of the AC cycle. The charge accumulated during the positive half of the AC cycle may be associated with a common mode current. The first dampening circuitry may be operatively connected to the converter circuitry when the second dampening circuitry is operatively disconnected to the converter circuitry, and the second dampening circuitry may be operatively connected to the converter circuitry when the first dampening circuitry is operatively disconnected to the converter circuitry.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. An apparatus comprising:
    converter circuitry comprising an inductor and configured to convert an input power to an output power, wherein the converter circuitry is configured to:
        transition, in a first time period, from a first state to a second state, and
        transition, in a second time period, from the second state to the first state, wherein the first state is during a positive half cycle of an alternating current (AC) power source associated with the converter circuitry, and the second state is during a negative half cycle of the AC power source associated with the converter circuitry; and
    dampening circuitry comprising:
        first energy dissipation circuitry; and
        second energy dissipation circuitry,
    wherein:
        the first energy dissipation circuitry is connected to a terminal of the converter circuitry and configured to discharge a first voltage associated with common mode switching within the first time period,
        the second energy dissipation circuitry is connected to the terminal of the converter circuitry and configured to discharge a second voltage associated with common mode switching within the second time period, and
        the converter circuitry is further configured to:
            connect, during the positive half cycle, a negative terminal of the AC power source to ground potential;

connect, during the negative half cycle, the negative terminal of the AC power source to the terminal of the inductor; and connect, during the negative half cycle, a negative terminal of the AC power source to ground potential.

2. The apparatus of claim 1, wherein:
in the first state, a first slow switch of the converter circuitry is in an ON state; and
in the second state, a second slow switch of the converter circuitry is in an ON state.

3. The apparatus of claim 1, wherein:
during the first state, a first fast switch and a second fast switch are alternately switched to convert input alternating current (AC) power to output direct current (DC) power; and
during the second state, the first fast switch and the second fast switch are alternately switched to convert input AC power to output DC power.

4. The apparatus of claim 1, wherein the converter circuitry comprises at least one of: a bridgeless power converter, a power factor correction (PFC) converter, an alternating current (AC) to direct current (DC) converter, a bi-directional converter, or a DC to AC inverter.

5. The apparatus of claim 1, wherein the converter circuitry comprises a first slow switch, a second slow switch, a first fast switch, and a second fast switch.

6. The apparatus of claim 1, wherein the dampening circuitry further comprises:
a first switch configured to discharge the first voltage; and
a second switch configured to discharge the second voltage.

7. The apparatus of claim 1, wherein the dampening circuitry further comprises a first switch, and
wherein the first energy dissipation circuitry comprises a first resistor.

8. The apparatus of claim 7, wherein the dampening circuitry further comprises a second switch, and
wherein the second energy dissipation circuitry comprises a second resistor.

9. The apparatus of claim 8, wherein the first switch and the first resistor are connected to each other in series, and
wherein the second switch and the second resistor are connected to each other in series.

10. The apparatus of claim 1, wherein the first energy dissipation circuitry comprises a first resistor, and
wherein the second energy dissipation circuitry comprises a second resistor.

11. The apparatus of claim 1, wherein the first energy dissipation circuitry is configured in parallel to a first switch of the converter circuitry, and
wherein the second energy dissipation circuitry is configured in parallel to a second switch of the converter circuitry.

12. The apparatus of claim 1, wherein the terminal of the converter circuitry comprises a node located between a plurality of switches of the converter circuitry.

13. The apparatus of claim 1, wherein a terminal of a first switch of the converter circuitry and a terminal of a second switch of the converter circuitry are connected to the terminal of the converter circuitry.

14. The apparatus of claim 13, wherein the first switch is a first slow switch, and
wherein the second switch is a second slow switch.

15. The apparatus of claim 1, wherein the terminal of the converter circuitry is connected to at least one of: a ground potential, a neutral potential, or a terminal of an AC power source.

16. The apparatus of claim 1, wherein:
during the first state, the first voltage is a voltage potential between a first terminal of the apparatus and a ground potential, and related to parasitic capacitance; and
during the second state, the second voltage is a second voltage potential between a second terminal of the apparatus and the ground potential, and related to parasitic capacitance.

17. The apparatus of claim 1, wherein:
a first switch is configured to be activated to connect a first resistor to the converter circuitry to discharge the first voltage, wherein the first voltage is associated with parasitic capacitance, and the first switch is configured to be activated before a first zero crossing of an AC power source; and
a second switch is configured to be activated to connect a second resistor to the converter circuitry to discharge the second voltage, wherein the second voltage is associated with parasitic capacitance, and the second switch is configured to be activated before a second zero crossing of the AC power source.

18. The apparatus of claim 1, further comprising third energy dissipation circuitry.

19. The apparatus of claim 18, wherein the third energy dissipation circuitry comprises a second inductor.

20. An apparatus comprising:
a first switch;
a second switch;
converter circuitry configured to convert an input power to an output power, wherein the converter circuitry is configured to:
transition, in a first time period, from a first state to a second state, and
transition, in a second time period, from the second state to the first state; and
dampening circuitry comprising:
first energy dissipation circuitry; and
second energy dissipation circuitry,
wherein:
the first energy dissipation circuitry is connected to a terminal of the converter circuitry and configured to discharge a first voltage associated with common mode switching within the first time period,
the second energy dissipation circuitry is connected to the terminal of the converter circuitry and configured to discharge a second voltage associated with common mode switching within the second time period,
the first switch is configured to be activated to connect a first resistor to the converter circuitry to discharge the first voltage, wherein the first voltage is associated with parasitic capacitance, and the first switch is further configured to be activated before a first zero crossing of an AC power source, and
the second switch is configured to be activated to connect a second resistor to the converter circuitry to discharge the second voltage, wherein the second voltage is associated with parasitic capacitance, and the second switch is configured to be activated before a second zero crossing of the AC power source.

* * * * *